(12) United States Patent
Guigli

(10) Patent No.: US 10,009,443 B1
(45) Date of Patent: *Jun. 26, 2018

(54) PROVISIONING REMOTE APPLICATION SERVERS ON A SERVICE PROVIDER INFRASTRUCTURE AS A SERVICE PLATFORM

(71) Applicant: IP Company 8, LLC, Natick, MA (US)

(72) Inventor: Michael Guigli, Natick, MA (US)

(73) Assignee: IP Company 8, LLC

( * ) Notice: Subject to any disclaimer, the term of this patent is extended or adjusted under 35 U.S.C. 154(b) by 0 days. days.

This patent is subject to a terminal disclaimer.

(21) Appl. No.: 15/615,432

(22) Filed: Jun. 6, 2017

(51) Int. Cl.
| | |
|---|---|
| *G06F 15/173* | (2006.01) |
| *H04L 29/06* | (2006.01) |
| *G06F 9/445* | (2018.01) |
| *H04L 12/24* | (2006.01) |
| *G06F 9/50* | (2006.01) |
| *H04L 12/911* | (2013.01) |
| *H04L 29/08* | (2006.01) |

(52) U.S. Cl.
CPC .............. *H04L 67/42* (2013.01); *G06F 9/445* (2013.01); *G06F 9/5077* (2013.01); *H04L 41/5051* (2013.01); *H04L 47/783* (2013.01); *H04L 67/10* (2013.01)

(58) Field of Classification Search
None
See application file for complete search history.

(56) References Cited

U.S. PATENT DOCUMENTS

| | | | | |
|---|---|---|---|---|
| 8,769,644 | B1 * | 7/2014 | Eicken | H04L 67/1097 709/225 |
| 2011/0283017 | A1 * | 11/2011 | Alkhatib | H04L 12/4641 709/244 |

* cited by examiner

*Primary Examiner* — Mohamed Ibrahim
(74) *Attorney, Agent, or Firm* — Mintz Levin Cohn Ferris Glovsky and Popeo, P.C.

(57) ABSTRACT

A first server is instantiated within a tenant domain serviced by a cloud service provider. The first server includes a first network adapter and a second network adapter. The first network adapter is configured to be controlled by the cloud service provider. The second network adapter is configured to be controlled by the tenant. The first network adapter is operably coupled with an interconnection network infrastructure operably coupled with a cloud service provider infrastructure. The second network adapter is operably coupled to a first port group controlled by the tenant. The first server is configured to host and execute an application accessible through a remote display protocol. Local security and group policy configurations are applied to the first server. Related methods, techniques, apparatuses, systems, non-transitory computer program products, and articles are also described.

18 Claims, 66 Drawing Sheets

035080-00

Template XML Representation of the Body of the Recompose VApp API Request complying with the requirements of the vCloud Director API Schema where the Virtual Machine to be added requires connectivity to a Service Provider's Interconnect Network for Service Provider-Brokered Connections to the Virtual Machine and where the Existing VApp already contains the Service Provider's Interconnect Network or where the Deployment does not require the Existing VApp to contain access to the Service Provider's Interconnect Network

```xml
<?xml version="1.0" encoding="UTF-8"?>
<RecomposeVAppParams
    xmlns="http://www.vmware.com/vcloud/v1.5"
    xmlns:xsi="http://www.w3.org/2001/XMLSchema-instance"
    xmlns:ovf="http://schemas.dmtf.org/ovf/envelope/1" >
    <Description>Description</Description>
    <SourcedItem>
        <Source href="$SourcedItemhref" />
        <VmGeneralParams>
            <Name>"$VMName"</Name>
            <NeedsCustomization>true</NeedsCustomization>
        </VmGeneralParams>
        <StorageProfile
            href="$StoragePolicyhref" >
        </StorageProfile>
    </SourcedItem>
    <AllEULAsAccepted>true</AllEULAsAccepted>
</RecomposeVAppParams>
```

Template XML Representation of the Body of the Create OrgVDC Network API Request complying with the requirements of the vCloud Director API Schema

```xml
<?xml version="1.0" encoding="UTF-8"?>
<OrgVdcNetwork
    name="$OrgVDCnetworkName"
    xmlns="http://www.vmware.com/vcloud/v1.5" >
  <Description></Description>
  <Configuration>
    <IpScopes>
      <IpScope>
        <IsInherited>false</IsInherited>
        <Gateway>"$OrgVDCNetworkGatewayAddress"</Gateway>
        <Netmask>255.255.255.0"</Netmask>
        <Dns1>"$DNSIP"</Dns1>
        <DnsSuffix>"$DomainName"</DnsSuffix>
        <IpRanges>
          <IpRange>
            <StartAddress>"$IpStartAddress"</StartAddress>
            <EndAddress>"$IpEndAddress"</EndAddress>
          </IpRange>
        </IpRanges>
      </IpScope>
    </IpScopes>
    <FenceMode>natRouted</FenceMode>
  </Configuration>
  <EdgeGateway
      href="$EdgeGatewayHref" />
  <IsShared>false</IsShared>
</OrgVdcNetwork>
```

Template XML Representation of the Body of the Update Guest Customization Request complying with the requirements of the vCloud Director API Schema where the Virtual Machine to Customized inherits the Active Directory Domain Name, Join Domain User Account, and Join Domain Password from the vCloud Director Global Guest Customization Settings

```xml
<?xml version="1.0" encoding="UTF-8"?>
<GuestCustomizationSection
    xmlns="http://www.vmware.com/vcloud/v1.5"
    xmlns:ovf="http://schemas.dmtf.org/ovf/envelope/1"
    ovf:required="false">
  <ovf:Info>Specifies Guest OS Customization Settings</ovf:Info>
  <Enabled>true</Enabled>
  <ChangeSid>true</ChangeSid>
  <VirtualMachineId>"$VirtualMachineId"</VirtualMachineId>
  <JoinDomainEnabled>true</JoinDomainEnabled>
  <UseOrgSettings>true</UseOrgSettings>
  <AdminPasswordEnabled>true</AdminPasswordEnabled>
  <AdminPasswordAuto>true</AdminPasswordAuto>
  <ResetPasswordRequired>false</ResetPasswordRequired>
  <CustomizationScript/>
  <ComputerName>"$VMName"</ComputerName>
</GuestCustomizationSection>
```

Template XML Representation of the Body of the Update Guest Customization Request complying with the requirements of the vCloud Director API Schema where the Virtual Machine to Customized must specify the Active Directory Domain Name, Join Domain User Account, and Join Domain Password

```xml
<?xml version=""1.0"" encoding=""UTF-8""?>
<GuestCustomizationSection
  xmlns=""http://www.vmware.com/vcloud/v1.5""
  xmlns:ovf=""http://schemas.dmtf.org/ovf/envelope/1""
  ovf:required=""false"" >
  <ovf:Info>Specifies Guest OS Customization Settings</ovf:Info>
  <Enabled>true</Enabled>
  <ChangeSid>true</ChangeSid>
  <VirtualMachineId>$VirtualMachineId</VirtualMachineId>
  <JoinDomainEnabled>true</JoinDomainEnabled>
  <UseOrgSettings>false</UseOrgSettings>
  <DomainName>""$JoinDomainName""</DomainName>
  <DomainUserName>""$JoinDomainUserUPN""</DomainUserName>
  <DomainUserPassword>""$JoinDomainUserPassword""</DomainUserPassword>
  <AdminPasswordEnabled>true</AdminPasswordEnabled>
  <AdminPasswordAuto>true</AdminPasswordAuto>
  <ResetPasswordRequired>false</ResetPasswordRequired>
  <CustomizationScript/>
  <ComputerName>""$VMName""</ComputerName>
</GuestCustomizationSection>
```

042100-00 List of Supported Operating Systems that may be used inside the Virtual Machine

- Microsoft Windows Server 2008 R2 Standard
- Microsoft Windows Server 2008 R2 Datacenter
- Microsoft Windows Server 2008 R2 Enterprise
- Microsoft Windows Server 2012 R2 Standard
- Microsoft Windows Server 2016 Standard

FIG. 47

- 042200-00 VMWare Tools
  - VMWare Tools Version 9 or above for Microsoft Windows Server (Note that the Guest Customization process (225000-00) requires VMware Tools be installed inside the source Virtual Machine for a Deployment.

FIG. 48

103080-00 Tenant vCloud Director Prerequisites

- The following Customizations can be included:
  - Configure a Group Policy to enable PowerShell Remoting for all Computers joined to the Domain
  - Specify the Service Provider's Remote Desktop Services Licensing Server
  - Create an SRV (Service Record Locator) Record in DNS for Volume Licensing Activation of Microsoft Windows Server Operating systems, and point to Service Provider's Key Management Service Activation Server host name.
  - If the Tenant Virtual Datacenter is configured for multitenancy, apply multi-tenancy firewall rules to the Tenant's Edge Gateway to restrict TCP/IP traffic between individual OrgVDC Networks except for the OrgVDC Network containing the Tenant's Domain Controller.

FIG. 56

| Variable Name (in order of appearance) | Type | Description |
|---|---|---|
| $DomainName | String | The Active Directory Domain Name of the Computer System running the process |
| $DKsIP | String | The IP Address of the Computer System running the process |
| $MacAddress | String | The Mac Address of the Computer System running the process |
| @OU | Array | An Array of Active Directory Organizational Units, acquired from the Computer System running the process |
| $PrivateDomain | Boolean | A descriptor hard coded in the OrgVDC Object Name set by the Service Provider when the Tenant is initially setup |
| $NewVMCollection | Boolean | A deployment method requiring the creation of a New Vapp, OU, and OrgVDCNetwork to contain the Application Server deployment. This variable is specified by the Administrator during Dialogue |
| $OUVAppName | String | A name chosen by the Administrator to identify the Deployment. For Multi Tenant Domains, the Active Directory Organizational Unit matches the Vapp name |
| $VMName | String | The vCloud Director Virtual Machine Name and DNS Name of the deployed Application Server |
| $SourceItemHref | String | The vCloud Director hyperlink reference for each usable Master Image (VApp Template) stored in a tenant-accessible vCloud Director Catalog |
| $vCloudUserName | String | Tenant-supplied username for vCloud Director account with Organization or VDC Administrator Role authorizes Active Directory user accounts to access the deployed Application Server |
| $vCloudPassword | String | Tenant-supplied password for corresponding $vCloudUserName account |
| @VMMacs | Array | An array composed by the process of all Virtual Machine Network Adapter Mac Addresses within the Tenant's vCloud Director Organization. |
| $OrgVDChref | String | The vCloud Director hyperlink reference to the Organization Virtual Datacenter Object in the vCloud Director API |
| @ConflictErrorArray | Array | An Array containing error messages produced by the process |
| $ProposedADGroup | String | The name of the Active Directory Security Group to be created by the process, the membership of which authorizes Active Directory user accounts to access the deployed Application Server |
| @GroupArray | Array | An Array of Active Directory Security Groups containing the $Proposed ADGroup |
| @AllExistingOUsArray | Array | An array comprising all Active Directory Organizational Units within the Domain of the process' runtime |
| @VAppNamesArray | Array | An array comprising all vCloud Director VApp containers in the Tenant's vCloud Director Organization deployment |

FIG. 58

| | | |
|---|---|---|
| $VAppExists | Boolean | A value of TRUE means the process has successfully located a corresponding vCloud Director vApp container with the same name as the Active Directory Organizational Unit when $NewVMCollection is FALSE. For Private Domain deployments, this value is always set to TRUE. |
| $VAppQueryhref | String | A hyperlink reference in the vCloud Director API corresponding to the location of the deployment's vApp Object |
| @EdgeGatewayObjects | Array | An Array of the XML representations of each Edge Gateway (virtual router) in a tenant's virtual datacenter. Under certain circumstances a tenant virtual datacenter may have more than one Edge Gateway. |
| @OrgVDCNetworks | Array | An array of all vCloud Director OrgVDC Network Objects within the OrgVDC |
| $UsePrimaryEdgeGateway | Boolean | A value of TRUE means the process has selected the EdgeGateway connected to the OrgVDC Network containing the Active Directory Domain Controller for the routing of the OrgVDC Network to be created. |
| $EdgeGateway | Object | A Virtual Machine running a router operating system, represented by a vCloud Director Edge Gateway |
| @StaticRoutes | Array | An array of static routes programmed into an Edge Gateway |
| @SecondaryEdgeGatewayRoutableScope | Array | An array of network addresses associated with any given EdgeGateway, which may be routed by such Edgegateway to the OrgVDC Network containing the Domain Controller for the Active Directory Domain associated with the OrgVDC containing the EdgeGateways |
| $EnableAppLocker | Boolean | A value of TRUE means Windows AppLocker should be enabled inside the Deployed Application Server |
| $RestrictInboundNet | Boolean | A value of TRUE means the local security policy of the deployed application server will restrict network connections to users explicitly assigned to use that system after those users have proven their identity using Kerberos |
| $EnableShadowCopies | Boolean | A value of TRUE means that shadow copies will be enabled and scheduled to occur periodically on the deployed application server |
| $AutoInstallWindowsUpdates | Boolean | A value of TRUE means that Microsoft Windows Update Service will be configured to install Microsoft Updates automatically using a group policy machine registry.pol with the appropriate registry settings |
| $EnableMalwarePolicy | Boolean | A value of TRUE means that the system will apply a preconfigured template of settings to configure the antimalware agent in a manner that is optimized for a virtual machine, rather than require the administrator configure these settings manually |

FIG. 59

| | | |
|---|---|---|
| $RestrictNonAdministratorUsers | Boolean | A value of TRUE means that the process will apply the Basic AppLocker Template configuration even if AppLocker Enhanced is not enabled, the process will also apply group policy based restrictions to the group policy users, non-admin users, registry.pol file. These restrictions will only be applied to users without local administrator rights. |
| $UseTenantRDBroker | Boolean | A value of TRUE means that the process will prompt the administrator to specify the FQDN of the tenant's on Windows Remote Desktop Services Connection Broker. The use of a connection broker is entirely optional and not required for Citrix XenApp. |
| $StoragePolicyHREF | String | A hyperlink reference identifying the vCloud Director Storage Policy on which the Application Server will be deployed. Storage policies may be used to classify the capabilities of the hardware on which the application server will be deployed |
| $RDConnectionBrokerFQDN | String | The fully qualified domain name of a tenant's Remote Desktop Services Connection Broker, when the tenant chooses to use a remote desktop connections in addition to, or in place of Citrix ICA connections |
| $EnableCitrix | Boolean | A value of TRUE means the Administrator has selected to deploy a Citrix XenApp application server with support for the Citrix ICA protocol. The user initiated connection will route through the Service-Provider's Citrix Access Gateway. |
| $MasterImage | Boolean | A value of TRUE means the Administrator is building a Master Image or vApp Template to be added to the catalog. Useful, when the administrator has their own software, which should be globally installed for multiple tenants at time of original provisioning |
| $SPNetworkHref | String | A vCloud Director API hyperlink reference to the Service Provider's Interconnect network Object. |
| $EnableGPU | Boolean | A value of TRUE means the Administrator has selected to enable shared hardware-assisted graphics for the user session (Citrix HDX 3D). |
| $EnableFramehawk | Boolean | A value of TRUE means that the process will open the required Windows firewall ports to enable the Citrix ICA Framehawk display protocol |
| $EnableUDPAudio | Boolean | A value of TRUE means that the process will open the required Windows firewall ports to enable the Citrix ICA realtime audio transport protocol |
| $EnableDirectUserAccess | Boolean | A value of TRUE means that the process will add the $ProposedADGroup (assigned Active Directory Security Group) to the Citrix Direct User Access local security group on the Citrix XenApp server. This will allow for non-brokered, direct connections to the Citrix XenApp server over the network through the ICA protocol. This generally requires a VPN connection for external user connectivity and bypass the NetScaler Gateway. |

FIG. 60

| | | |
|---|---|---|
| $InstallVirtualDeliveryAgent | Boolean | A value of TRUE means that the process will invoke the installation of the Citrix Virtual Delivery Agent for Server OS on the system. This is required when the administrator want to enable Citrix XenApp and the application server does not have the agent installed, or when the agent is installed and an upgrade is available, whereby the administrator chooses to upgrade the virtual delivery agent |
| $RestoreAppLockerConfig | Boolean | A value of TRUE means that the process will restore the AppLocker policy to the most recently saved policy backup file located in the logging folder |
| $KeepAppLockerConfig | Boolean | A value of TRUE means that the process will not alter the current AppLocker policy on the system |
| $ResetAppLockerConfig | Boolean | A value of TRUE means that the process will reset the AppLocker policy to the default configuration, any post-deployment administrator-implemented customizations will be discarded. |
| $VMhref | String | A vCloud Director API hyperlink reference to the Virtual Machine Object representing the deployed application server |
| $VMObject (never defined in any process) | Object | A vCloud Director API XML Object representing the virtual machine object running the application server. The XML object contains the attributes of the virtual machine. |
| $OrgVDCNetworkName | String | A vCloud Director API Object Name to identify the deployed OrgVDC Network object to the Administrator after deployment |
| $VirtualMachineId | String | A vCloud Director API Universal Unique Identifier to identify the Virtual Machine representing the deployed application server |
| $JoinDomainUserName | String | An Active Directory UserPrincipalName associated with the user account within the Active Directory Domain associated with the vCloud Director OrgVDC containing the deployment. The user account is a credential to join virtual machines to the domain through the Microsoft Sysprep process |
| $JoinDomainPassword | String | The password associated with the $JoinDomainUserName account |
| $OpenADNow | Boolean | A value of TRUE means that the process will open the Microsoft Management Console and add the Active Directory Users and Computers Snapin during the deployment process. |
| $SilentMode | Boolean | A value of TRUE causes the Desktop Configuration Process to run without requiring input from the Administrator during the process. The silent mode also bypasses PowerShell operations that cannot run using a remote PowerShell session |

FIG. 61

| | | |
|---|---|---|
| @DeliveryControllers | Array | An Array of the fully qualified domain name for each Service Provider managed Citrix XenApp Delivery Controller. These values are global to all tenants and thus hard coded into the source code. |
| $ComputerFQDN | String | The fully qualified domain name of the computer running the current process |
| @InstalledFeatures | Array | An array of Windows Server Features that are currently installed on the computer system running the current process |
| $OSVersion | String | A value representing the Operating System Version to ensure compatibility and use version-specific APIs to achieve the same functional result during the Desktop Configuration process |
| $Reboot | Boolean | A value of TRUE indicates that the Virtual Machine's Operating System must be restarted. |
| @RequiredWindowsFeatures | Array | An Operating Version-Specific array hard coded into the Desktop Configuration Process containing the required Windows Operating System Features that must be installed to enable the application server functionality. This is a prerequisite for both Remote Desktop Services Deployments, and for deployments whereby the Remote Desktop Services is enhanced with Citrix XenApp |
| @SIDs | Array | An array containing Microsoft Windows Security Identifiers representing Active Directory Account or Group objects (i.e. User Accounts, Computer Accounts, Security Groups) |
| $AppLockerPolicyBackupPath | String | The path to a file containing the AppLocker policy to be backed up or from which to be restored. |
| $FileHashConditions | String | A set of AppLocker conditions based on the hash of a program's executable file. The hash uniquely identify a program's executable, and verify it has not been altered. |
| @FramehawkRule | Array | A Windows PowerShell Object representing a Windows Firewall rule to allow the Citrix Framehawk Protocol ports |
| @AudioRedirectionRule | Array | A Windows PowerShell Object representing a Windows Firewall rule to allow the Citrix Realtime Audio Transport Protocol ports |
| $IpStartAddress | String | A TCP/IP Version 4 Address, indicating the starting IP address in a pool of addresses to be made available for assignment to virtual machines located in an OrgVDC Network object. |
| $IpEndAddress | String | A TCP/IP Version 4 Address, indicating the ending IP address in a pool of addresses to be made available for assignment to virtual machines located in an OrgVDC Network object. |
| $OrgVDCNetworkHref | String | A hyperlink reference to the location of a tenant OrgVDCNetwork Object in the vCloud Director API |
| $OrgVDCNetworkId | String | A Global Unique Identifier used to identify the tenant OrgVDCNetwork Object in the vCloud Director API. This is an attribute of the object and a part of its hyperlink reference. |

FIG. 62

| | | |
|---|---|---|
| $SPNetworkId | String | A Global Unique Identifier used to identify the Service Provider Interconnect Network in the vCloud Director API. This is an attribute of the object and a part of its hyperlink reference. |
| $SPNetworkName | String | A name chosen by the Service Provider to identify the Service Provider Interconnect Network in the vCloud Director Control Panel |
| $OrgVDCNetworkGatewayAddress | String | A TCP/IP Version 4 Address assigned as the default gateway for the OrgVDCNetwork. Virtual Machines attached to this network object will be programmed to use this default gateway. |
| $EdgeGatewayHref | String | A hyperlink reference to the location of the Edge Gateway attached Object in the vCloud Director API. This Edge Gateway object is attached to the OrgVDCNetwork. |
| $VMTemplateHref | String | A hyperlink reference to the location of the Master Image in the vCloud Director API. This Master Image is a child of the vAppTemplate Object, and it's hyperlink reference may obtained by querying the child object of the selected vAppTemplate Object ($$sourceditem.href). |

Required Delegation of Permissions of Service Provider's Citrix XenApp Deployment to Tenant Administrator Note: The following is a sample of Windows PowerShell script using the Citrix XenApp PowerShell Snap In. The script below accomplishes the following. The Script's runtime environment is the Tenant's Citrix Delivery Controller:

(1) Creates an Unmanaged and Static XenApp Machine Catalog Object for a Tenant's Exclusive Use, (2) Creates a Corresponding XenApp Delivery Group Object configured for Private Desktops with Multi-session support and for a Tenant's Exclusive Use, (3) Creates an Assignment Policy Rule for Tenant's Domain Users and binds the Rule to the Delivery Group, (4) Creates an Access Policy Rule for Tenant's Domain Users and binds the Rule to the Delivery Group, (5) Creates a Citrix Delivery Controller Administrator Scope Named after Tenant's Domain, (6) Associates the Administrator Scope with the created Machine Catalog Object and Delivery Group Object, (7) Assigns the Machine Catalog Administrator and Delivery Group Administrator Roles to the created Administrator Scope.

FIG. 64

021000-00 Desktop Configuration Initiator Argument List

The argument list relays the Desktop Configuration-relevant Dialogue Outputs from (011100-00 – 012200-00) to the Desktop Configuration Process An example Argument List is as follows:

$Mode = 'Silent'

$ArgumentList = " -Arguments -Mode "+$Mode+" -Group """+$Group+""""+" -GroupSID "+$GroupSID+" -EnableCitrix "+$EnableCitrix+" -EnableAppLockerEnhanced "+$EnableAppLockerEnhanced+" -KeepAppLockerConfig "+$KeepAppLockerConfig+" -RestrictNetAccessToDesktopGroups "+$RestrictNetAccessToDesktopGroups+" -EnableShadowCopies "+$EnableShadowCopies+" -AutoInstallUpdates "+$AutoInstallUpdates+" -UseAntiMalwarePolicy "+$UseAntiMalwarePolicy+" -EnableNonAdminUserSecurityHardening "+$EnableNonAdminUserSecurityHardening+" -EnableHardwareAcceleratedGraphics "+$EnableHardwareAcceleratedGraphics+" -EnableFramehawk "+$EnableFramehawk+" -EnableRealtimeAudio "+$EnableRealtimeAudio+" -EnableDirectUserAccess "+$EnableDirectUserAccess D:\DesktopConfig.exe -ArgumentList $argumentlist -verb runAs -Wait Note that the Connection Broker and XenApp Delivery Controller processes can be bypassed in Silent Mode and run from the Initiator runtime because of PowerShell does not allow double hop sessions.

PROVISIONING REMOTE APPLICATION SERVERS ON A SERVICE PROVIDER INFRASTRUCTURE AS A SERVICE PLATFORM

TECHNICAL FIELD

The subject matter described herein relates to Desktop as a Service (DaaS) and Infrastructure as a Service (IaaS).

BACKGROUND

In an Infrastructure as a Service (IaaS) computing model, cloud service providers hypothecate and comingle physical storage, compute, and network devices and allow tenants to use logically partitioned sets ("pools") of these resources to deploy virtual machines on cloud service provider-owned and managed hardware. A virtual machine is a software computer that runs an operating system much like a physical computer. The hardware is shared by multiple tenants. Tenants deploy and manage these virtual machines via web interface or API calls to a Cloud Infrastructure Manager Server ("fabric controller", VMware vCloud Director, and the like). Tenants pay a subscription fee for these services and third party Operating Systems running in these virtual machines are sometimes licensed through the cloud service provider. In this model, tenants generally require exclusive control of their network pool and may define their internet protocol (IP) address space for these virtual machines in accordance with corporate policy or an internally defined schema in layer 3 of the Open Systems Interconnect (OSI) model.

Therefore the cloud service provider is unable to dictate or shape a tenant's IP address assignments of the tenant's virtual machines. This can be especially challenging when tenants require the ability to extend their existing external network infrastructure to these network pools (for example in a hybrid cloud computing model, or for data migration, or coexistence with on premise infrastructure in the tenant's pre-existing Kerberos realm ("domain"). As a result, IP address conflicts naturally emerge between tenants, and cloud service provider keep these network pools isolated at layer 2 of the OSI Model in order to avoid security risks—such as denial of service—due to IP address conflicts. As a result, cloud service providers are unable to deliver any services above Layer 3 over the network to the tenant without introducing cumbersome Network Address Translations for every tenant virtual machine. Examples of such services in layer 7 of the OSI model can include DaaS, e.g., cloud service provider brokered CITRIX XENAPP and MICROSOFT REMOTE DESKTOP SERVICES connections.

The cloud service provider has an internal network topology, which is usually different from a topology of the corporate or internal network of each tenant. The topologies of the cloud service provider and each tenant may be different because each of those entities may have a unique or customized scheme of allocating IP addresses over the respective network. When the number of tenants being serviced by the cloud service provider is high, the likelihood of an IP address conflict between tenants is also high. There is a high likelihood of IP addresses conflict because there is an increased chance of a tenant assigning a computer within its internal network a particular IP address that has been already used by another tenant in its computer network. Therefore, the cloud service provider cannot concurrently provide network services to both tenants without the added complexity and limitations of network address translation for each computer in each tenant's network.

SUMMARY

In an aspect, a first server is instantiated within a tenant domain serviced by a cloud service provider. The first server includes a first network adapter and a second network adapter. The first network adapter is configured to be controlled by the cloud service provider. The second network adapter is configured to be controlled by the tenant. The first network adapter is operably coupled with an interconnection network infrastructure operably coupled with a cloud service provider infrastructure. The second network adapter is operably coupled to a first port group controlled by the tenant. The first server is configured to host and execute an application accessible through a remote display protocol. Local security and group policy configurations are applied to the first server.

One or more of the following features can be included in any feasible combination. The first server can be configured to execute the application accessible through a remote display protocol by at least creating a machine account matching an active directory computer account of the first server; adding the machine account to a service provider created machine catalog administered by the tenant; and adding the machine account to a service provider created delivery group administered by the tenant.

A list of remote application servers associated with an administrator-specified tenant-managed remote desktop services connection broker address can be retrieved. A runtime computer name of the first server can be added to the list of remote application servers associated with the administrator specified connection broker address. The tenant can further include a first directory server including a third network adapter configured to be controlled by the tenant, the third network adapter operably coupled to the first port group controlled by the tenant, the first port group being operably coupled with a router.

Operably coupling the first network adapter with the interconnection network infrastructure can include: operably coupling each of the first network adapter and a second external interface of the router with a second port group of type private virtual local area network isolated, the second port group of the type isolated being controlled by the cloud service provider; and operably coupling the second port group with a third port group of a type private virtual local area network promiscuous. Each of the second port group and the third port group can be controlled by the cloud service provider.

The operably coupling the interconnection network infrastructure with the cloud service provider infrastructure can include operably coupling the third port group promiscuous with a fourth port group via a firewall, the fourth port group being controlled by the cloud service provider, the fourth port group operably coupled to a second resource server, a second directory server and a dynamic host configuration protocol server of the cloud service provider. The first port group can include a virtual extensible local area network backed distributed port group or a virtual local area network-backed distributed virtual port group. The second port group can be operably coupled to the third port group via a private virtual local area network mapping trunk.

The fourth port group can include a virtual local area network-backed distributed port group. The virtual local area network identity can be exclusive of any private-virtual local area network identity. The fourth port group can be operably coupled to the third port group via a firewall.

The remote display protocol can include MICROSOFT remote desktop or CITRIX independent computing architecture.

The cloud service provider infrastructure can be configured. The cloud service provider infrastructure can include a database, a delivery controller, a licensing server, and an access gateway. A machine catalog and a delivery group can be created on the delivery controller. The administration of the delivery controller can be delegated to the tenant.

Access by an end user to the application server using a gateway of the cloud service provider, a tenant-deployed virtual private network, or a tenant-deployed remote desktop gateway can be enabled. The end user can be authenticated by the gateway of the cloud service provider and against a tenant's active directory domain. The authentication can include verifying a membership of the end user in an active directory security group. A connection of the end user can be routed to a computer account within the tenant domain associated with the active directory security group. A network protocol session between a first computer of a first domain and a second computer of a second domain can be authenticated using a Kerberos protocol.

The details of one or more variations of the subject matter described herein are set forth in the accompanying drawings and the description below. Other features and advantages of the subject matter described herein will be apparent from the description, the drawings, and the claims.

DESCRIPTION OF DRAWINGS

FIG. 39 illustrates an exemplary XML Object representing the Body of the recompose VApp API request;

FIG. 40 illustrates an exemplary XML Object representing the Body of the Create OrgVDC network API request;

FIG. 41 illustrates an exemplary XML Object representing the Body of the instantiate VApp API request;

FIG. 42 illustrates another exemplary XML Object representing the Body of the instantiate VApp API request;

FIG. 43 illustrates another exemplary XML Object representing the Body of the Update Guest Customization API request;

FIG. 44 illustrates an exemplary XML Object representing the Body of the Update Guest Customization API request;

FIG. 46 illustrates an example XML object representing the Body of the Update Guest Customization API request;

FIG. 47 illustrates an example list of supported operating systems in an example implementation;

FIG. 48 illustrates versioning information for VMWare tools in an example implementation;

FIG. 56 illustrates example tenant vCloud director prerequisites according to an example implementation;

FIGS. 58-63 illustrate descriptions of variable names according to an example implementation;

FIG. 64 illustrates an example script for delegating permission of a service provider's deployment to a tenant administrator;

FIG. 66 illustrates a desktop configuration initiator argument list.

Like reference symbols in the various drawings indicate like elements.

DETAILED DESCRIPTION

Figure 1:
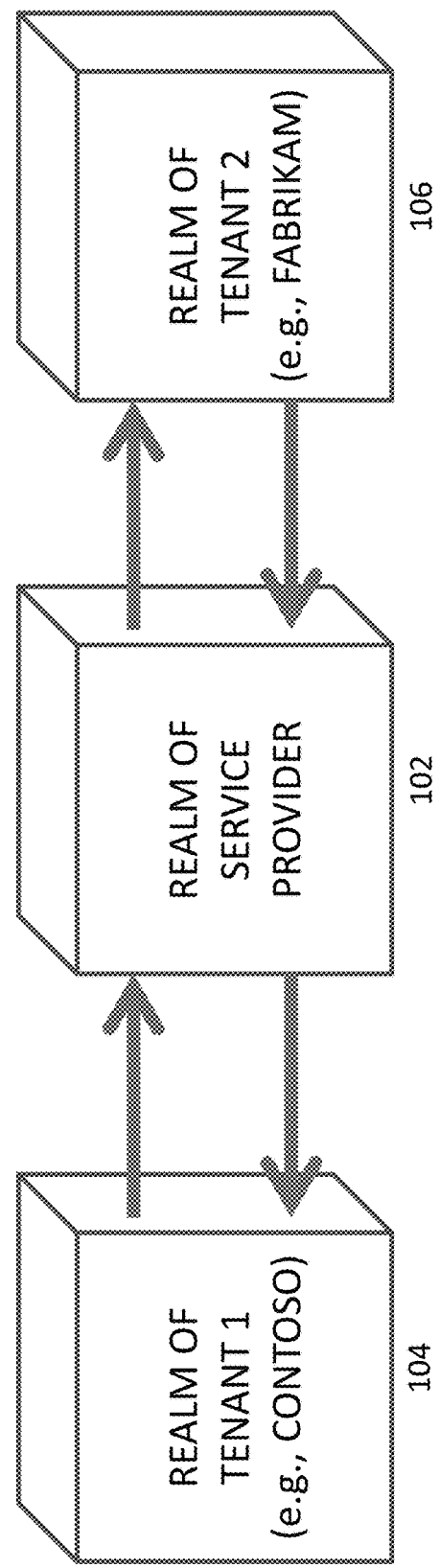
FIG. 1 illustrates a realm of a cloud service provider operably and non-transitively coupled with a realm of a first tenant and a realm of a second tenant.

The subject matter described herein relates to networking architectures that support infrastructure as a service (IaaS), software defined datacenter (SDC), network function virtualization (NFV), and remote desktop/remote application, where tenants deploying virtual machines on a cloud service provider's IaaS platform have an objective of retaining control of their cloud network topology and realm, while still securely accessing network services from resources running in the cloud service provider's Kerberos realm ("domain"). Although internet protocol (IP) address conflicts can exist between tenants, this objective can be achieved using a service-provider managed virtual network interface connection on the virtual machine, thereby eliminating the need to create network address translation rules for each tenant virtual machine.

In a Desktop as a Service (DaaS) cloud service model, Application Servers (also referred to as a XenApp Server, Terminal Server, or Remote Desktop Session Host, or Desktop Server) can be deployed by a tenant on-demand into a cloud infrastructure as virtual machines. The Cloud Service provider facilitates user access to those deployed application servers. Tenants install applications into the application server, and users access those applications generally via session virtualization and a remote display protocol. The complexity of DaaS traditionally requires a restrictive service model in that the service provider traditional must dictate the tenant's networking and authentication configuration when the cloud service provider is responsible for brokering sessions for remote users accessing those applications. The applications are generally presented as a remote desktop, although some implementations may restrict the pixels of the remote session to only show a single or plurality of hosted applications. This cloud service model lacks extensibility due to (1) application licensing considerations when operating on comingled hardware, (2) integration with internal and external authentication realms, (3) control and extensibility of the network to which the application servers are coupled, (4) the performance of the applications due to the latency between the application server-centric hardware and database/backend server-centric hardware, and (5) delegated provisioning and administration of these resource extensions. These extensibility challenges are traditionally better suited for an Infrastructure as a Service (IaaS) computing model, whereby the Service Provider controls some components of DaaS, and the tenant retains control of others. Contextualizing DaaS on top of an IaaS model, as achieved in some implementations described herein, can achieve better service, better reliability, and lower cost of application delivery for tenants.

DaaS can also include single-user-session-dedicated virtual machines (VDI). But this service model can create additional administrative burdens, added complexity, and a lower ROI.

The subject matter described herein relates to the unification of Desktop as a Service (DaaS) and Infrastructure as a Service (IaaS) cloud-service models. For example, the current subject matter can facilitate this unification by enabling tenant organizations to initiate the automated provisioning of application servers (e.g., CITRIX XENAPP servers) and associated networking components on a Service Provider infrastructure ("Cloud") running VMware vCloud Director. Unification of these cloud-service models reduces cost while improving application performance. In this hybrid model, tenants can retain control over their Active Directory Domain (also referred to as realm), network topology, virtual machines, and self-service provisioning of those resources. The service provider can facilitate secure remote user connectivity to tenant's virtual machines when configured by tenant to function as application servers.

In some implementations, the service provider operates XENAPP components including a set of delivery controllers, a database, and access gateway for the tenants. Each tenant can retain full administrative control over its CITRIX session host servers, including application installation, IP address assignment, and control over the domain (e.g., Kerberos Realm) to which these servers are joined. Each tenant's CITRIX XENAPP session host servers and/or MICROSOFT REMOTE DESKTOP services servers run inside a virtual machine. The virtual machines running MICROSOFT REMOTE DESKTOP services or CITRIX XENAPP can be managed from the same control plane and can execute in the same physical compute cluster as the tenant's virtual machines running generic backend server services (e.g., database, file sharing, directory, messaging, and the like). The result is a superior remote application experience for fully virtualized MICROSOFT WINDOWS applications running in the cloud.

The current subject matter can provide a solution to integrate CITRIX XENAPP or MICROSOFT Remote Desktop Services with VMware vCloud Director. The described approaches can cut time to deliver an application server to a customer from 6 months to 20 minutes or less. The current subject matter can reduce the initial investment required by a tenant to setup an application server. Applications running on the application server will perform better in an IaaS environment versus a traditional VDI hosting environment because the application runtime environment is on the same local area network as any database servers and file servers supporting those applications. Moreover, the tenant administrator does not need to have a working knowledge of CITRIX XENAPP, the Tenant Administrator does not need to install, configure, administer, or monitor/maintain, a CITRIX XENAPP environment.

The solution can be compliant with Service Provider licensing (SPLA) models, so the tenant need only pays software licenses for actual authorized users on a month-to-month basis. The method can be automated and entirely self-service for the Tenant. The tenant need not submit any service request with the Service Provider in order to create a new application server or application server group. Some processes authenticates Application Servers and User accounts using Tenant's existing Active Directory Domain, integrating the security configuration of the application server with Tenant's pre-existing application security configurations. In some implementations include a tight integration with MICROSOFT Active Directory for user provisioning and there can be no new control panels, reducing tenant's learning curve.

The current subject matter can include a high density solution, whereby multiple tenants can accomplish these deployments using the same set of hardware resources. The current subject matter can provide the flexibility to start with a traditional Windows Remote Desktop Services Server and then upgrade to a CITRIX XENAPP Server. The process can be implemented using a small set of prepackaged scripts with minimal GUI interaction. The current subject matter can remove the bulk of the decision making from the administrator, such decisions include configuring security feature of the deployment, network, and/or the image as well as the hierarchy, and the required Image software features their interdependencies. The current subject matter can reduce the risk of errors in the deployment process, by checking for conflicting objects in a tenant's own environment, prior to executing an application server deployment.

In some implementations, an application server configuration process does not perform any virtual machine creation functions. Instead, it configures an operating system and adds the server to an appropriate delivery controller/connection broker.

FIG. 1 illustrates a computer account authentication realm 102 of a cloud service provider operably and non-transitively coupled with a realm 104 of a first tenant and a realm 106 of a second tenant. Realms 104 and 106 can be pre-existing realms deployed by its respective tenant administrator prior to or after tenant's initial engagement with the cloud service provider. In such circumstance, the realm can originate from its respective tenant's existing datacenter, office, campus, other service provider cloud, or span any combination thereof. An administrative user of the tenant realm (such as 104 or 106) can extend that realm to the cloud service provider's infrastructure, and initiate the creation of a trust relationship with realm 102. Thus, the cloud service provider can selectively or globally allow cloud service provider IaaS hosted virtual machines within each of those realms 104 and 106 Kerberos authenticated access to specific network services from within all the network services provided by the cloud service provider. For example, the cloud service provider can provide different or overlapping services to each of the realms 104 and 106. Each of the realms 102, 104 and 106 can have different network topologies, as each of those entities can have a unique or customized scheme of allocating internet protocol (IP) addresses over the respective network. Although two tenants have been shown in FIG. 1, in alternate implementations the cloud service provider serves many more tenants and thus many more (i.e. thousands of) realms. When the number of tenants being serviced by the cloud service provider is high, the likelihood of an IP address conflict between tenants is also high because there is an increased chance of the tenant assigning to a computer within a realm (e.g., 104) of a tenant (e.g., tenant 1) a particular IP address that has been assigned by that tenant (e.g., tenant 1) to another computer. These are private networks, and therefore each tenant's IP address selection is largely limited to those specified in RFC 1918. The networking architecture described herein can allow such IP address conflicts to exist harmlessly—enable the cloud service provider to securely deliver services to each tenant—while avoiding having a tenant reconfigure the topology according to the preferences of the cloud service provider. This network architecture that allows for these IP address conflicts while avoiding having a tenant reconfigure the topology according to the preferences of the cloud service provider is described by FIGS. 2 and 3, which are described in more detail below. A process of configuring this networking architecture is further described in FIG. 4-6, which are discussed below.

The realms 102, 104, and 106 can be Kerberos realms, and can be deployed in practice through a MICROSOFT Active Directory Forest root Domain or similar prepackaged solution. Kerberos is a network authentication protocol developed and maintained by the Massachusetts Institute of Technology that authenticates known computers and users using secret-key cryptography. Computers and users with accounts in the directory servers of their respective realms can mutually authenticate with computers and users with accounts in the directory server of the same realm. When a bidirectional cross-realm trust is created between the directory servers of realms 104 and 102, users and computers in realm 104 can mutually authenticate using Kerberos with computers in realm 102 and vice versa. Similarly, when a bidirectional cross-realm trust is created between the directory servers of realms 106 and 102, computers and users in realm 106 can mutually authenticate using Kerberos with computers and users in realm 102 and vice versa. When this ability to authenticate across realms using Kerberos exists, administrators in each realm can enable users and computers from a trusted realm to have Kerberos authenticated access to network services and resources located in their own realm. As the tenants 104 and 106 should not have to access the internal networks of each other, those tenants 104 and 106 may not authenticate with each other as such realm trusts are nontransitive. In other words, each of realms 104 and 106 may not trust each other, but each of them can trust the realm 102; and the realm 102 can trust realms 104 and 106. In this implementation, such authentication attempts between realms 104 and 106 are also filtered by layer 2 separation of the resources of realm 104 from the resources of realm 106, which is described herein. Trust relationships between Kerberos realms can be formed on any operating system which supports this network authentication protocol, such as WINDOWS, LINUX, or any other platform, and therefore this subject matter is operating system agnostic. Such a trust relationship can be referred to as a forest trust or external trust in WINDOWS, or a realm trust in LINUX. WINDOWS can also refer to realms as forests. Administrative partitions of more complex WINDOWS forests are known as domains in WINDOWS. As described herein, a different network authentication protocol can be used to extend this solution to scenarios where these WINDOWS domains are the perimeter for such trust relationship instead of the entire WINDOWS forest ("External Trust").

For each Kerberos realm, there is at least one directory server ("domain controller"), which can be a virtual machine with an operating system that further includes a TCP/IP stack, a directory service, key distribution center, DNS service, network time protocol service, an authentication service, and a ticket granting service. This implementation assumes these required services are running on the Directory Server, however other implementations of this same design may choose to disperse these services across multiple servers and/or implement redundant instances of these services. This implementation also functions as described in such augmented fault tolerant implementations. The directory server running the authentication service can receive, from a computer with a realm 104 or 106, a network service request, which includes the DNS name of the computer as configured by an administrator of the realm 104 or 106 to identify the computer, and an identification of the requested network service. Realm 102 uses its own authoritative DNS service to resolve the IP address of the computer as seen by realm 102, and computer resources in realm 102 communicate with the requesting resource in realm 104 or 106 using the service provider-assigned IP address on the service-provider designated network interface connection. This is further illustrated by FIG. 2.

The authentication service (directory server) can then authenticate the computer. If the computer is authenticated as registered to receive the requested network service, the ticket granting service can generate an encrypted ticket that the ticket granting server then sends to the computer along with a service session key and a service secret key to decrypt the ticket. The ticket to the requested network service can enable the requesting computer to access the network service. The mutual authentication here can be advantageously performed without transmitting passwords over the network. Kerberos, among other network authentication protocols rely on the avoidance of IP address conflicts in order to properly function. By using the service provider network interface connection on the tenant computer exclusively for all cloud provider initiated communication with such resource server, authenticating, inter-tenant IP address conflicts are prevented from undermining Kerberos.

Figure 2:
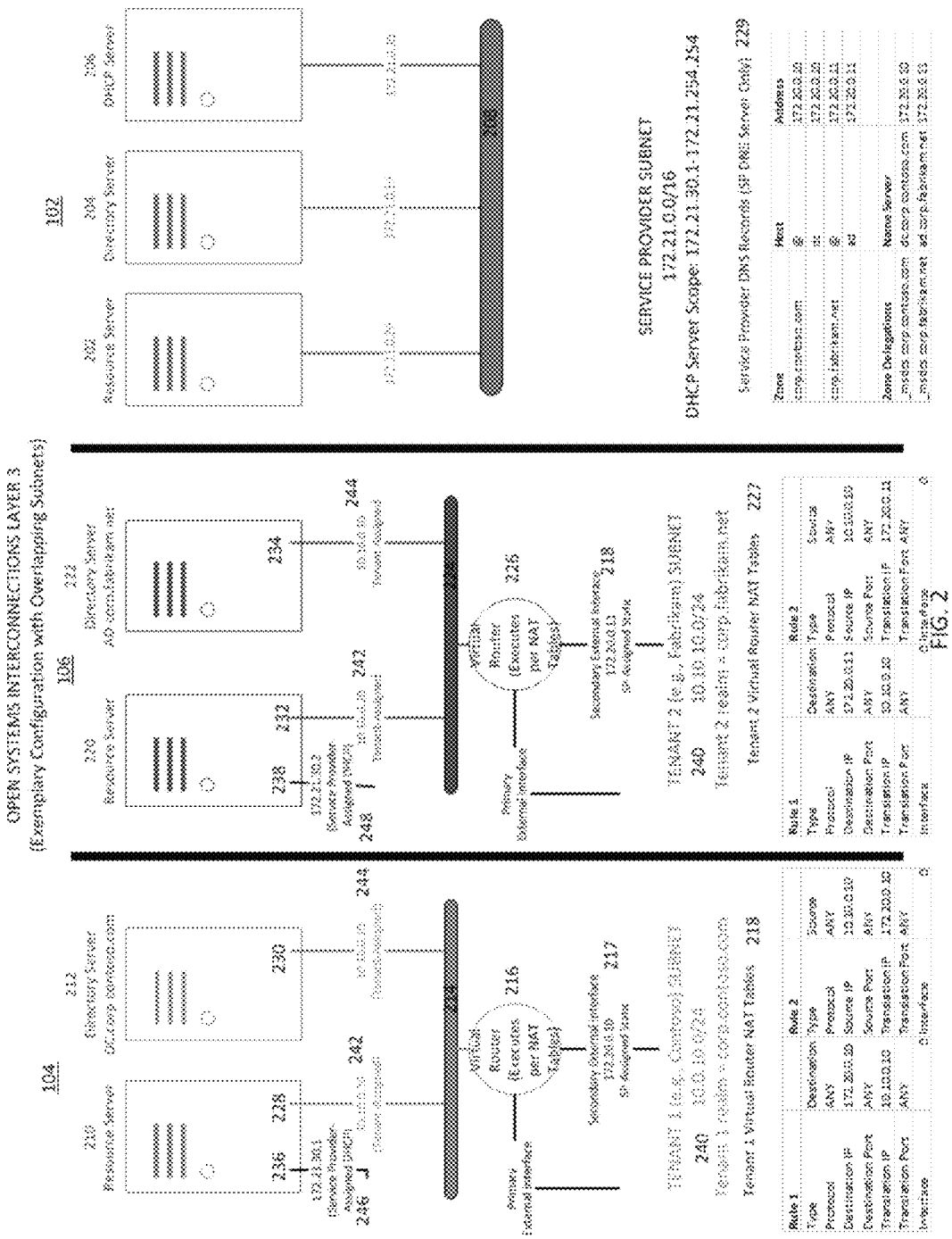
FIG. 2 illustrates a layer 3 networking architecture that shows IP address conflicts between two arbitrary tenants while avoiding having a tenant reconfigure the topology according to the preferences of the cloud service provider.

FIG. 2 illustrates a networking architecture that allows for IP address conflicts on a given tenant's virtual machine's primary network interface connection relative to any other tenant's primary network interface connection on any of such other tenant's virtual machines, thus avoiding having a tenant reconfigure the topology according to the preferences of the cloud service provider. The tenant, therefore, can provision their own virtual machines and manage their own Network without approval or guidance from the cloud service provider. The realm 102 can include a resource server 202, a directory server 204, a dynamic host configuration protocol (DHCP) server 206, and virtual local area network (VLAN)-backed distributed virtual port group 208. The realm 104 can include a resource server 210, a directory server (also referred to as DNS) 212, a virtual extensible local area network (VXLAN)-backed distributed virtual port group 214, and a virtual router 216 configured to perform routing based on network address translation (NAT) tables 218. The realm 106 can include a resource server 220, a directory server (also running the required Kerberos services) 222, a virtual extensible local area network (VXLAN)-backed distributed virtual port group 224, and a virtual router 226 configured to perform routing based on NAT tables 227. The term port group referred herein can also be called a virtual computer network switch. Note that the VXLAN backed distributed virtual port groups can be replaced with VLAN backed distributed virtual port groups. This implementation uses VXLAN for better scalability and to enable tenant's self-service provisioning of such port groups. Alternative implementations without VXLAN capabilities may use VLAN-backed port groups instead, and the network administrator of the cloud provider must assign a unique VLAN id to each such tenant port group.

The resource server 202 can provide network services to the realms 104 and 106. The directory server 204 can host the DNS records 229 to resolve tenant's computers using the service-provider assigned IP address. Some of the records 229, such as @ and "realm name" or DNS zone name are created during initial enrollment process. As tenant provisions virtual machines ("computers") throughout tenant's lifecycle, the DHCP server 206 can assign unique IP addresses to the second network interface connection of computers in realm 104 and the realm 106. The DHCP server 206 registers the A record for such IP Address assignment in service provider's DNS records 229 in the DNS zone corresponding to the tenant's realm name ("zone name" in DNS). The resource servers 210 and 220 can be operably coupled to the realm 102 to participate in Kerberos-authenticated network services with realm 102 using the second network interface connection.

The tenant's directory server 212 can access the authorized computer resources of the realm 102 using a routed network connection through virtual router 216 provided the virtual router 216 is programmed with the network address translation (NAT) rules defined in 218, and the directory server 222 can access the authorized computer resources of the realm 102 using a routed connection through virtual router 226 when the virtual router 226 is programmed with the NAT rules defined in 227. An administrator of tenant Contoso has administrator access to program virtual router 216, except for the service provider (SP)-assigned static interface (also referred to as a router external interface). An administrator of tenant Fabrikam has administrator access to program virtual router 226, except for the SP-assigned static interface (e.g., router external interface). The tenant directory servers 212 and 222 contain a conditional forwarder in their own DNS service that forwards/relays all DNS lookups associated with realm 102 to the service provider's directory server 204. NAT can be performed for only the directory servers 212 and 222, and is not required for the resource servers 210 and 220, thereby ensuring scalability (because every time a resource server is added, a NAT rule is not required). NAT rules are not specifically required for the directory server, however introducing a NAT router allows the directory server to use a single network interface connection, in order to comply with supported configuration requirements of some operating system vendors.

Among other virtual machines, the resource server 210 and the directory server 212 can be operably coupled to the VXLAN-backed distributed virtual port group 214 via network adapters 228 and 230, respectively. The VXLAN-backed distributed virtual port group 214 can be operably coupled to the virtual router 216, which can perform routing as per NAT tables 218. The resource server 220 and the directory server 222 can be operably coupled to the VXLAN-backed distributed virtual port group 224 via network adapters 232 and 234, respectively. The VXLAN-backed distributed virtual port group 224 can be operably coupled to the virtual router 226, which can perform routing as per NAT tables 227. Tenant 1 (Contoso) has control over the network adapters 228 and 230, and thus these network adapters are also referred to as tenant-controlled network adapters. Tenant 2 (Fabrikam) has control over the network adapters 232 and 234, and therefore these networks are also called tenant-controlled network adapters.

Figure 3:
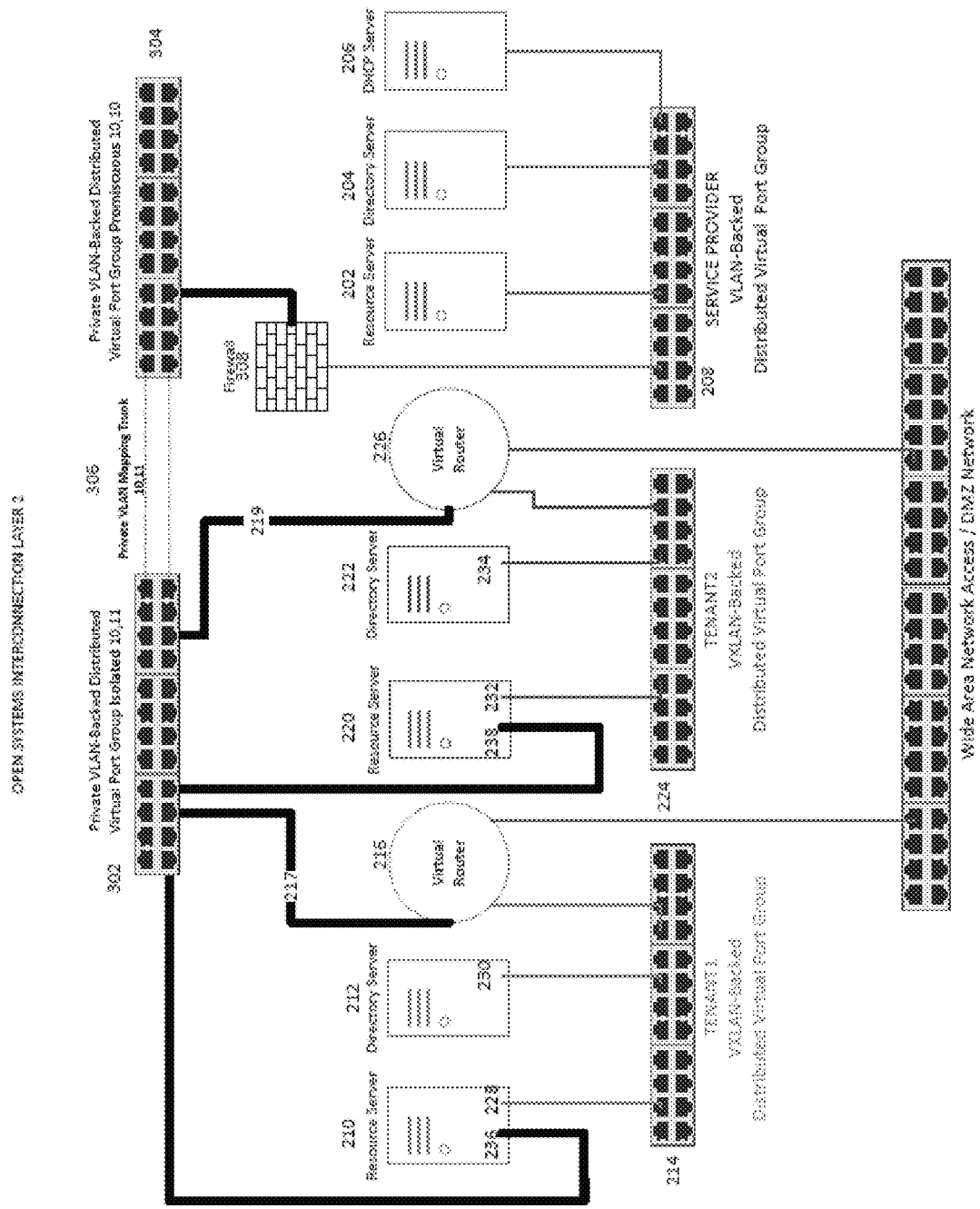
FIG. 3 illustrates the layer 2 networking architecture of FIG. 2 and additionally shows an infrastructure that the cloud service provider implements to access the cloud service provider controlled network adapters and avoid IP conflicts.

There can be situations where two or more tenants such as tenant 1 and tenant 2 pick by chance the same subnet. In FIG. 2, by random chance, tenant 1 and tenant 2 have picked on the same subnet (e.g., 10.0.10.0/24) 240, which can risk computers in realm 104 and computers in realm 106 to use the same IP addresses. FIG. 3 illustrates this IP address "conflict" as 228 has the same IP address as 232 and 230 has the same IP address as 234. As a result, the tenant-controlled network adapters 232 and 234 of the realm 106 uses the same IP addresses (e.g., 10.10.0.20 and 10.10.0.10, respectively) 242 and 244, respectively, as those used by the tenant-controlled network adaptors 228 and 230. To coexist with such IP address conflict, a second network adapter 236 can be inserted into each resource server (such as 210) and a second adapter 238 is inserted into the resource server 220. Each tenant cedes configuration of their resource servers' second adapter (such as 236 and 238) to the cloud service provider's DHCP Server 206. The resource server 210 can be connected to two networks—the network of tenant 1 as well as the network of the cloud service provider. The resource server 220 can also be connected to two networks—the network of tenant 2 and the network of the cloud service provider.

The service-provider-controlled network adapter 236 can be assigned an IP address 246, from a less commonly used RFC 1918 reserved subnet (e.g., 172.21.0.0/16), by the DHCP server 206. The service-provider-controlled network adapter 238 can be assigned an IP address (e.g., 172.21.30.2) 248 by the DHCP server 206. As the cloud service provider has control over the service-provider-controlled network adapters 236 and 238, the IP Addresses 246 and 248 assigned to the service-provider-controlled network adapters 236 and 238, respectively, can be different so that there is no IP address conflict between realms 104 and 106 as seen from the perspective of realm 102, thereby ensuring a secure IP address conflict-free distribution of network services by the cloud service provider to each tenant.

Because each of the servers ("computers") are virtual machines, the service-provider-controlled network adapters 236 and 238 can be implemented using virtual hardware thereby making the technology a configuration setting rather than requiring hardware purchase and installation, and thus easily scalable to any number of tenants (e.g., no physical network adapter need be installed into a physical computer as part of the resource server provisioning process). The service-provider-controlled network adapter 236 is largely transparent (e.g., invisible) to the other computers and DNS within the same realm 104. Similarly, the service-provider-controlled network adapter 238 can be invisible to the computers and DNS within the same realm 106. This transparency is achieved through DNS queries being handled by adapter 228 and 232 for each tenant's resource server. Because the DNS queries only resolve IP address on the tenant subnets for tenant's internal resources, all tenant internal traffic flows over adapters such as 228 and 232. However, when a DNS query is called for a resource in the service provider realm, the conditional forwarder on the respective tenant's directory server relays that request to the cloud service provider's directory server 204. Since the DNS query returns an IP address on the less commonly used service provider subnet 172.21.0.0/16, the computer opens the network connection for a session with such service provider service using the network adapter 236 or 238, respectively. Tenant 1 therefore may not need to make any changes, and may not need to register the service-provider-controlled network adapter 236 in the directory server 212. Tenant 2 similarly may not need to make any changes, and may not need to register the service-provider-controlled network adapter 238 in the directory server 222.

While the networking architecture shown in FIG. 2 describes NAT rules, in an alternate networking architecture, a second network adapter can be inserted in each directory server 212 and 222. In this scenario, no tenant virtual router is required and each tenant directory server 212 and 222 are configured similarly to a resource server in the same realm, for example resource servers 210 and 220 respectively. Because the directory servers 212 and 222 generally operate a DNS service, this second network adapter can necessitate enabling advanced settings in the operating system, which restrict the publication of the second network adapter's IP address in DNS. Additionally, it may be necessary to use a statically assigned IP address rather than one issued by the cloud service provider's DHCP server as DHCP may introduce stability issues with respect to the @ record in the cloud service provider's DNS records 229. When using a statically assigned IP address, use of IP Source Guard binds the IP address to the virtual MAC address associated with the second network interface connection, thus preventing denial of service attacks which would otherwise be a security risk associated with this type of static IP address assignment. Because vendors of some Operating Systems, such as MICROSOFT, may not provide technical support where multiple network adapters to be inserted in a directory server ("domain controller")—i.e. the design may not be validated or may "not be supported" by MICROSOFT. A virtual router approach can address original equipment manufacturer (OEM) supportability concerns.

FIG. 3 illustrates the networking architecture of FIG. 2 and additionally shows an infrastructure that the cloud service provider implements to access the service-provider-controlled network adapters 236 and 238 in order to work around the IP conflicts illustrated in FIG. 3. This infrastructure can include an interconnection network that can include a private VLAN-backed distributed virtual port group 302 of the type isolated, and another private VLAN-backed distributed virtual port group 304 of the type promiscuous. The private VLAN-backed distributed virtual port group 302 of the type isolated is also referred herein as the isolated port group 302, and the private VLAN-backed distributed virtual port group 304 of the type promiscuous is also referred herein as the promiscuous port group 304. The isolated port group 302 can communicate at layers 2 and above with (e.g., receive data or network packets from and send data or network packets to) only specifically authorized ports of the promiscuous port group 304. The promiscuous port group 304 can communicate at layers 2 and above with (e.g., receive data from and send data to) any port of the isolated port group 302. However, no port located on the isolated port group 302 can send or receive data with any other port on isolated port group 302. The isolated port group 302 can be operably coupled with the promiscuous port group 304 via a private VLAN mapping trunk 306.

This configuration can be used in both distributed virtual switches and physical switches. Distributed virtual switches running on the hypervisor provide better scalability and less provisioning overhead. In either case, the primary VLAN id is set as 10 and the secondary VLAN id is 11 (any two contiguous or noncontiguous unused VLAN ids may be selected for the ids). Therefore, the promiscuous private VLAN id is 10, 10 and the isolated private VLAN is 10, 11. This private VLAN mapping trunk can be expressed using the following CISCO sample switch configuration steps. This following configuration is one such configuration using a distributed virtual switch in a VMWARE environment where the underlying physical switches are not private-VLAN aware:

Define the Requisite VLAN IDs
vlan 10
private-vlan primary
private-vlan association 11
vlan 11
private-vlan isolated
Create the Port Group 304
port-profile type vethernet PROMISCUOUS_PROFILE_NAME
switchport private vlan mapping 10 11
switchport mode private-vlan promiscuous
no shutdown
state enabled
vmware port-group
Create the Port Group 302
port-profile type vethernet
switchport mode private-vlan host
switchport private-vlan host-association 10 11
no shutdown
state enabled
vmware port-group
Create the Private VLAN Mapping Trunk 306
port-profile type ethernet PROFILE_NAME
switchport mode private-vlan trunk promiscuous
switchport trunk allowed vlan 10-11
switchport private-vlan trunk allowed vlan 10-11
switchport private-vlan mapping trunk 10 11
no shutdown
state enabled DHCP Snooping can be implemented treating the promiscuous port group as the trusted DHCP interface for DHCP advertisement, and the isolated port group as untrusted for such DHCP advertisements and offers. Using the DHCP snooping table of IP Address to MAC address assignments, IP source guard can be enabled on the isolated port group to prevent denial of service attacks or the broadcast of a tenant-supplied static IP address on the second network interface connection (whether accidental or malicious). Man-in-the-middle and snooping attacks can be blocked by the nature of the isolated port group and do not require IP Source Guard to prevent. The use of Kerberos authentication provides additional protection against these types of attacks.

Virtual machines with network interface connections connected to port group 302 (such as those resource servers 210 and 220 and via their respective network interface connections 236, and 238) can communicate at layers 2 and above with service-provider servers (such as 202, 204, and 206) connected to the service provider VLAN-backed port group 208. The isolated port group 302 can facilitate layer 2 connectivity between a tenant directory server (such as 212 or 222) and the service-provider servers (such as 202, 204, and 206) connected to the service provider VLAN-backed port group 208. For example, in the case of directory server 212, traffic flows from the directory server 212 via network interface connection 230 into the tenant controlled VXLAN-backed distributed virtual port group 214, to the tenant-controller virtual router 216, where the traffic is translated via aforementioned network address translation rules. The translated traffic flows from the virtual router 216 to service-provider external network interface 217 into the private VLAN-backed distributed virtual port group of the type isolated at 302.

The private VLAN mapping trunk 306 carries this communication (preserving private-vlan enforcement) from the isolated port group 302 to the private VLAN-backed distributed virtual port group of the type promiscuous at 304. The promiscuous port group 304 can be operably coupled to the VLAN-backed distributed virtual port group 208 via a firewall 308. The end result is the secure flow of traffic from the directory server 212 to service-provider managed virtual machines within the service provider's Kerberos realm attached to the service provider VLAN-backed distributed virtual port group 208. Inverse communication from the service-provider managed virtual machines within the service provider's Kerberos realm attached to the service provider VLAN-backed distribute virtual port group 208 to the tenant directory server 212 is achieved by traveling the aforementioned path in reverse.

Tenant virtual machines similar to those 210 and 220 except in that they do not require service-provider initiated network communication from service provider virtual machines such as 202, 204, and 206, can still obtain those same network services without requiring a service-provider managed network adapter such as those 236 and 238. In this case, these tenant virtual machines requiring limited scope of tenant-initiated network services from the service provider can follow the same communication path as described for a tenant directory server such as those 212 and 222. However, this requires a masquerade network address translation rule on a tenant's virtual router such as those routers 216 and 226. Such masquerade network address translation rule is applied to traffic originating from a tenant's respective VXLAN-backed Distributed Virtual Port Group (such as those 214 or 224) when such traffic is leaving the tenant's virtual router's second external interface such as those external interfaces 217 or 219 that is operably coupled with the Private VLAN-backed distributed virtual port group of the type isolated 302.

As noted above with respect to FIG. 1, there exists a bidirectional trust relationship between realms 102 and 104, and another trust relationship between realms 102 and 106. For a bidirectional trust relationship between realms 102 and 104, the directory server 204 can be operably coupled to the directory server 212 in a bidirectional manner via the tenant-controlled network adapter 230, the VXLAN-backed distributed virtual port group 214, the virtual router 216, the isolated port group 302, the private VLAN mapping trunk 306, the promiscuous port group 304, the firewall 308, and the VLAN-backed distributed virtual port group 208. For a bidirectional trust relationship between realms 102 and 106, the directory server 204 can be operably coupled to the directory server 222 in a bidirectional manner via the network adapter 234, the VXLAN-backed distributed virtual port group 224, the virtual router 226, the isolated port group 302, the private VLAN mapping trunk 306, the promiscuous port group 304, the firewall 308, and the VLAN-backed distributed virtual port group 208.

Figure 4:
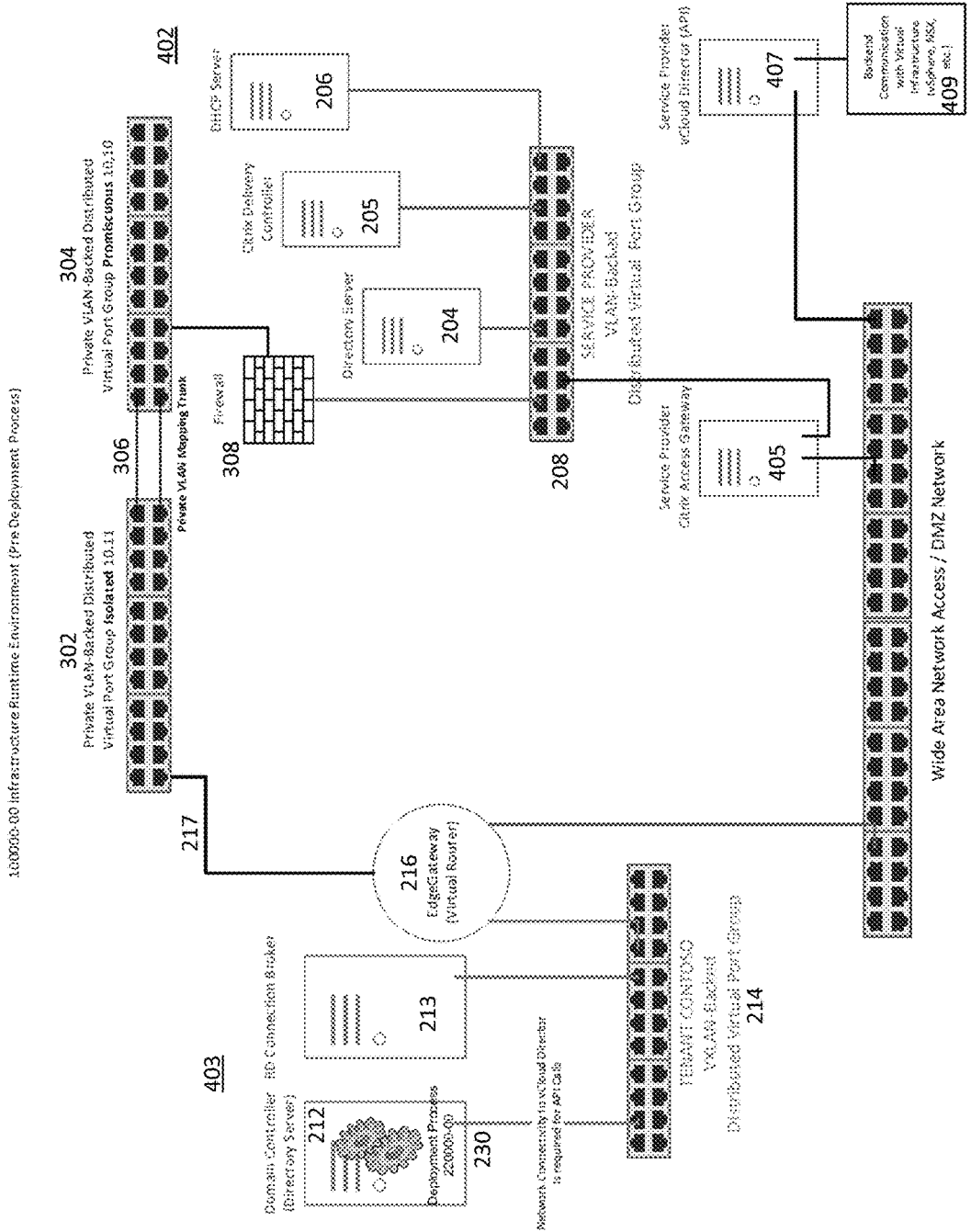
FIG. 4 illustrates an exemplary runtime environment infrastructure.

FIG. 4 illustrates an exemplary runtime environment infrastructure 100000-00. While the term realm is used throughout, as described above, it should be understood the realm can be a MICROSOFT Active Directory Forest root domain. The infrastructure 100000-00 can include a cloud service provider realm 402 and tenant realm 403 that can be operably coupled. The tenant realm 403 can include the directory server 212 (e.g., domain controller) and optionally, a remote desktop (RD) connection broker 213 that are operably coupled to virtual ports of the distributed virtual port group 214. The directory server 212 can execute a deployment process (e.g., deployment wizard process 220000-00 described in FIG. 10). The distributed virtual port group 214 can operably couple with the private VLAN-backed distributed virtual port group 302 via the virtual router 216 (e.g., EdgeGateway). The cloud service provider realm 402 can include the directory server 204, CITRIX delivery controller 205 and DHCP server 206 that are distributed virtual port group 208 can operably couple to virtual ports of the distributed virtual port group 208. They operably couple with the private VLAN-backed distributed virtual port group 304 via a firewall 308. Tenant realm 403 can access data in the Cloud service provider realm 402 (e.g., data stored in directory server 204) via the private port group 304, private VLAN mapping trunk 306, isolated port group 302, firewall 308 and VLAN backed distributed virtual port group 208. A service provider CITRIX access gateway 405 can be operatively coupled between service provider VLAN-backed virtual distributed port group 208 and the WAN access/DMZ network. A service provider vCloud director 407 can be operably coupled to the WAN Access/DMZ network and a backend communication with virtual infrastructure 409.

CITRIX Access Gateway 405 can include an SSL/TLS proxy for CITRIX ICA connections. The proxy can encapsulates the remote display protocol (ICA) into TLS to create a secure connection between the remote user and an application server (e.g., application server 207 described with respect to FIG. 5 below). The proxy can also eliminate a need for network address translation. CITRIX Access Gateway 405 can include Secure Gateway, NetScaler Gateway, Access Gateway, SSL relay, and the like. These can run as software inside a virtual machine, software on a WINDOWS operating system, and/or as a physical hardware appliance. MICROSOFT provides a similar technology for the RDP protocol, known as Remote Desktop Gateway.

vCloud Director 407 can include an internet-facing tenant control panel and API for managing Infrastructure as a Service running the VMware vSphere virtualization platform. vCloud Director can delegate control of pools of IaaS resources (such as virtualized network, memory, storage, and data processing) to tenants, maintaining logical isolation of tenant resources, while masking access to and visibility of the physical hardware components that the tenants share.

Backend communication with virtual infrastructure 409 can include a VMware vSphere (or like platform) deployment with VXLAN capability. The vSphere deployment can include a Storage Area Network, multiple clustered ESXi servers, a vCenter server and associated database, and physical network switches. The vSphere platform can enable the creation of virtual machines, as well as the portability of such virtual machines between physical hardware resources.

Figure 5:
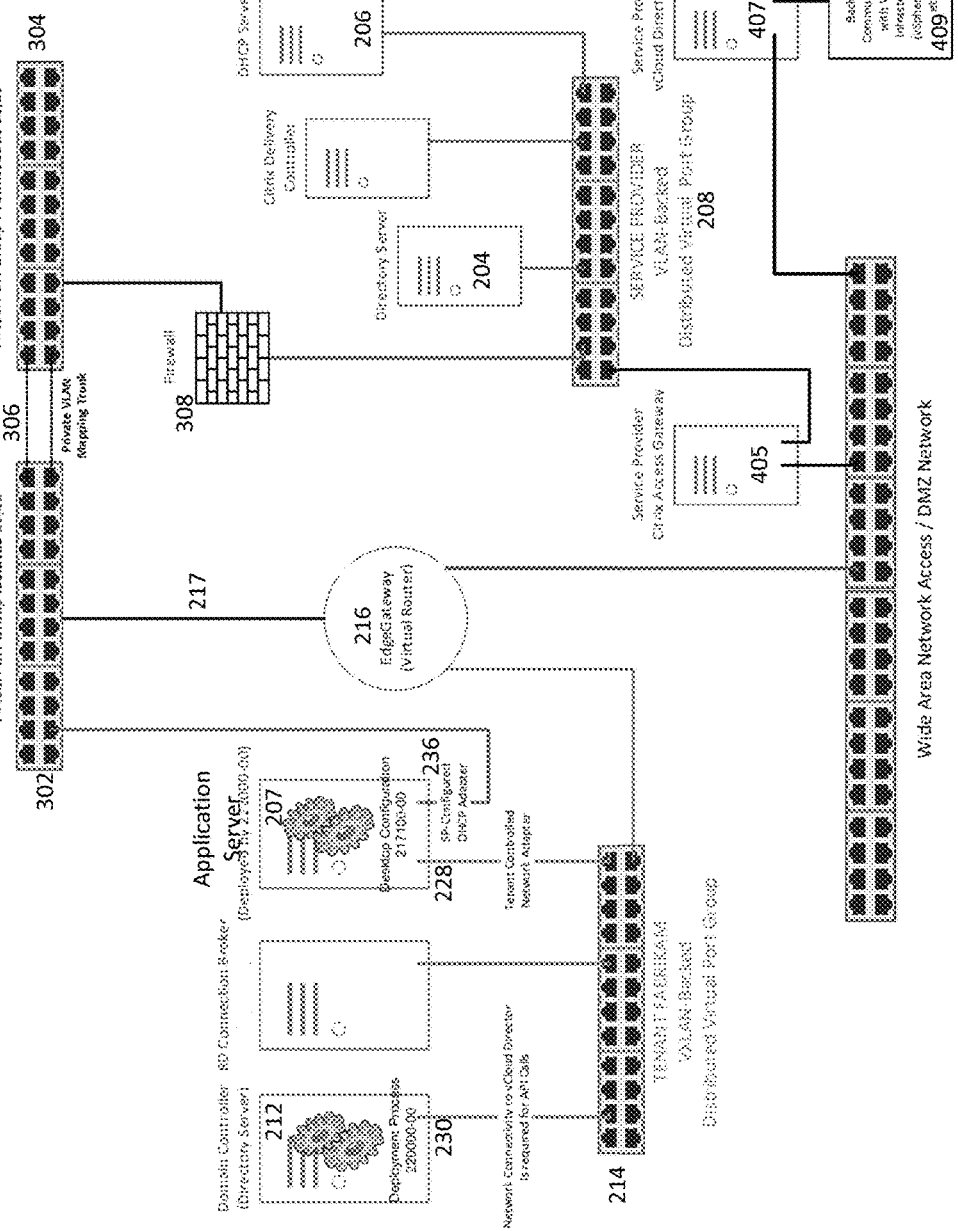
FIG. 5 illustrates an exemplary runtime environment infrastructure that includes an application server.

FIG. 5 illustrates an exemplary runtime environment infrastructure (e.g., a post-deployment recompose existing vCloud Director VApp in a tenant's private Domain) that includes an application server 207. The application server 207 can be instantiated, for example, by a deployment wizard described in FIG. 10. The application server 207 can be operably coupled to the distributed virtual port group 214 via network adapter 228 (which can be controlled by the tenant), and to distributed virtual port group 302 via network adapter 236 (e.g., service provider (SP) configured DHCP adapter).

Figure 6:
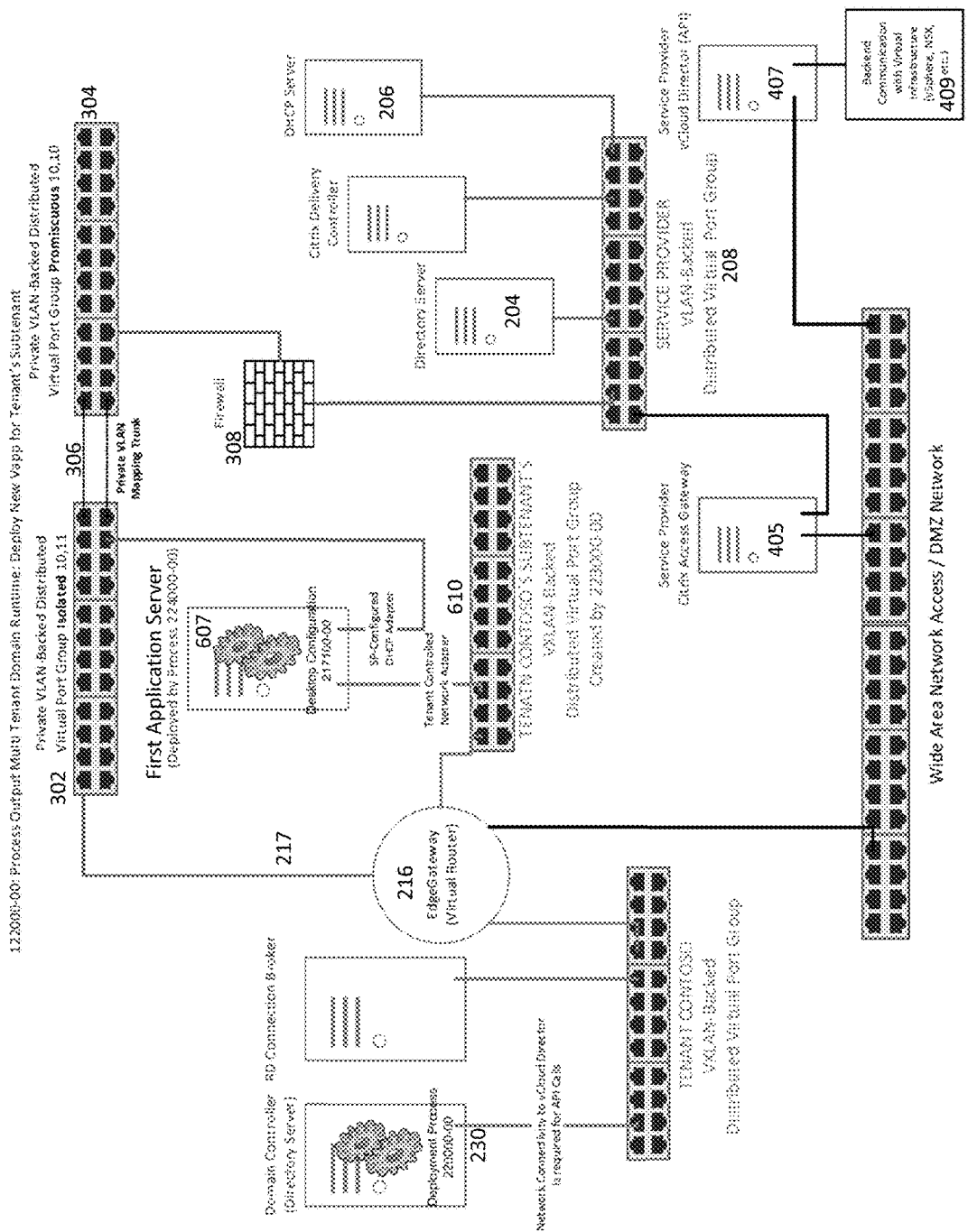
FIG. 6 illustrates an exemplary runtime environment infrastructure that includes an application server.

FIG. 6 illustrates an exemplary runtime environment infrastructure (e.g., a post-deployment instantiated vCloud Director VApp for a multi-tenant domain) that includes an Application server 607. FIG. 6 illustrates that tenants can have subtenants. The Application server 607 can be instantiated, for example, by the method described in FIG. 17. The Application server 607 can operably couple to a tenant VXLAN-backed distributed virtual port group 610 via a network adapter. The network adapter can be controlled by the tenant. The Application server 607 can also operably couple to a private VLAN-backed distributed virtual port group via a network adapter (e.g., SP-configured DHCP adapter). This process output is desirable for situations whereby a parent tenant requires the ability to deploy a Application Server for a child tenant (subtenant) from inside the parent tenant's own realm.

Figure 7:
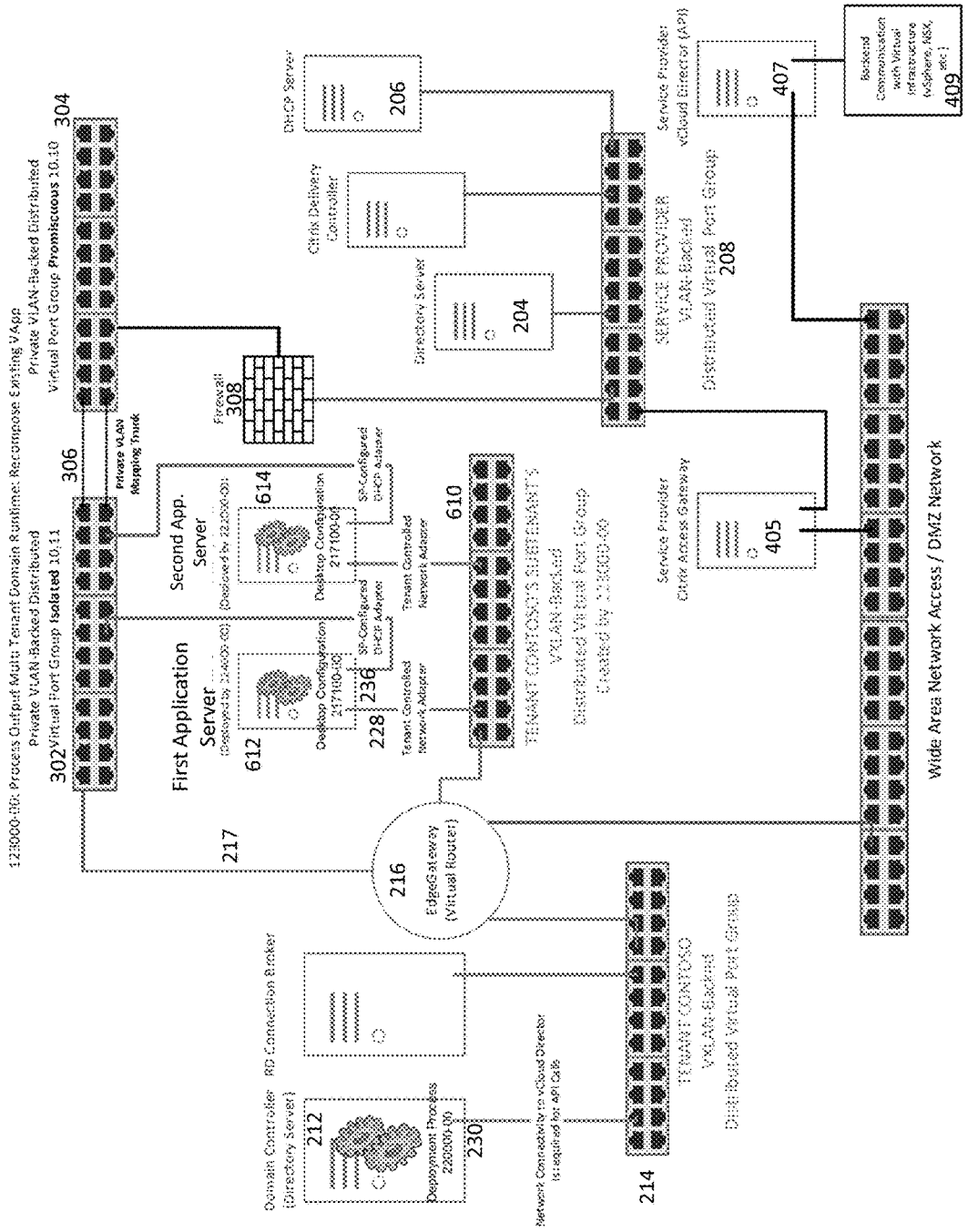
FIG. 7 illustrates an exemplary runtime environment infrastructure that includes an application server.

FIG. 7 illustrates an exemplary runtime environment infrastructure (e.g., post-deployment recompose VApp for a multi-tenant domain) that includes Application servers 612 and 614. The Application servers 612 can be instantiated, for example, by the VApp instantiation method described in FIG. 17. The Application servers 614 can be instantiated, for example, by recomposing existing VApp as described in FIG. 15. The Application servers 612 and 614 can operably couple to the tenant distributed virtual port group 610 via network adapters that can be controlled by the tenant. The Application servers 612 and 614 can also operably couple to a private VLAN-backed distributed virtual port group via SP-configured DHCP adapters. This process output is desirable for situations whereby a parent tenant requires the ability to add additional Application Servers for a child tenant (subtenant) from inside the parent tenant's own realm.

Figure 8:
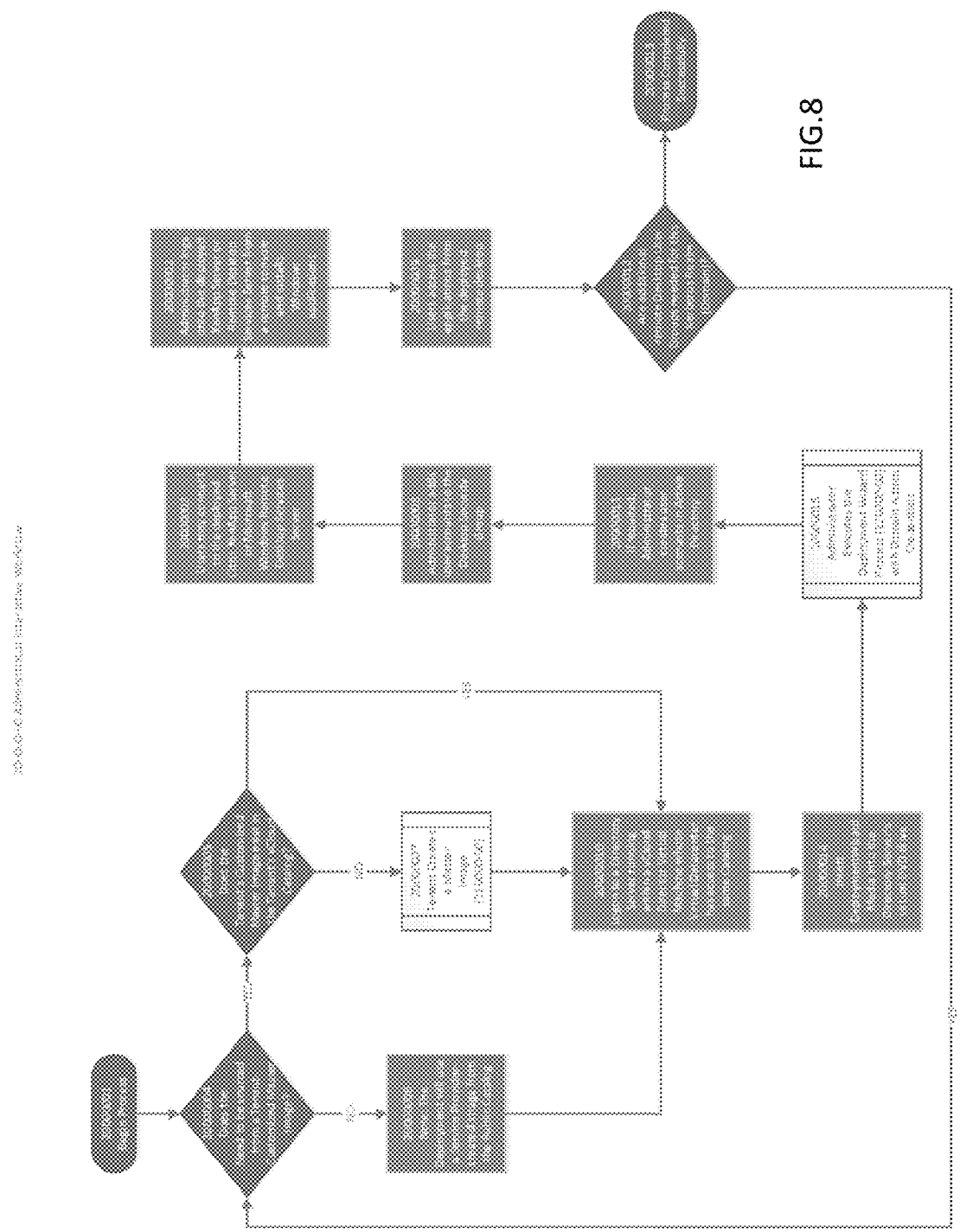
FIG. 8 illustrates an exemplary method of administrator interactive workflow.

FIG. 8 illustrates an exemplary method of administrator interactive workflow process illustrating overall workflow for a tenant to create and configure an application server within the runtime environment described in FIG. 4. The process begins at 20000001. At 20000004, the need for sourcing the process from a tenant customized master image can be determined. If the decision is affirmative, at 20000005, it can be determined whether the tenant's customized master image exists in the tenant's vCloud catalog. The catalog referred here is an allocation of data storage on the cloud service provider's IaaS, which stores images or templates of virtual machines, as well as ISO Images of software applications. These catalogs are accessible to the tenant, and the tenant can load these catalog stored virtual machine images directly into or connect tenant's pools. Tenant can similarly connect catalog stored ISO images of software applications to tenant's virtual machines through a virtual DVD method (such method is common to all hypervisors). If the answer to the determination at 20000005 is affirmative, at 20000010, the workflow process can involve logging into a directory server which can be running within a vCloud director virtual machine. The vCloud director virtual machine can include a virtual datacenter that can access the tenant's vCloud catalog. If the answer to the determination at 20000005 is negative, a master image is created (e.g., as described in FIG. 9) which can be followed by step 20000010 described above.

Alternately, if the determination at 20000004 is negative, at 20000006, a service provider-created image from the PublicCatalog can be used for sourcing the process. This can be followed by step 20000010 described above. At 20000014, DeploymentWizard media is inserted into the directory server's virtual DVD drive. At 20000015, deployment wizard process is executed with domain administration credential. For example, the deployment wizard process can be executed as described in FIG. 10. At 20000011, user account in active directory is created (e.g., by the administrator). At 20000008, user account can be added to the desktop security group. At 20000003, connection to the deployed CITRIX XENAPP server or MICROSOFT WINDOWS remote desktop services server can be established. At 20000002, the workflow process can involve logging onto the deployed XENAPP server or Remote Desktop services server from a remote console. Additionally, WINDOWS applications are installed. At 20000009, the applications from the deployed remote desktop can be remotely accessed by end users through the service-provider managed CITRIX access gateway 405, or an alternative VPN method provided by the tenant. At 20000012, it can be determined whether additional remote desktop user groups are needed for an associated Keberos realm. The Keberos realm can be the tenant's WINDOWS Domain associated with the domain controller running the Deployment Wizard Process. If the determination is negative, at 20000013, the exemplary administrator workflow method can be considered to be completed. If the determination is affirmative, 20000004 can be repeated. Steps 20000001 to 2000013 can also be performed by an administrator associated with the service cloud provider. The service cloud provider can use the process described in FIG. 9 to develop general images (e.g., templates) that can be made accessible to or shared with tenants in a read-only format. This can save tenant time, and the tenant can create custom images from scratch, or can create child images from these service-provider shared parent images. This approach can also save time.

Figure 9:
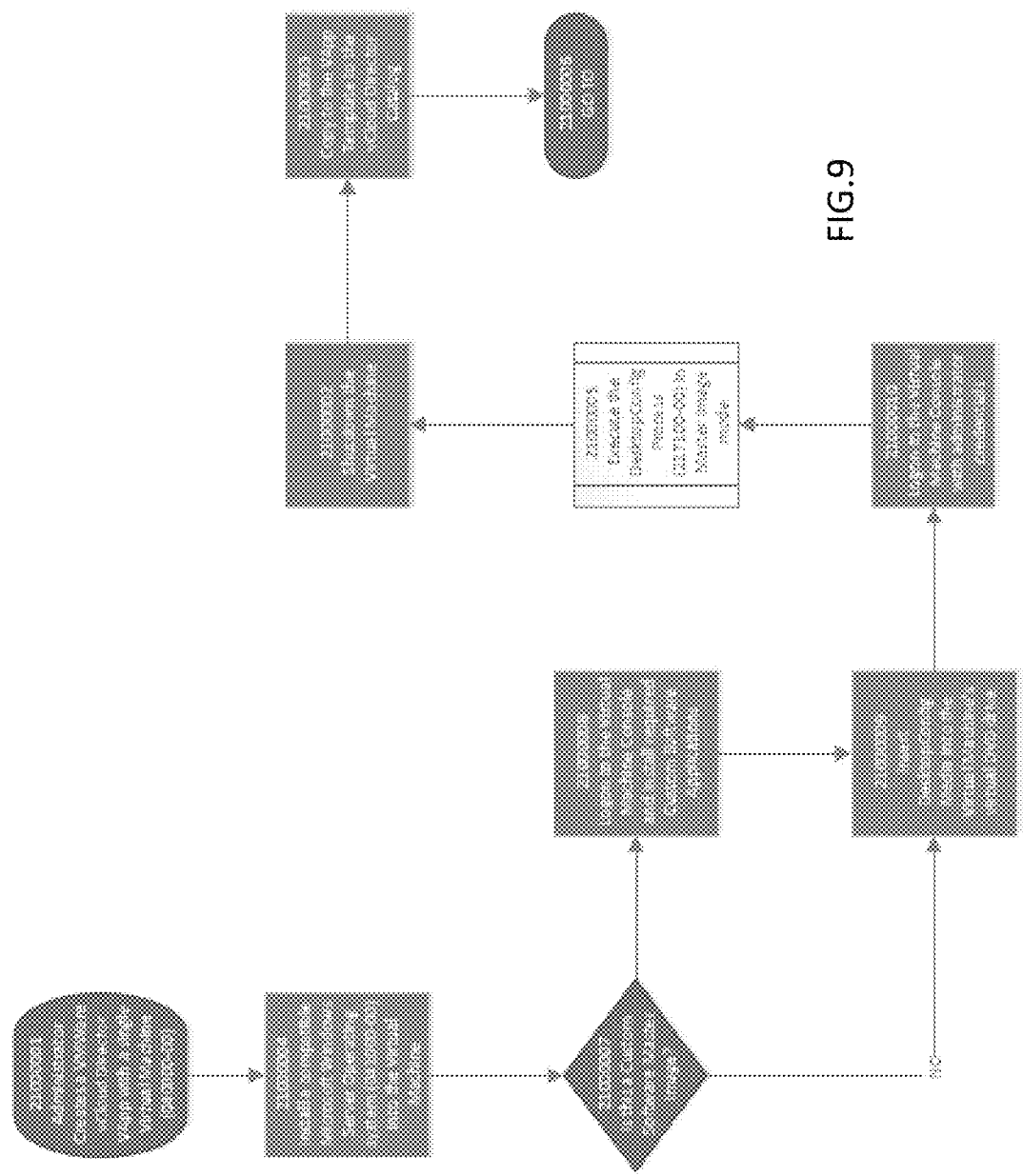
FIG. 9 illustrates an exemplary method of creation of a master image in the administrator interactive workflow described in FIG. 8.

FIG. 9 illustrates an exemplary method of creation of the master image in the administrator interactive workflow described in FIG. 8. At 21000001, a VMWare vCloud director VApp with a single virtual machine can be created. At 21000004, a compatible MICROSOFT WINDOWS server operating system can be installed into the virtual machine. At 21000007, it can be determined whether the installed compatible MICROSOFT WINDOWS server operating system is a custom software master image. If the determination is affirmative, at 21000008, the virtual machine console can be logged into, and related custom software applications can be installed. If the determination at 21000007 is negative, or after step 21000008, DesktopConfig Media can be inserted into the virtual machine's virtual DVD drive. At 21000010, the virtual machine console can be logged into with administrator credentials. At 21000005, DesktopConfig process can be executed in master image mode (e.g., as described in FIG. 21). At 21000002, the virtual machine can be shutdown. At 21000003, VApp template can be copied to the vCloud director catalog. At 21000006, the creation of master image can proceed to 20000010 in FIG. 8.

Figure 10:
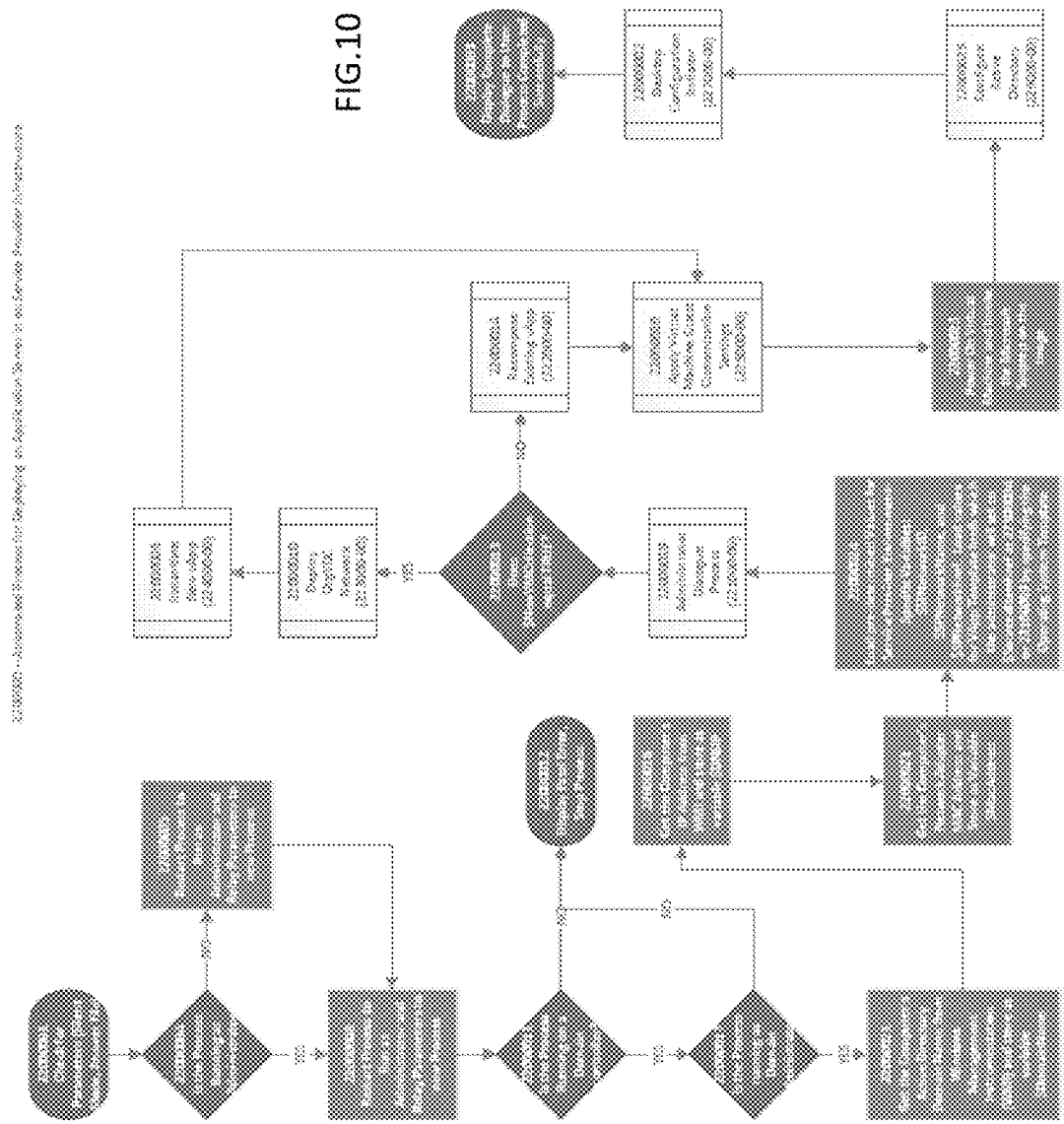
FIG. 10 illustrates an exemplary automated method of deploying an application server on service provider infrastructure in the administrator interactive workflow described in FIG. 8.
Figure 65:
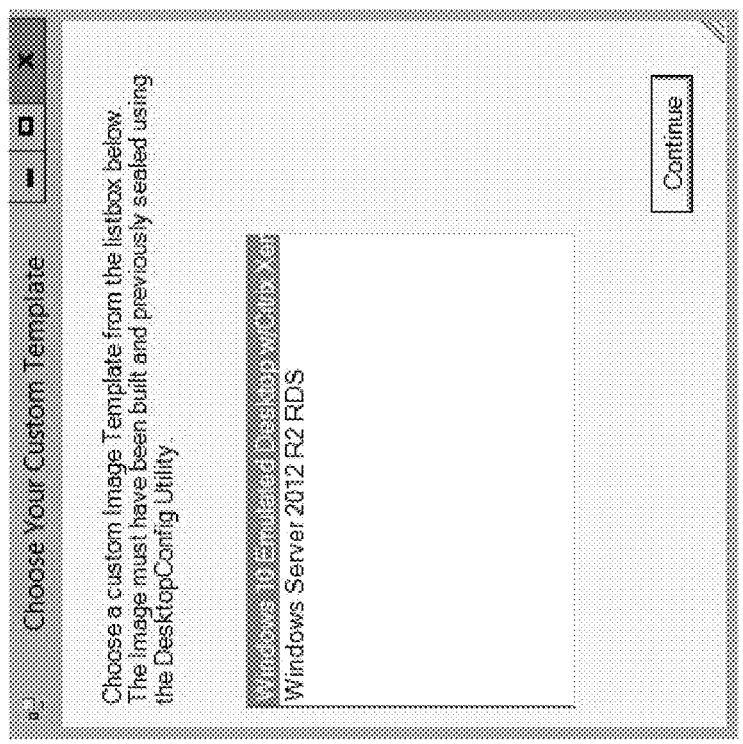
FIG. 65 illustrates another exemplary window of the deployment wizard dialogue box.

FIG. 10 illustrates an exemplary automated process of deploying an application server on service provider infrastructure in the administrator interactive workflow described in FIG. 8. At 22000001, parameters (e.g., silent mode, answer file) can be checked. At 22000004, it can be determined whether the automated process is running as administrator. If the determination is negative, at 22000005, the automated process can be restarted to run as administrator and relay parameters to a new process. At 22000011, it can be determined whether the automated process is running on a domain controller. If the determination is affirmative, at 22000017, it can be determined whether the automated process is running as domain administrator. If the determinations at steps 22000011 or 22000017 are negative, a fatal error message can be displayed and the automated process can be stopped. If the determination at 22000017 is affirmative, at 22000021, computer's (e.g., Domain Controller/Directory Server) active directory domain name from WINDOWS management instrumentation (WMI) can be received and stored as a variable $DomainName. At 22000016, the computer's IP address can be received from WMI and stored as a variable $DNSIP. At 22000022, the computer's network adapter MAC address can be received and stored as variable $MacAddress. At 22000024, the process can load pre-determined universal values for the Service Provider's Environment-Specific variables, including vCloud Director API values ($SPNetworkName, $SPNetworkID, and $SPNetworkhref) to identify and operably couple with the Service Provider Interconnect Network (as shown for example in FIG. 3 at 302). At 22000024, the process can additionally load the possible values for the API's hyperlink reference to identify all possible VApp Template sources in the Service Provider's Catalog as well as the Tenant's Catalog. The Canonical Names ("Operating System Template Names") associated with these href values, are presented to the administrator (For Example in FIG. 36, 37, or 65) and set the value for $SourcedItemhref. At 22000019, an administrator dialog process can be initiated (e.g., as described in FIG. 11). At 22000013, it can be determined whether $NewVMCollection has a predetermined value (e.g., "True"). If the determination at 22000013 is negative, existing VApp can be recomposed (e.g., as described in FIG. 15). If the determination at 22000013 is affirmative, at 22000010, OrgVDC network is deployed (e.g., as described in FIG. 16). At 22000006, New VApp can be instantiated (e.g., as described in FIG. 17). After 22000014 or 22000006, at 22000020, virtual machine guest customization settings can be applied (e.g., as described in FIG. 18). At 22000023, virtual machine can be powered on and MICROSOFT Sysprep on the image can be invoked. Creating a master image can require that the VMware Tools software be installed into that image. Because the Instantiated application server can be a clone (copy) of that master image, the clone can also contain the VMware tools. The sysprep can be invoked by passing an answer file through the VMware Virtual Machine Communications Interface (VMCI) Driver. Therefore, the process can invokes Microsoft Sysprep by calling on this VMWare capability through the vCloud Director API when the virtual machine is powered on for the first time. The answer file can be composed from the XML guest customization parameters per FIG. 43 or 44, depending on the deployment type.

Figure 19:
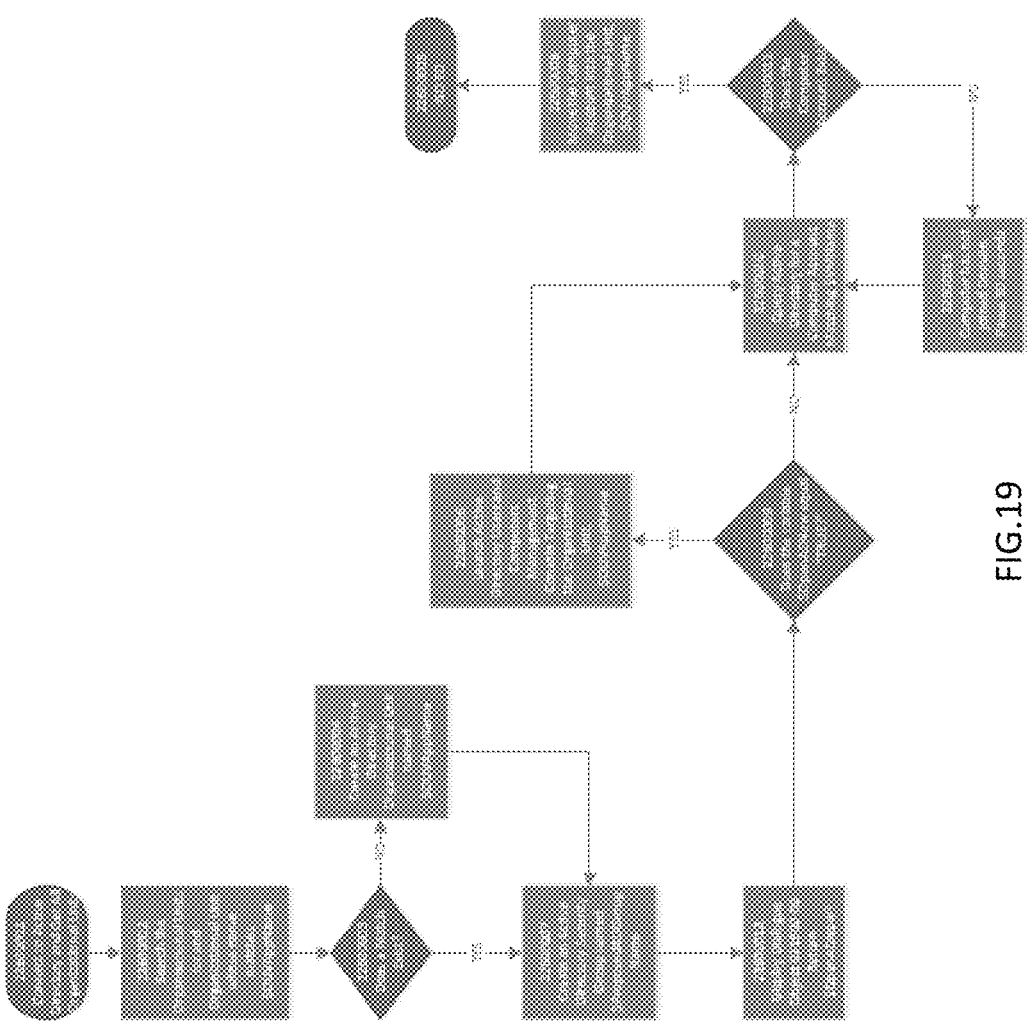
FIG. 19 illustrates an exemplary method for configuring active directory sub process for the automated method described in FIG. 10.

At 22000025, active directory can be configured (e.g., as described in FIG. 19). At 22000002, desktop configuration process can be initiated (e.g., as described in FIG. 20). At 22000003, it can be indicated that the automated process of deploying the application server is complete. In some implementations, process 220000 may be run in parallel to instantiate and configure multiple application servers. In addition, process 220000 may be initiated using an initiator, answer file, other parent process, and the like.

Figure 11:
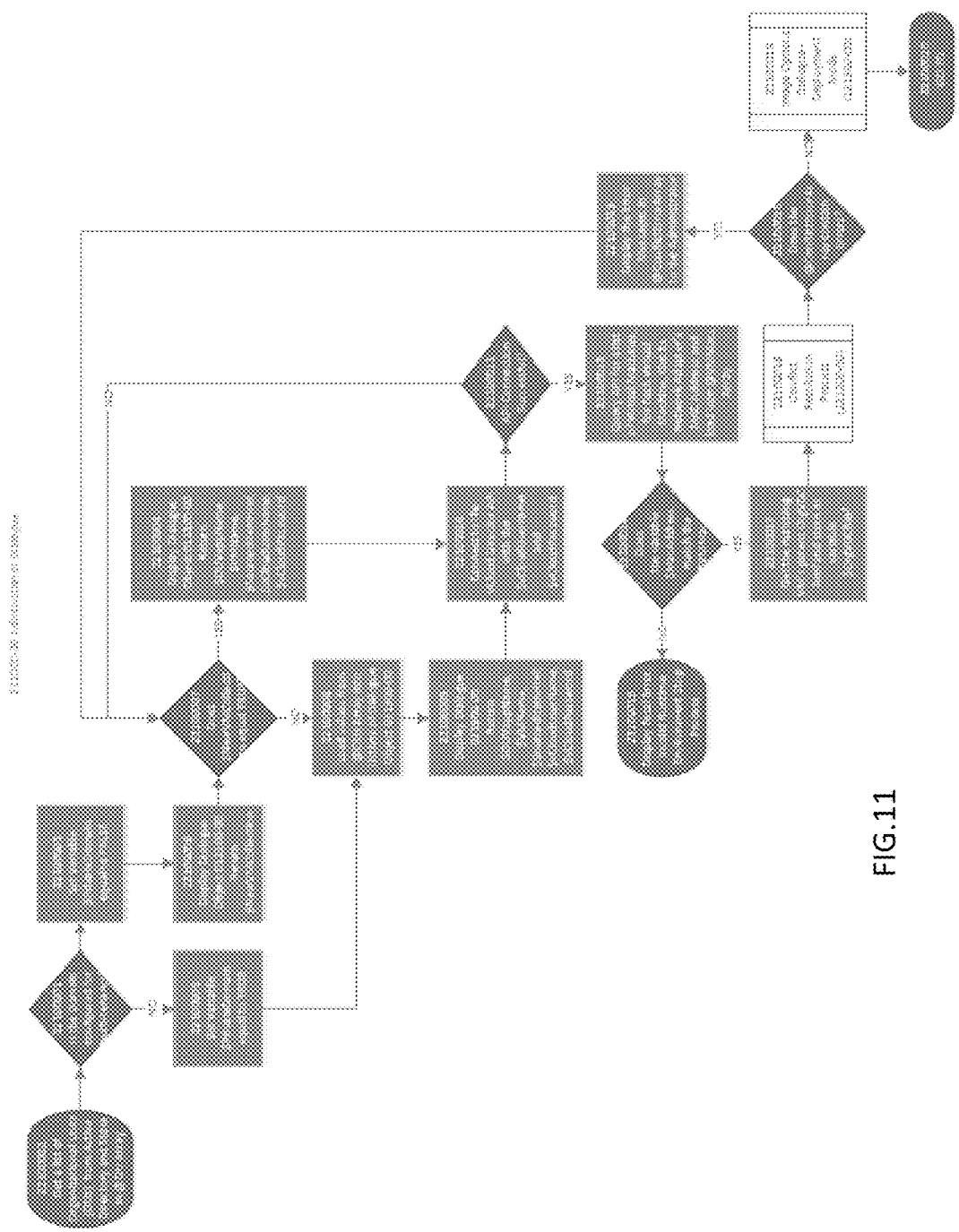
FIG. 11 illustrates an exemplary administrator dialogue process for the automated method described in FIG. 10.

FIG. 11 illustrates an exemplary administrator dialogue process for the automated process described in FIG. 10. At 22100002, a list of organizational units (OUs) from active directory and store in OU array can be received. At 22100001, it can be determined whether the domain (e.g., domain (or realm) of a tenant) is configured for multi-tenancy. For example, in multi-tenant system, some tenants of the Cloud Service Provider may setup domains (realms) which contain sub tenants of the tenant. For example, a business engaged in providing Software Services, or Information Technology Services, may choose to deploy a domain on the Service Provider's Infrastructure, whereby said business will create a service offering to their own customers, thus requiring multi-tenancy capability. The parent tenant can create dedicated port groups for each sub tenant to ensure network isolation between tenants. The deployment wizard process is capable of detecting whether or not a (parent) tenant's domain is configured for such multi-tenancy, and thus can deploy application servers for subtenants in that type of security context.

Figure 35:
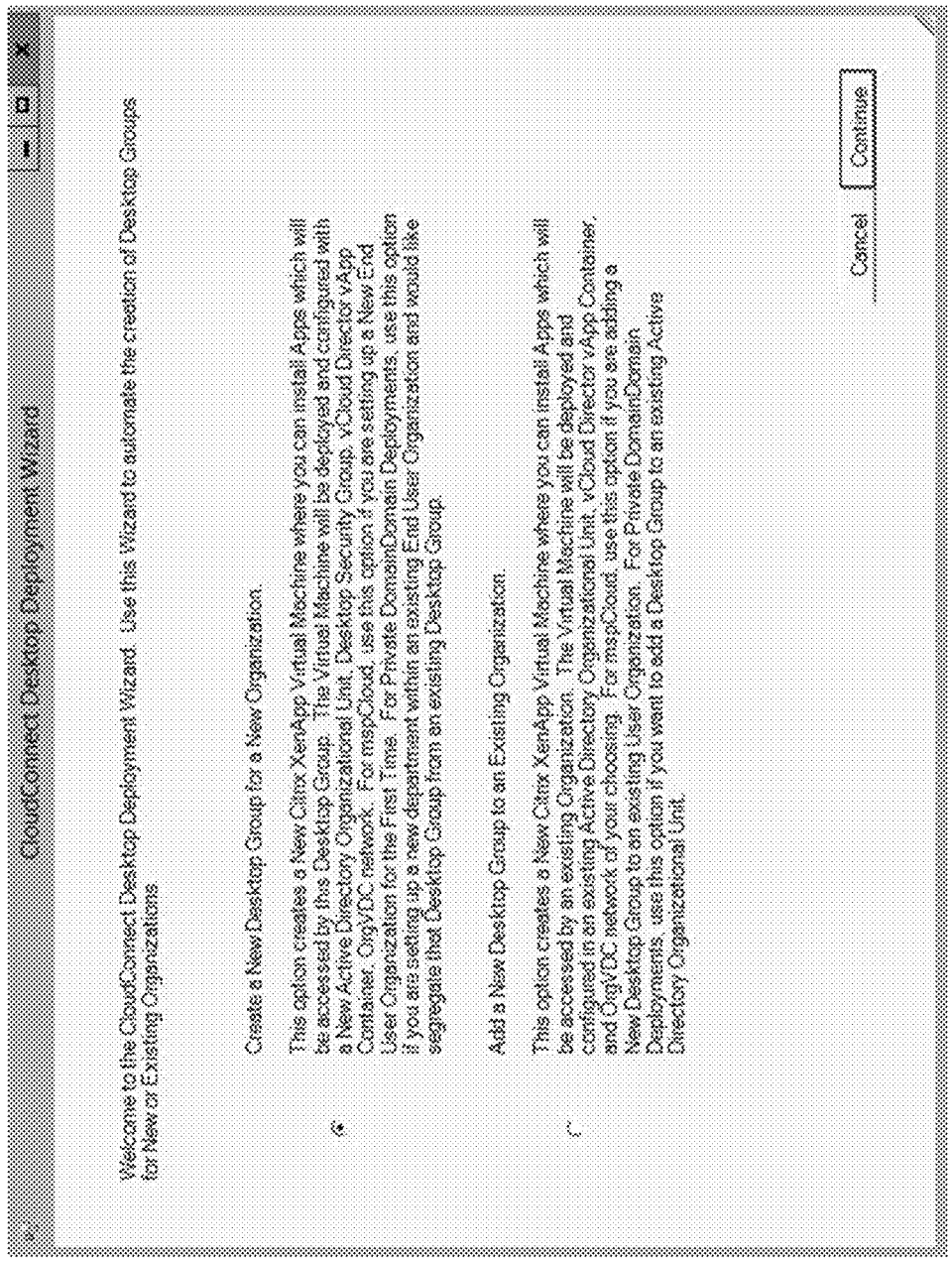
FIG. 35 illustrates an exemplary window of deployment wizard dialogue box.
Figure 36:
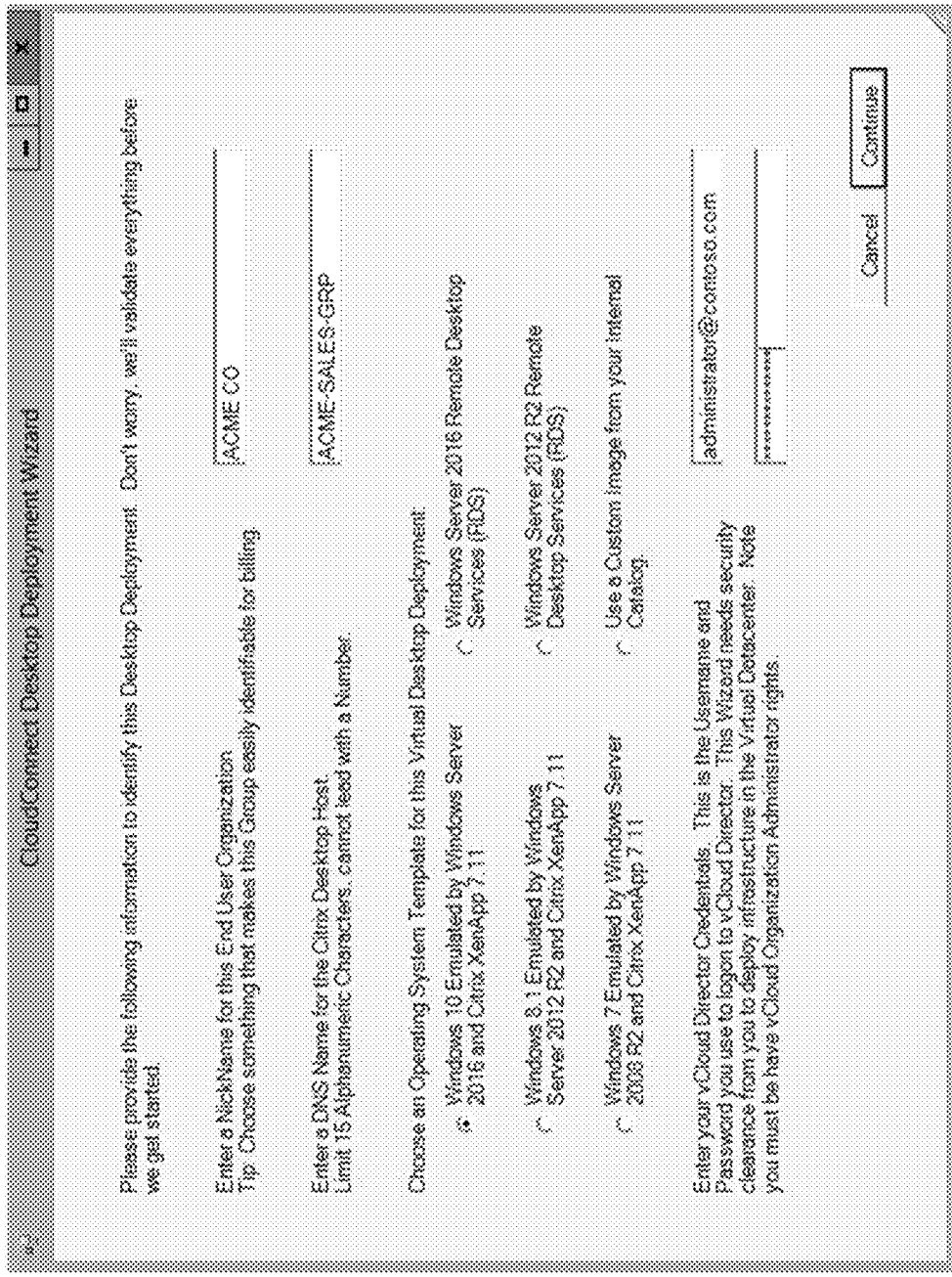
FIG. 36 illustrates another exemplary window of the deployment wizard dialogue box.
Figure 37:
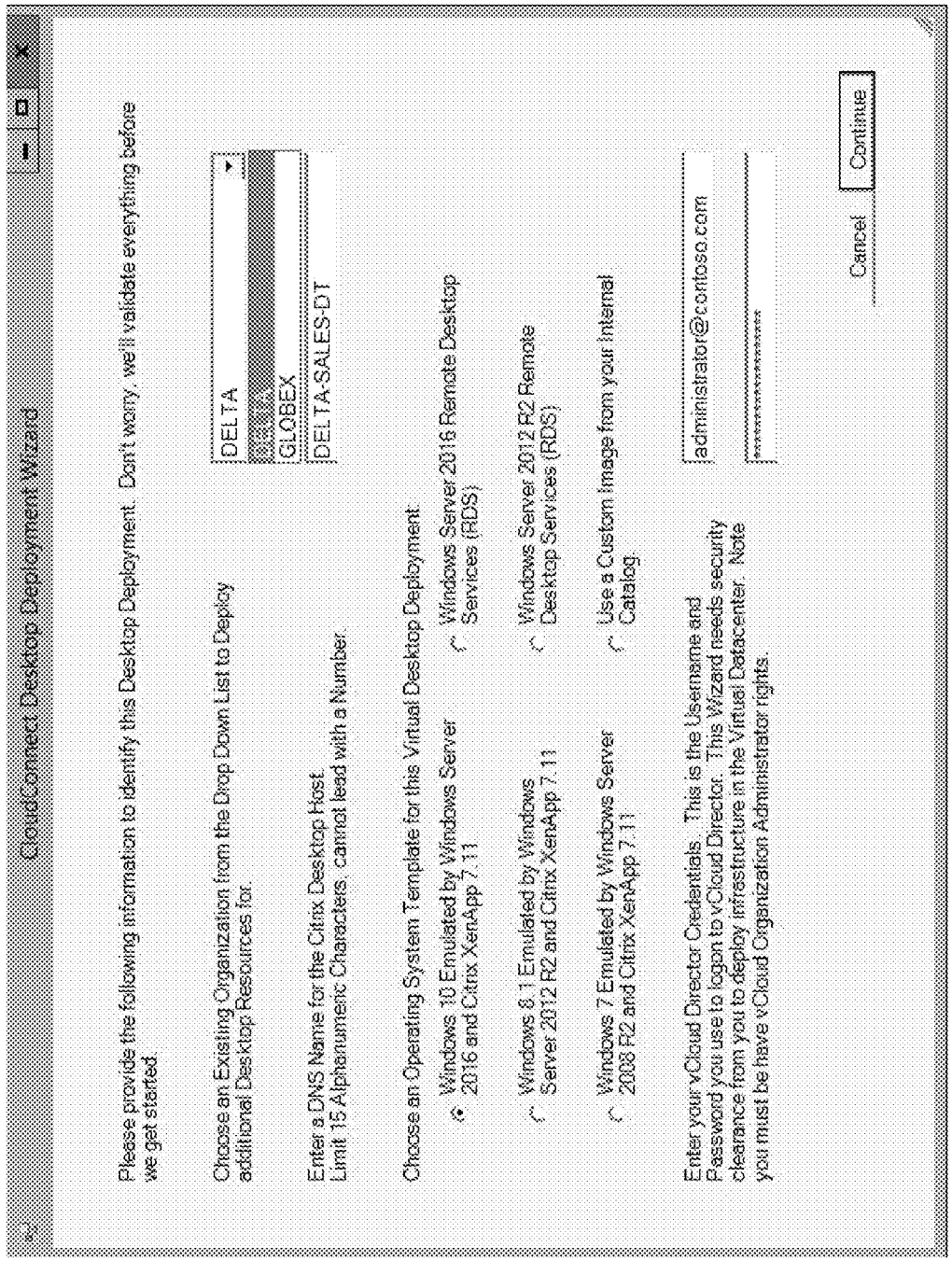
FIG. 37 illustrates another exemplary window of the deployment wizard dialogue box.

If the determination at 22100001 is negative, at 22100005, value of variable $PrivateDomain is set to a predetermined value (e.g., "True"). If the determination is affirmative, at 221000003, variable $PrivateDomain is set to a predetermined value (e.g., "False"). At 22100006, dialogue object (e.g., dialogue object 011100-00 in FIG. 35) can be displayed, and $NewVMCollection can be returned. At 22100007, it can be determined whether variable $NewVMcollection has a predetermined value (e.g., "True"). If the determination is affirmative, at 22100004, variables returned from Dialogue Object 011200-00, which is illustrated in FIG. 36, (the variables can include for example $OUVappName, $VMName, $SourcedIterHref, $vCloudPassword, $vCloudUsername etc.) can be displayed. An exemplary dialogue object 011200-00 has been shown in FIG. 37. If the determination at 22100007 is negative or after 22100005, at 22100008, values from @OUs array can be loaded to listbox of Dialogue Object 011300-00 (e.g., dialogue box shown in FIG. 38). At 22100009, variables returned from Dialogue Object 011300-00 (e.g., $OUVappName, $VMName, $SourcedItemHref, $vCloudPassword, etc.) can be displayed. After 22100004 or 22100009, at 22100010, vCloud Director API can be connected by using $vcloudUsername and $vCloudPassword. At 22100011, it can be determined whether connection to the vCloud Director API can be successfully established. If the determination is negative, 22100007 can be repeated. If the determination is affirmative, at 22100012, the vCloud Director API can be queried for a list of virtual machines. For each virtual machine, the corresponding network adapter's MAC address can be obtained and loaded into @VMMacs array. At 22100014, it can be determined whether the variable $MacAddress matches an address in the @VMMacs array. If the determination is negative, a message stating that a fatal error due to invalid runtime environment can be displayed and the administrator dialog process can be terminated. If the determination is affirmative, at 22100017, OrgVDC href for the virtual machine corresponding to the matched $MacAddress can be obtained and stored as a variable $OrgVDChref. At 22100018, a conflict resolution process as described in FIG. 12 can be carried out. After the conflict resolution process, at 22100016, it can be determined whether @ConflictError array contains errors. If the determination is affirmative, at 22100013, error messages in @ConflictError array can be displayed to the administrator the step 22100007 can be repeated again. If the determination is negative, dialogue-deployment mode described in FIG. 14 can be carried out. At 22100020, the administrator dialogue process proceeds to 22000013 of FIG. 10.

Figure 12:
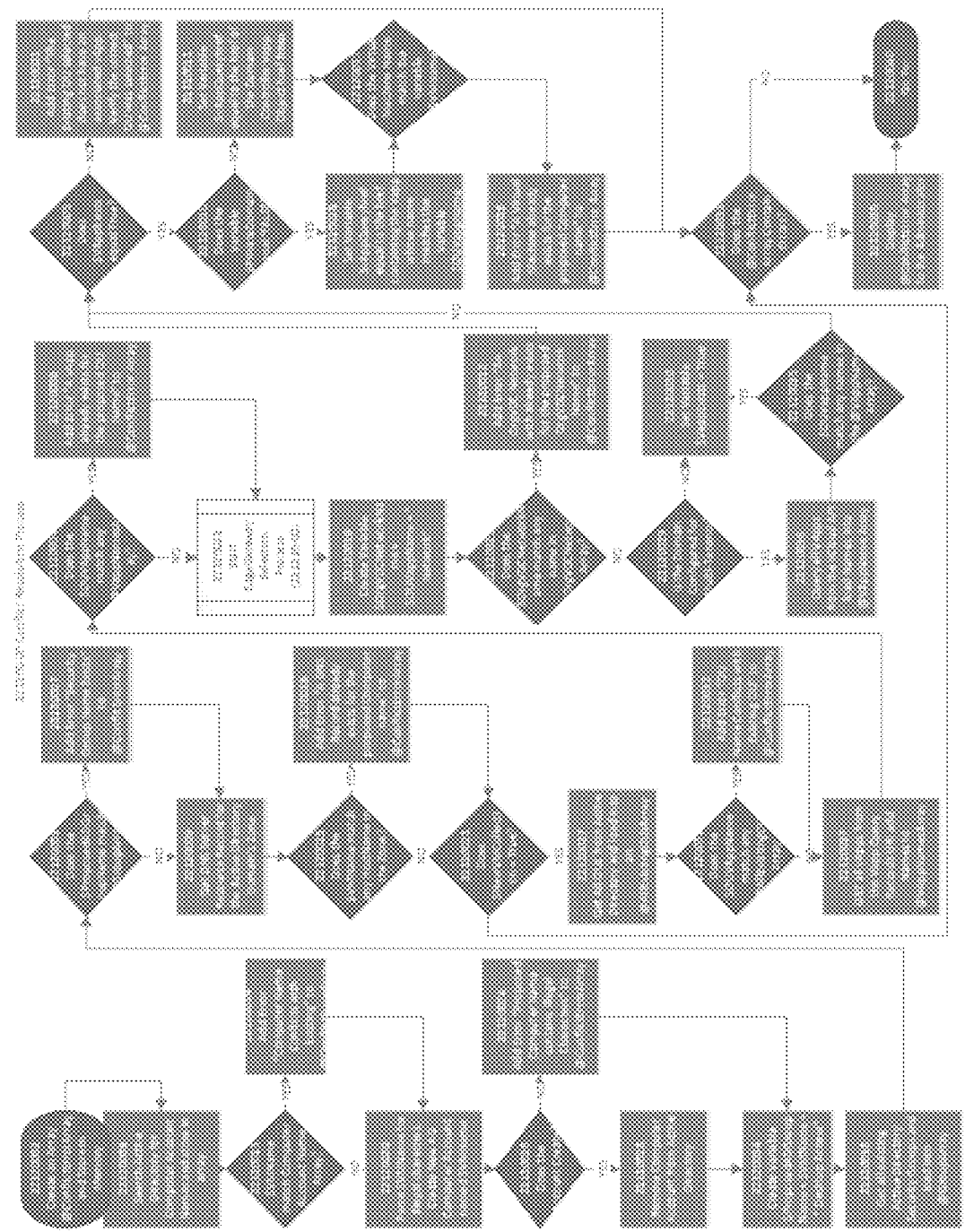
FIG. 12 illustrates an exemplary conflict resolution process for the administrator dialog process described in FIG. 11.

FIG. 12 illustrates an exemplary conflict resolution process for the administrator dialog process described in FIG. 11. At 22120002, the @ConflictError array can be created and stored in the memory. At 22120008, an active directory for computer account names can be searched and stored in the computer accounts name array. At 22120013, it can be determined whether variable $VMName (e.g., representing name of a virtual machine that is being instantiated) has a match in the computer accounts name array. If the determination is affirmative, at 22120014, information indicating that a conflict exists (e.g., a message "Computer Name Conflicts with Existing") can be added to the @ConflictError array. If the determination is negative or after 22120014, at 22120020, $VMname can be parsed for illegal characters. A new AD computer account named $VMname can be created. At 22120026, it can be determined whether, the Active Directory Computer Account created successfully with the proposed computer name, $VMName. Since the previous Active Directory search at 22120015 can return no conflicts, it follows that if the computer account was not successfully created with the proposed name, it the name may contain illegal characters. This approach can therefore delegates parsing to Active Directory, should illegal character requirements change over time. If the determination is affirmative, at 22100028, the computer account can be removed from the directory. If the determination is negative, at 22100024, an error message indicating that proposed computer name contains illegal characters can be added to @ConflictError array. After 22100024 or 22120028, at 22120034, a variable $ProposedADGroupName (e.g., which can include $VMname and "Desktop Access") can be created. At 22120038, existing active directory security groups can be obtained and loaded into @GroupArray.

At 22120003, it can be determined whether $ProposedADGroupName has a match in @ GroupArray. If the determination is affirmative, at 22100007, an error message (e.g., "Security Group Name Exists") can be added to @ConflicfError array. If the determination is negative, or after 22120007, at 22120009, DNS server resource record for the active directory domain's zone can be obtained.

At 22120015, it can be determined whether $VMname matches any HostName in the DNS zone. If the determination is affirmative, at 22120016, an error message (e.g., "A DNS record already exists for the proposed computer name") can be added to @ConflicfError array. If the determination is negative, or after 22120016, at 22120021, it can be determined whether $NewVMCollection has a predetermined value (e.g., "True"). If the determination is affirmative, at 22120027, one or more OUs from active directory can be obtained and loaded into an @AllExistingOUsArray. If the determination is negative, 22120033 (described later) can be performed.

At 22120031, it can be determined whether $OUVAppName matches any value in the @AllExistingOUsArray. If the determination is affirmative, at 22120032, an error message (e.g., "OU name conflicts with existing OU") can be added to @ConflicfError array. If the determination is negative, or after 22120032, at 22120037, all VApps from the VApp query records URI can be obtained and add names to @ VAppNamesArray.

At 22120004, it can be determined whether $OUVApp-Name matches any value in the @VappNames Array. If the determination is affirmative, at 22120006, an error message (e.g., "A VApp already exists for the proposed OU Name") can be added to @ConflicfError array. If the determination is negative, or after 22120006, at 22120012, EdgeGateway selection process can be started (e.g., as described in FIG. 13). At 22120019 variable $OrgVDCNetworkName can be created which can include $OUVappName and Network.

When the variable $NewVMCollection=TRUE, then part of the application server instantiation process can require creating a network for that virtual machine. This network can be a VXLAN-backed distributed virtual port group, and the deployment process, running under the tenant's vCloud director security context can have the capability to create these tenant-dedicated VXLAN-backed virtual distributed port groups for the tenant. Because the process has determined that a VXLAN backed virtual distributed port group (a type of OrgVDCNetwork) needs to be created, the process can check for naming conflicts (e.g., to see if any other OrgVDC Networks in this tenant's virtual datacenter already exist, as this would cause the orgvdc network (port group) deployment to fail).

At 22120023, it can be determined whether $OrgVDC-NetworkName matches any name in $OrgVDCNetwork array. If the determination is affirmative, at 22120022, an error message (e.g., "An OrgVDC network already exists for the proposed OrgVDC NetworkName") can be added to @ConflicfError array. If the determination is negative, at 22120029, it can be determined whether the cloud service domain is configured for multitenancy. If the determination at 22120029 is negative, variable $VappExists can be set to a predetermined value (e.g., "True"). If the determination is affirmative, at 22120036. All VApps can be queried from the vCloud API and load names into @VAppNameArray.

At 22120035, it can be determined whether $OUVapp-Name matches any names in $VAppNameArray. If the determination is affirmative, 22120030 can be repeated. If the determination is negative, at 22120005, it can be determined whether $VAppExists has a predetermined value (e.g., True). If the determination is negative, at 22120001, an error message (e.g., "The Existing OU selected does not have an associated VApp. Verify that a correct OU was selected") can be added to @ConflicfError array. If the determination at 22120005 is affirmative, at 22120010, it can be determined whether $PrivateDomain has a predetermined value (e.g., False). If the determination at 22120010 is affirmative, at 22120018, variable $vAppQueryhref can be set equal to the href containing the Vapp that matches the variable $OUVappName. If the determination at 22120010 is negative, at 22120011, variable $vAppQueryhref can be set to href containing the VApp whose name matches the variable @OUVappName.

After 22120018 or 22120011, it can be determined at 22120017, whether the virtual machine name matches the variable $VMName. At 22120025, an error message (e.g., "A virtual machine already exists for the proposed computer name") can be added to @ConflicfError array. After 22120025, 22120001 or when determination at 22120021 is negative, it can be determined at 22120033 whether @ConflictError array contains errors. If the determination is affirmative, @ConflictError array can be displayed to the administrator at 22120039. If the determination is negative, the conflict resolution process proceeds to 22100016 of FIG. 13.

Figure 13:
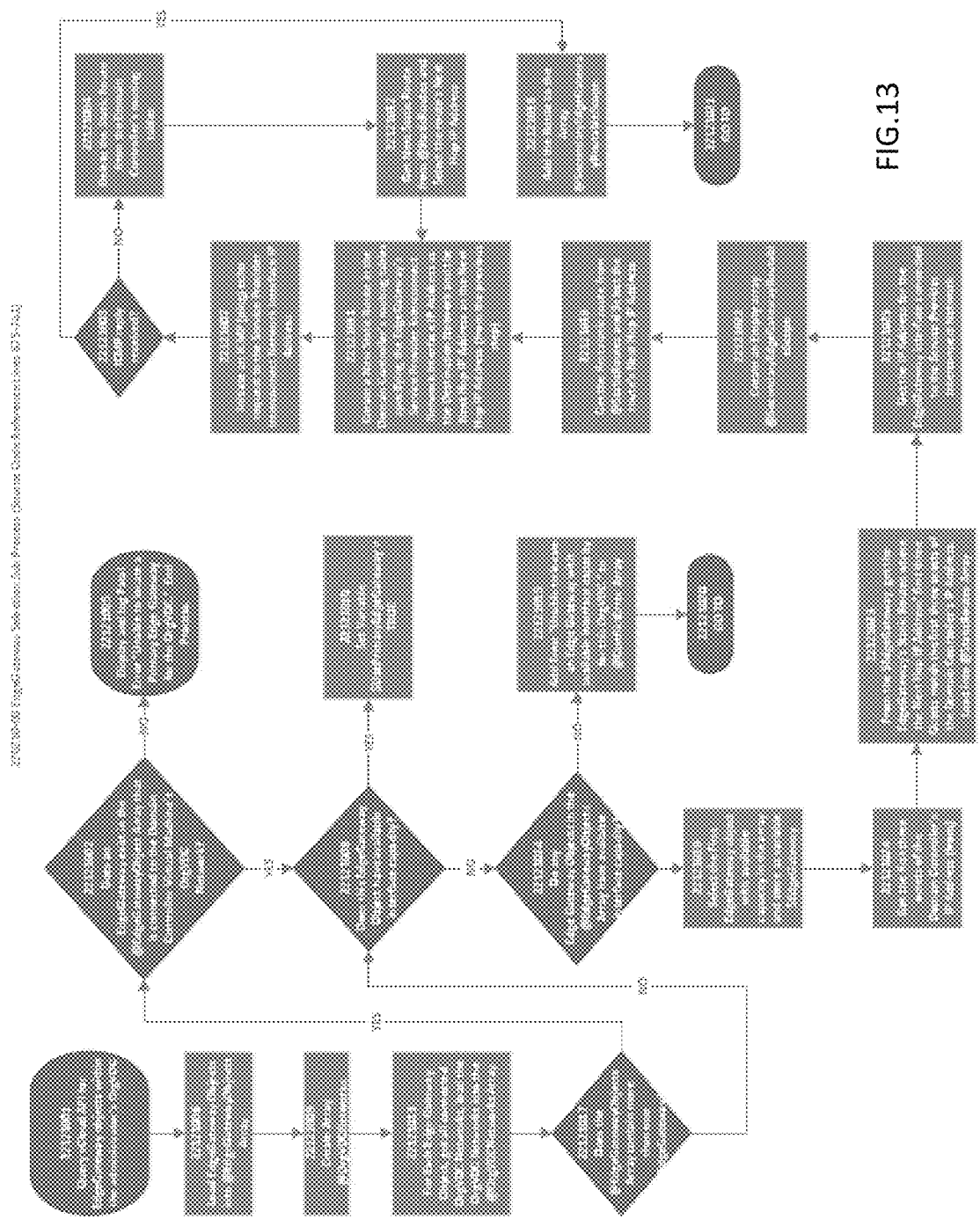
FIG. 13 illustrates an exemplary EdgeGateway selection process sub process for the conflict resolution process described in FIG. 12.

FIG. 13 illustrates an exemplary EdgeGateway selection process sub process for the conflict resolution process described in FIG. 12. At 22121001, vCloud API can be queried for EdgeGateway objects within the administrator's OrgVDC. At 22121006, EdgeGateway Objects can be loaded into @EdgegatewayObjects array. At 22121009, @OrgVDCNetworks array can be created. At 22121013, for each EdgeGateway object the connected OrgVDC networks can be obtained and loaded to the @OrgVDCNetwork array. At 22121017, it can be determined whether @EdgeGateway Objects array contains more than one EdgeGateway values. If the determination is affirmative, at 22121002, it can be determined whether EdgeGateway exists in @EdgeGatewayObject array which can be connected to the Domain Controller Virtual Machine's OrgVDC Network. If the determination at 22121002 is negative, at 22121005 an error message can be displayed (e.g., Unable to locate a primary edge gateway for the OrgVDC").

If the determination at 22121002 is positive, at 22121008, it can be determined whether the EdgeGatewayObject has available interface capacity. If the determination at 22121008 is affirmative, at 22121010, variable $UsePrimaryEdgeGateway can be set to a predetermined value (e.g., "True"). If the determination at 22121008 is negative, at 22121014, it can be determined whether any EdgeGatewayObject in @EdgeGatewayObject array has available interface capacity. If the determination at 22121014 is negative, at 2212015, an error message (e.g., "Unable to locate and Edge gateway with available enterface capacity for this ORGVDC") can be added to the @ConflictError array. This can be followed by proceeding to 22120019 in FIG. 12. If the determination is affirmative, at 22121019, the first EdgeGateway object with available capacity in the array can be selected and stored as variable $EdgeGateway. At 22121024, the first three octets of the domain controller's IP address can be obtained. At 22121023, EdgeGateway's static routes having the next Hop IP address' first three octets match the first three octets of the Domain Controller's can be obtained from the $EdgeGateway. Additionally, the obtained static routes can be loaded into @StaticRoutes array. At 22121025, the IP address for the EdgeGateway interface connected to the service provider interconnect network can be obtained. At 22121022, an empty array @SecondaryEdgeGateWayRountableScope can be created. At 22121018, first static route from the @StaticRoutes can be obtained, and the next Hop IP address can be selected. At 22121011, a new static route in the domain controller's routing tables can be created. The new static route can specify that the EdgeGateway's service prover interconnect network interface IP address as the destination network and the next Hop IP address as the next Hop IP address from 22121018. At 22121007, an ICMP (ping) echo request to the service provider interconnect network interface IP address can be initiated. At 22121003, it can be determined whether ICMP reply is received. If the determination is negative, at 22121004, the static route from the domain controller's routing tables can be deleted. At 22121012, the next static route from @StaticRoutes can be obtained, and the routes's next Hop IP address can be selected, followed by repetition of step 22121011. If the determination at step 22121003 is affirmative, at 2212016, the route can be added to the array @SecondaryEdgeGateWayRoutableScope. At 22121021, the process can proceed to 22120019 in FIG. 12.

Figure 14:
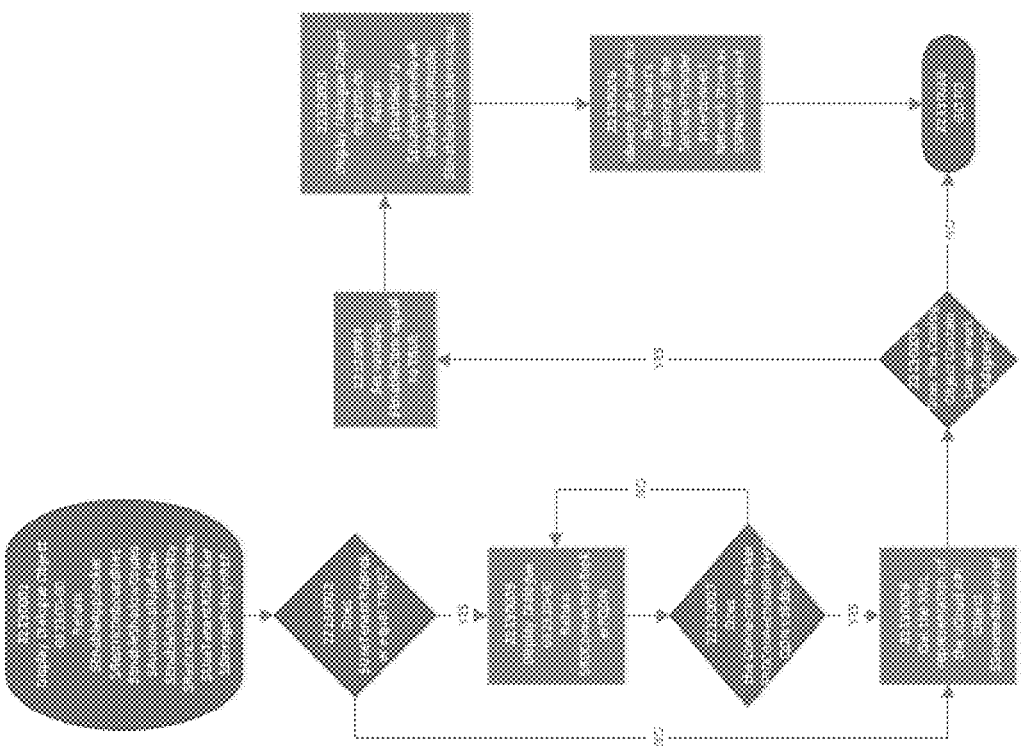
FIG. 14 illustrates an exemplary method for deployment options dialogue embedded mode for the administrator dialog process described in FIG. 11.
Figure 38:
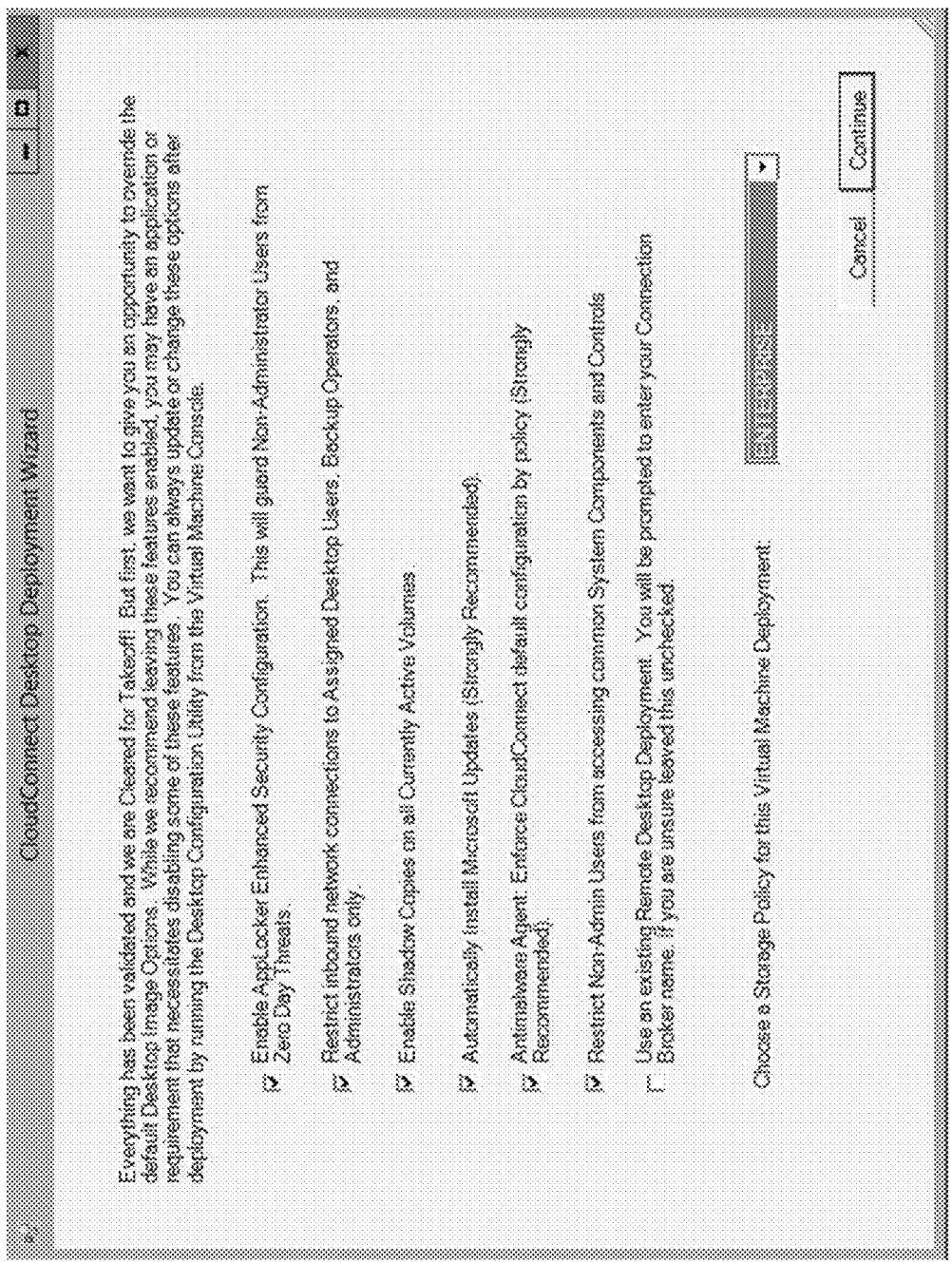
FIG. 38 illustrates another exemplary window of the deployment wizard dialogue box.

FIG. 14 illustrates an exemplary method for deployment options dialogue embedded mode for the administrator dialog process described in FIG. 11. At 22130001, a Dialogue Object 012100-00 can be displayed, variables $EnableAppLocker, $RestricanboundNet, $EnableShadowCopies, $AutoInstallUpdates, $EnableMalwarePolicy, $RestrictNonAdminUsers, $UseTenantRDBroker, and $StoragePolicyHREF can be returned. At 22130002, it can be determined whether $UseTenantRDBroker has a predetermined value (e.g., "True"). If the determination is affirmative, at 22130005, Dialogue 012110-00 (e.g., as shown in FIG. 38) can be displayed and $RDConnectionBrokerFQDN can be returned. At 22130007, it can be determined whether $RDConnectionBrokerFQDN can be validated by the connection broker. If the determination is affirmative or if the determination at 22130002 is negative, at 22130008, XML representation of the vCloud API object $SourcedIterHref can be obtained. If the determination at 22130007 is negative, 22130005 can be repeated.

At 22130009, it can be determined whether the catalog object contains two network adapters. If the determination is affirmative, at 22130004, variable $EnableCitrix is set to a predetermined value (e.g., "True"). At 22130003, Dialogue 012110-00 can be displayed and variables $EnableGPU, $EnableFramehawk, $EnableUDPAudio, and $EnableDirectUserAccess can be returned. At 22130006, the href for the tenant's instance of the service provider interconnect network store can be identified as $SPNetworkHref. After 22130006, or if the determination at 22130009 is negative, the process can proceed to 22100020 in FIG. 11.

Figure 15:
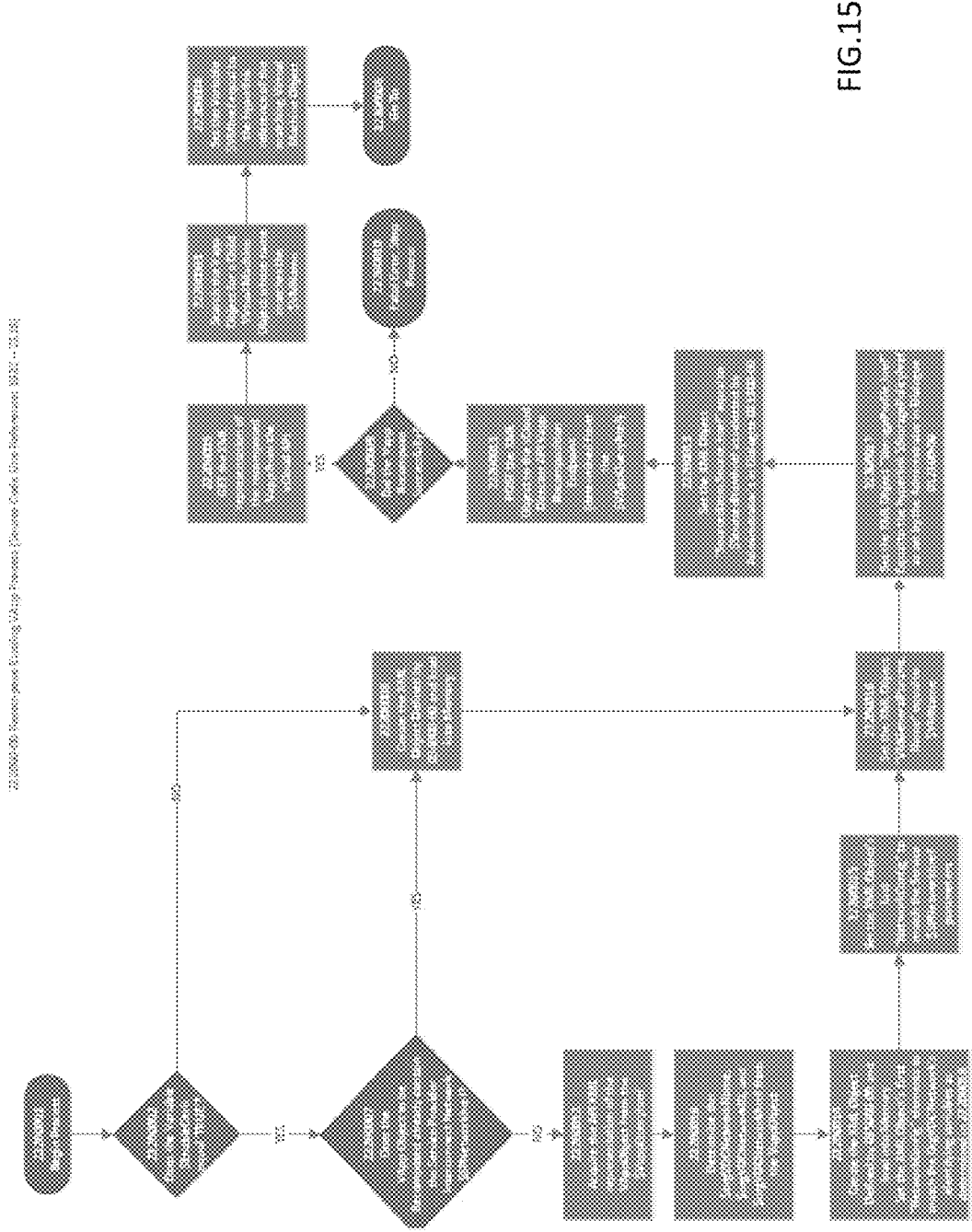
FIG. 15 illustrates an exemplary method for recomposing existing VApp process for the automated method described in FIG. 10.

FIG. 15 illustrates an exemplary method for recomposing existing VApp process for the automated method described in FIG. 10. At 22200001, the recomposing existing VApp process begins. At 22200002, it can be determined whether the variable $EnableCitrix can have a predetermined value (e.g., True). If the determination is negative, at 22200008, XML object defined by 034000-00 (e.g., see FIG. 46) can be created and loaded into memory. If the determination is affirmative, at 22200007, it can be determined whether VApp object which can be recomposed already contain the service provider interconnect network $SPNetworkhref. If the determination is affirmative, 22200008 can be repeated. If the determination at 22200007 is negative, at 22200012 the process can get the API's XML representation of the VApp to be recomposed from the $VAppQueryhref. At 22200018, the XML representation acquired at 22200012 can be inspected and values for the attributes of the VApp's connected OrgVDCNetwork can be determined, including, for example, values for $OrgVDCNetworkName, $OrgVDCNetworkID, and $OrgVDCNetworkhref. At 22200014, XML object defined by 035000-00 (e.g., as shown in FIG. 39) can be created and loaded into memory. At 22200014, the XML object's first "NetworkConfig" elements can be set to match the VApp's OrgVDC Network's parameters as determined in 22200018. At 22200015, the XML object's last "NetworkConfig" elements can be set to match the service $SPNetworkhref parameters. At 22200016, the XML object "VMGeneralParamsName" can bet set to $VMName. At 22200017, the XML object "StorageProfile.href" can be set equal to the hyperlink $StoragePolicyhref as set by the administrator dialogue 012100-00. At 22200013, the XML object "Sourceditem.Source.href" can be set equal to $SourcedItemhref as selected by administrator's dialogue 011300-00. At 22200011, the VApp's recomposition endpoint can be determined from the $VAppQueryhref and the XML Object may be posted to this vCloud VApp recomposition endpoint as the Body of a API POST request and VApp recomposition begins. At 22200009, it can be determined whether VApp has been successfully recomposed. If the determination is negative, at 22200010, recomposition process can be stopped due to a fatal error. If the determination at 22200009 is affirmative, at 22200005, XML representation of the recomposed VApp from the vCloud API can be obtained. At 22200003, the VApp object for the child virtual machine object whose name matches $VMName can be searched. At 22200004, the variable $VMhref can be set equal to the hyperlink reference of the matching virtual machine object. At 22200006, the recomposing of existing VApp process can proceed to 22000020 in FIG. 10.

Figure 16:
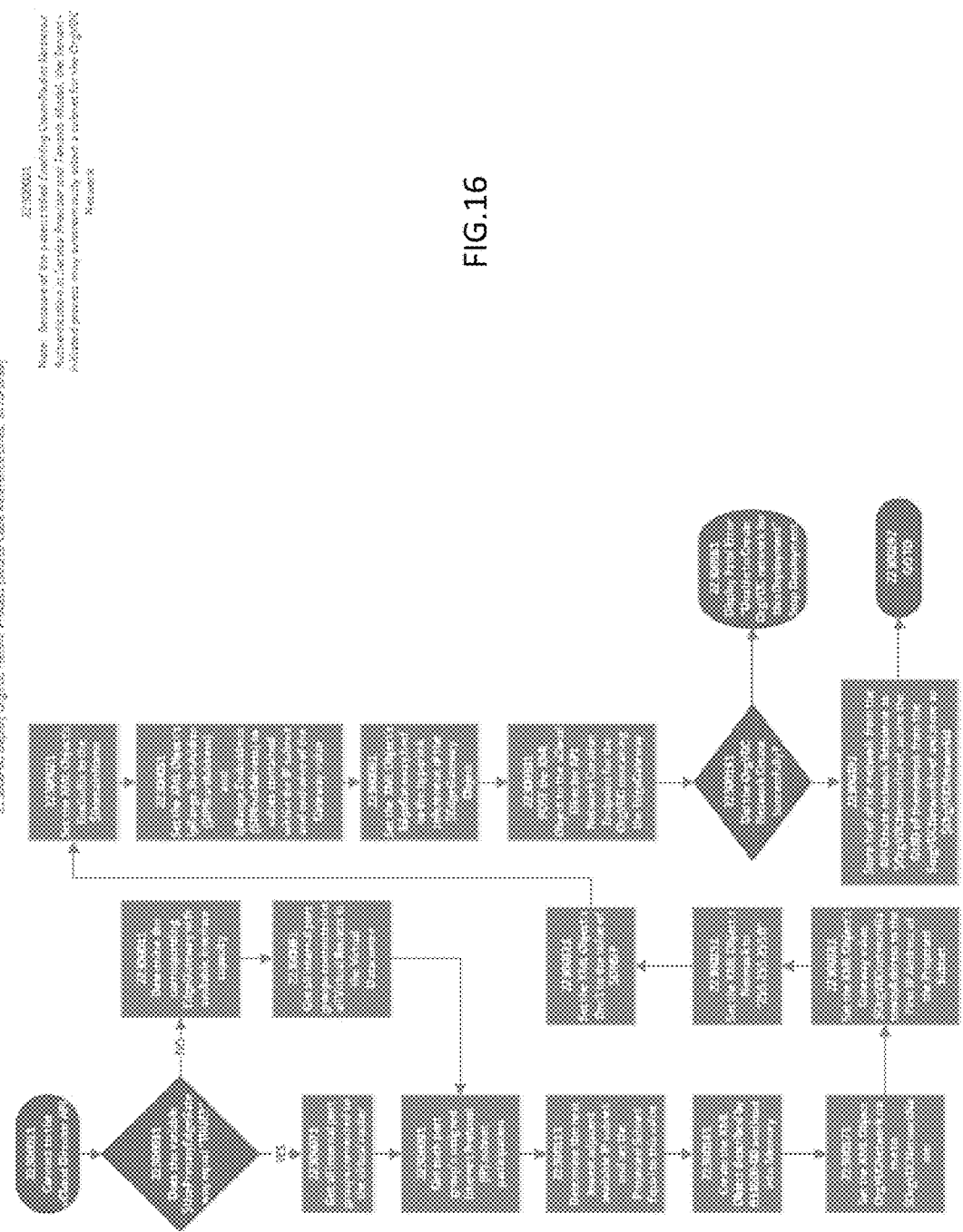
FIG. 16 illustrates an exemplary method for deployment of OrgVDC network process for the automated method described in FIG. 10.

FIG. 16 illustrates an exemplary method for deployment of OrgVDC network process for the automated method described in FIG. 10. At 22300011, connection to the vCloud director API is established. At 22300031, it can be determined whether the variable $UsePrimaryEdgeGateway has a predetermined value (e.g., true). If the determination is negative, at 22300041, the corresponding EdgeGateway with available interface capacity can be determined. At 22300061, internal port groups connected to virtual routers in the virtual datacenter can be obtained. If the determination at 22300031 is affirmative, at 22300071, all internal port groups connected to the virtual router can be obtained. After 22300061 or 22300071, at 22300091, internet protocol subnet participation assigned to one or more port groups can be obtained. At 22300111, the next lowest adjacent available IP subnet can be determined and the proposed subnet can be set to the determined value. At 22300141, the XML object described by 031000-00, which is illustrated in FIG. 40, can be created and loaded into memory. At 22300171, the XML object OrgVDCNetwork.name can be set to $OrgVDCNetworkName. At 22300181, the XML object's gateway value, $OrgVDCNetworkGatewayAddress, can be set to the first IP address of the proposed subnet. At 22300151, the XML object's netmask can be set to a predetermined value (e.g., 255.255.255.0). At 22300121, the XML object's Dns1 can be set to $DNSIP. At 22300021, the object's DnsSuffix can be set to the $DomainName. At 22300051, the XML object's IpRange.StartAddress and IpRange.Endaddress can be set to values contained within the IP subnet, $IPStartAddress and $IPEndAddress, respectively, where $IPStartAddress is the lower bound of a IP Address Pool (range) of TCP/IP Version 4 addresses within the subnet and $IPEndAddress is the upper bound of said Pool. The range between the set values can be exclusive of $OrgVDCNetworkGatewayAddress. vCloud Director can assign and configure a unique IP address from this pool to the tenant's application server primary network adapter (as shown for example in FIG. 2 at 228) as part of the Guest Customization (Sysprep) Process, which can be invoked at 225000-00. This can be done, for example, to avoid IP address conflicts with respect to tenant's own network. At 22300081, the XML object's EdgeGateway.href can be set to the hyperlink reference of the $EdgeGateway object. At 22300101, the XML Object can be posted as the Body of a Request to the vCloud director API network creation endpoint for the OrgVDC containing the EdgeGateway. At 22300131, it can determined whether the OrgVDC has been successfully created. If this determination at 22300131 is negative, an error signal (e.g., "Unable to create OrgVDC network for this deployment") can be displayed and the deployment can be stopped. If the determination at 22300131 is affirmative, the hyperlink reference of the created OrgVDC network can be acquired from the API response from the Create Org VDC Network Request and stored at 2230191 as the variable $OrgVDCNetworkhref. At 2230191, the Global Unique Identifier of the created OrgVDC Network can be determined from the $OrgVDCNetworkhref and stored as the variable $OrgVDCNetworkId and the process can proceed to 22000006 of FIG. 10.

Figure 17:
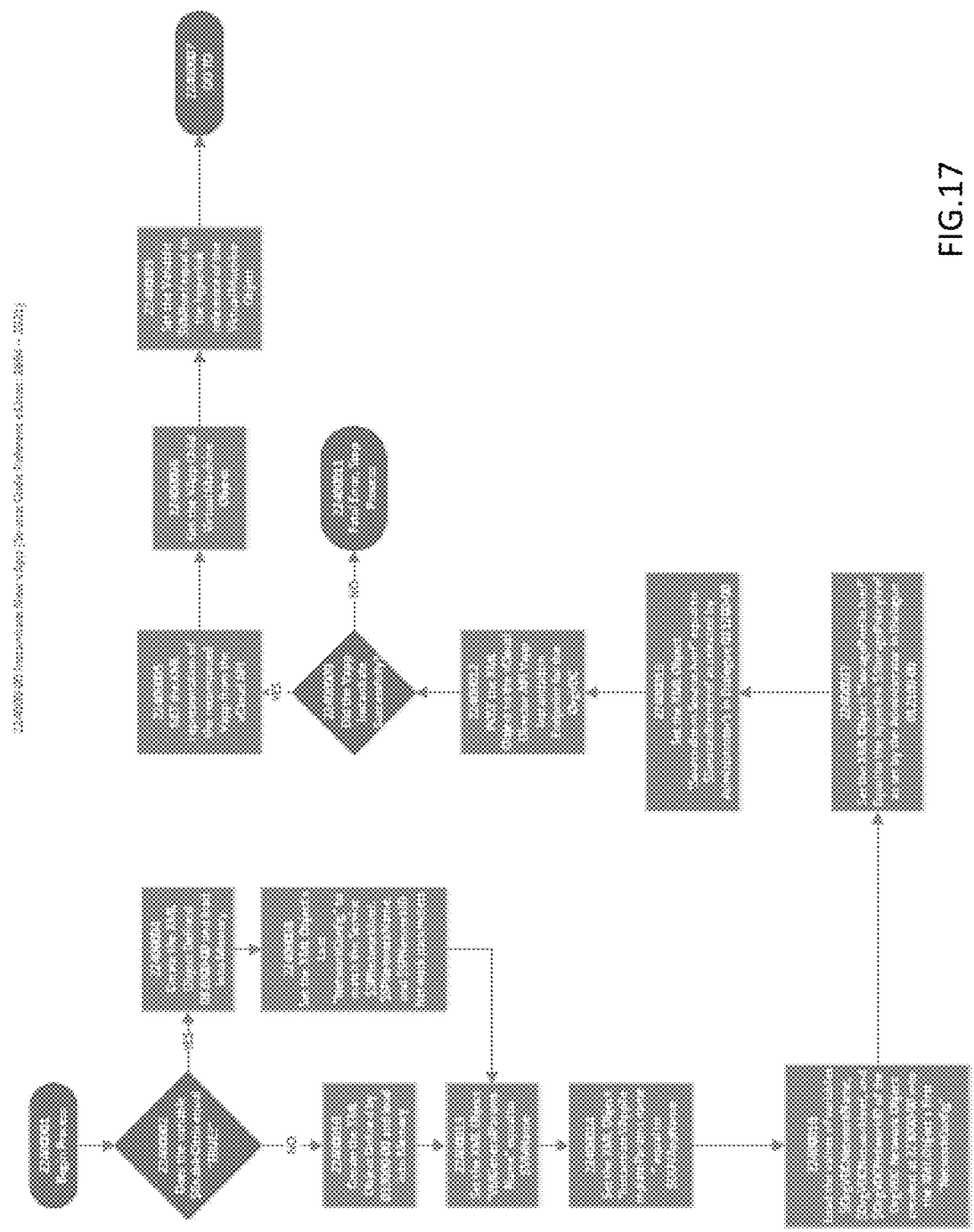
FIG. 17 illustrates an exemplary method for instantiating new VApp for the automated method described in FIG. 10.

FIG. 17 illustrates an exemplary method for instantiating new VApp process for the automated method described in FIG. 10. At 22400001, the instantiating new VApp process can begin. At 22400002, it can be determined whether the variable $EnableCitrix has a predetermined value (e.g., True). If the determination is affirmative, at 22400004, the XML object defined 032000-00 (e.g., as shown in FIG. 41) can be created and loaded into memory. This can be followed by 22400008, where the XML object's last "NetworkConfig" elements can be set to match the service $SPNetworkhref, $SPNetworkName, and $SPNetworkID corresponding values. If the determination at 22400002 is negative, at 22400010, the XML object defined 033000-00 (e.g., as shown in FIG. 42) can be created and loaded into memory. After 22400010 or 22400008, at 22400013, the XML object "VMGeneralParams Name" can be set equal to $VMName. At 22400014, the XML object InstantiateVAppTemplate Params.name" can be set to the value of $OUVAppName. At 22400016, the XML Object's first "NetworkConfig" section elements can be set to match corresponding values of $OrgVDCNetworkName, $OrgVDCNetworkhref, and $OrgVDCNetworkID of the OrgVDCNetwork as determined for example in FIG. 16 at 22300191 At 22400017, the XML Object StorageProfile.href can be set equal to the hyperlink $StoragePolicyhref as set by the Administrator in Dialogue 012100-00. At 22400015, the XML Object Sourceditem.Source.href can be set equal to $SourcedItemhref as selected by Administrators (e.g., in Dialogue 011200-00 as shown in FIG. 36). At 22400012, the XML Object can be set to the vCloud Director API VApp Instantiation Endpoint for the OrgVDC. At 22400009, it can be determined whether the VApp has been successfully instantiated. If the determination is negative, at 22400011 the initiation process can be stopped due to a fatal error resulting from 22400009. If the determination at 22400009 is affirmative, the XML representation of the recomposed VApp can be obtained from the vCloud API. At 22400006, the VApp child virtual machine object can be obtained. At 22400003, the variable $VMhref can be set equal to the hyperlink reference of the newly created virtual machine object. At 22400007, instantiation of new VApp process proceeds to 22000020 in FIG. 10.

Figure 18:
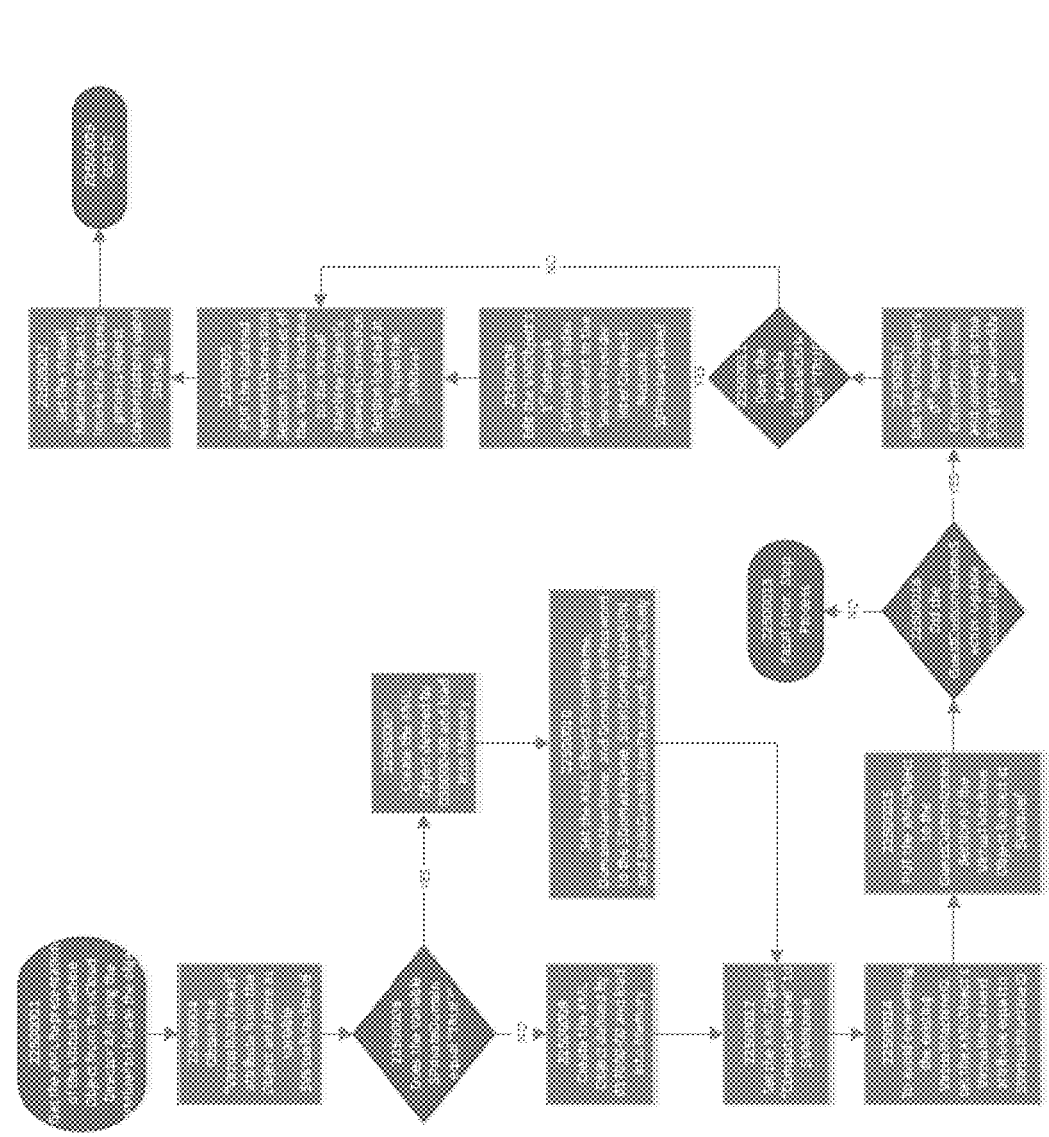
FIG. 18 illustrates an exemplary method for applying virtual machine guest customization sub process for the automated method described in FIG. 10.

FIG. 18 illustrates an exemplary method for applying virtual machine guest customization sub process for the automated method described in FIG. 10. At 22500001, the XML representation of the virtual machine object can be obtained from the vCloud director API that can use $VMhref to locate the object. At 22500004, VirtualMachineId attribute can be obtained from the Object and stored as variable $VirtualMachineId. At 22500006, it can be determined whether the variable $PrivateDomain has a predetermined value (e.g., True). If the determination is affirmative, at 22500007, an XML object defined by 036000-00 (e.g., as shown in FIG. 43) can be created and loaded into memory. After 22500007, at 22500010 the XML Objects DomainName, DomainUserName, and DomainUserPassword can be set to the $DomainName, $JoinDomainUserUPN, and $JoinDomainUserPassword, respectively, which the process can arbitrarily and temporarily create by connecting to Active Directory. If the determination at 22500006 is negative, at 22500009, the XML object defined by 037000-00 (e.g., as shown in FIG. 44) can be created and loaded into memory. At 22500012, the XML object ComputerName can be set to $VMName. At 22500014, in order to avoid overwriting the existing VirtualMachineID the XMLObject's VirtualMachineId attribute can be set equal to $VirtualMachineID. At 22500015, the XMLObject can be placed in the GuestCustomizationSection of the virtual machine object located at $VMhref. At 22500016, it can be determined whether the GuestCustomizationSection has been successfully updated. If the determination at 22500016 is negative, the method for applying virtual machine guest customization sub-process described in FIG. 18 can be terminated. If the determination at 22500016 is affirmative, at 22500017, VMObject's zeroth network connection index is edited and connected to the $OrgVDCNetworkhref. At 22500011, it can be determined whether the variable $EnableCitrix has a predetermined value (e.g., True). If the determination at 22500011 is affirmative, at 22500008, VMObject's first network connection index is edited and connected to the service provider inter connect network (e.g., $SPNetworkhref). At 22500005, the updated NetworkConnection section attributes of the Virtual Machine can be placed in the virtual Machine Object's network connection section located at the hyperlink $VMhref. 22500005 can be performed after 22500008 or after determination at 22500011 is negative. At 22500002, the virtual machine object can be set to invoke the Sysprep process (e.g., for Guest Customization) upon startup. At 22500003, guest customization method described in FIG. 18 can proceed to 22000023 of FIG. 10.

FIG. 19 illustrates an exemplary method for configuring active directory sub process for the automated method described in FIG. 10. At 22600001, connection to active directory can be established and organizational units can be obtained. The Organizational Units can be logical containers within Active Directory, containing User, Computer and Security Group Objects for ease of administration. At 22600002, the existing organizational units can be searched by name.

Figure 45:
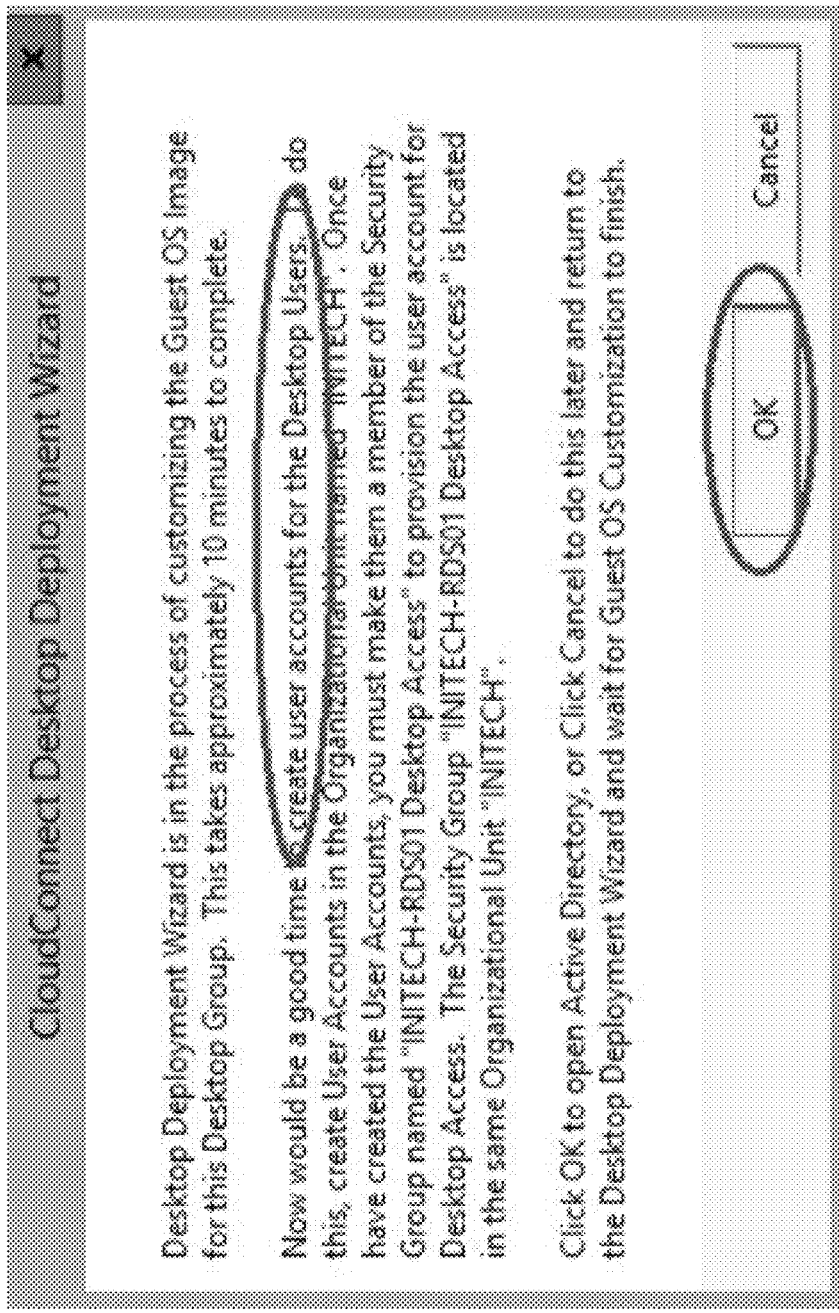
FIG. 45 illustrates an exemplary window of the deployment wizard dialogue box.

At 22600003, it can be determined whether an organizational unit name matches $OUVAppName. If the determination at 22600003 is negative, at 22600004, an active directory organization unit named $OUVAppName can be created. If the determination at 22600003 is affirmative, or after 22600004, at 22600004 an active directory security group named $ProposedADGroup name can be created. At 22600012, dialogue object 011500-00, which is illustrated at FIG. 45, can be displayed.

At 22600009, it can be determined whether the variable $OpenADNow has a predetermined value (e.g., True). If the determination at 22600009 is affirmative, at 22600006, active directory users and computers management console targeting the organizational unit that is matched with $OUVAppName can be launched. If the determination at 22600009 is negative or after 22600006, at 22600010, an active directory for a computer account matching $VMName can be queried. At 22600011, it can be determined whether the computer account exists. If the determination at 22600011 is negative, at 22600013, the process pauses for a predetermined duration of time (e.g., 30 seconds) followed by the query at 22600010. If the determination at 22600011 is affirmative, at 22600008, the computer account can be moved into the organization unit that is matched with $OUVAppName. At 22600005, the method for configuring active directory sub process can proceed to 22000002 of FIG. 10.

Figure 20:
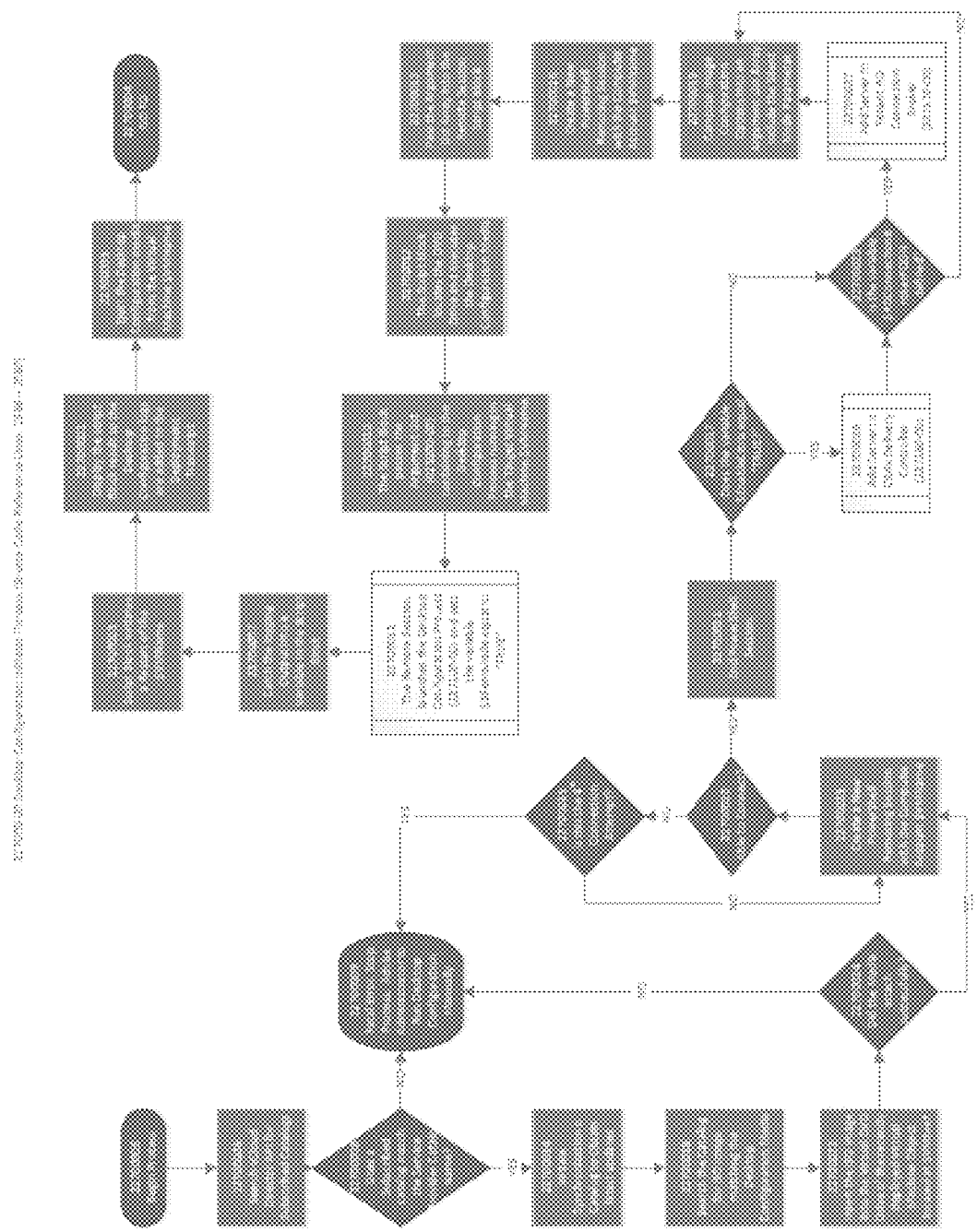
FIG. 20 illustrates an exemplary desktop configuration initiator process for the automated method described in FIG. 10.

FIG. 20 illustrates an exemplary desktop configuration initiator process for the automated method described in FIG. 10. At 22700005, the desktop configuration initiator process begins. At 22700006, vCloud Director API can be searched for subscribed catalogs. At 22700008, it can be determined whether a subscribed catalog matches the service provider catalog name. If the determination at 22700008 is negative, at 22700009, the desktop configuration initiator process can be stopped, and the administrator can be advised to run desktop configuration manually. If the determination at 22700008 is affirmative, at 22700014, the subscribed catalog can be synchronized to obtain latest updates. The subscribed Catalog is a tenant-specific cached read only copy of a Service Provider Catalog shared with the tenants. At 22700018, the catalog can be searched for ISO image matching the desktop configuration media. At 22700022, the ISO image can be inserted into the virtual DVD drive of the recently deployed virtual machine object located at $VMhref.

At 22700024, it can be determined whether the ISO image was successfully attached to the virtual DVD drive. If the determination at 22700024 is negative, 22700009 can be repeated. If the determination at 22700024 is affirmative, at 22700025, a new PowerShell remoting session can be created with the computer account $VMName. At 22700020, it can be determined whether connection could be established with the computer account $VMName. If the determination at 22700020 is negative, at 22700015, it can be determined whether the connection is the fourth connection attempt. If the determination at 22700015 is affirmative, the desktop configuration initiator process can be stopped as described at 2270009. If the determination at 22700015 is negative, 22700025 can be repeated. If the determination at 22700020 is affirmative, at 22700021 PowerShell session can be terminated at 22700021.

At 22700017, it can be determined whether the variable $EnableCitrix has a predetermined value (e.g., True). If the determination at 22700017 is affirmative, at 22700026, server can be added to CITRIX delivery controller (e.g., as described in FIG. 27). If the determination at 22700017 is negative, at 22700023, it can be determined whether the variable $RDConnectionBrokerFQDN is defined. If the determination at 22700023 is affirmative, at 22700027, server can be added to Tenant RD Connection broker (e.g., as described in FIG. 28). After 22700027 or if the determination at 22700023 is negative, at 22700019, image configuration options can be composed into an argument list array that can include the silent mode parameter. At 22700016, a new PowerShell remoting session with computer account $VMName can be created. At 22700013, the argument list array can be passed into the remote session script block. At 22700012, the script block can locate the DVD drive and execute the desktop configuration media. At 22700010, the script block can pass the argument list 021000-00 (FIG. 66) to the desktop configuration process running in the target virtual machine $VMName. At 22700011, the remote session can launch the desktop configuration process (e.g., as described in FIG. 22) and set the variable $SilentMode equal to a predetermined value (e.g., True). At 22700007, the logging output can be caught into a variable in the script box. At 22700002, the script block can initiate a restart of the $VMName. At 22700001, the script block result can be displayed. This can allow the desktop configuration logs to be added to the deployment transcript (e.g., the deployment process described in FIG. 10) At 22700003, the desktop configuration media can be ejected from the virtual machine $VMName. At 22700004, the desktop configuration initiator process can proceed to 22000003 of FIG. 10.

FIGS. 21-29 illustrate example processes for configuring the application server (e.g., desktop server 207) to enable operation within the runtime environment illustrated in FIG. 5.

Figure 21:
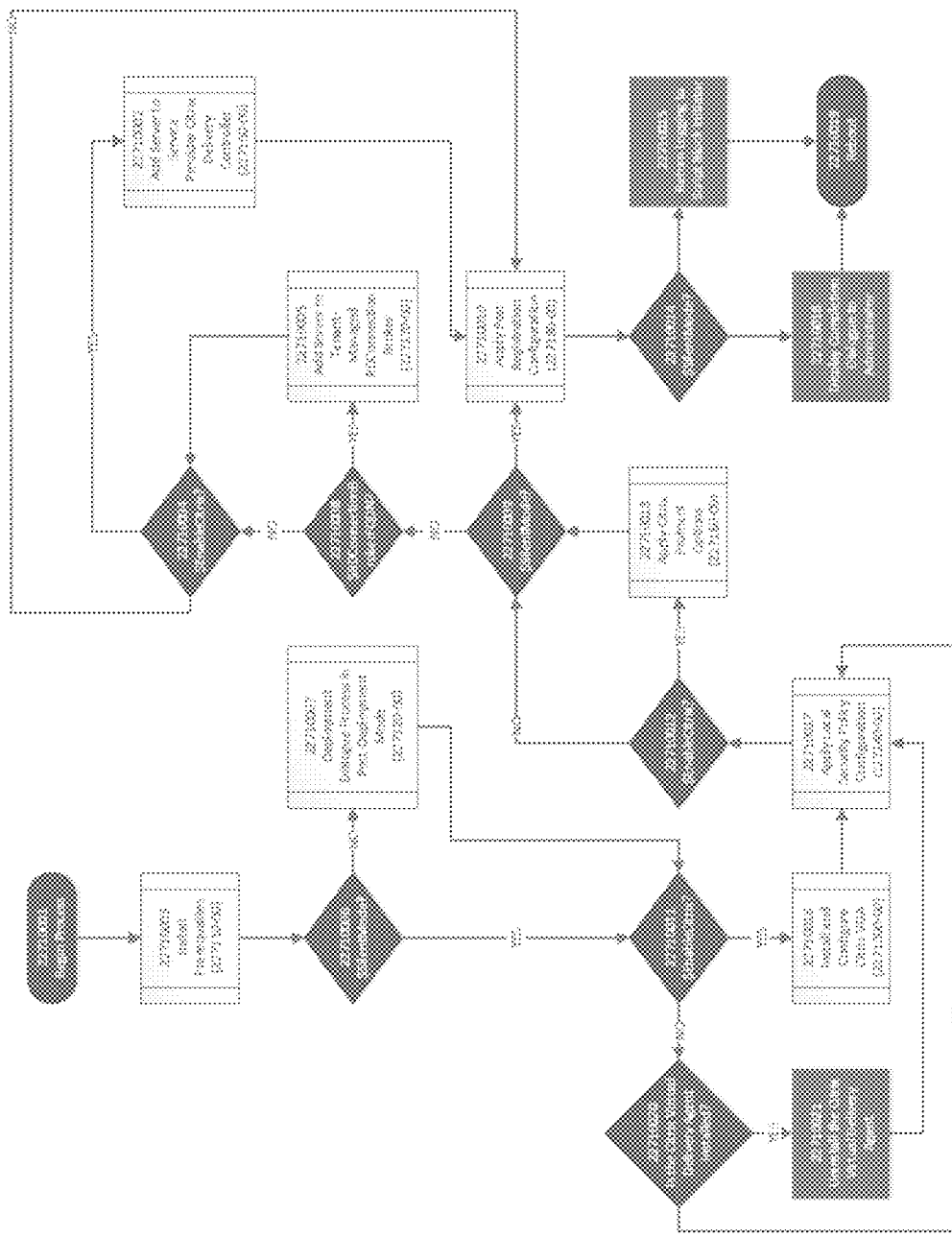
FIG. 21 illustrates an exemplary desktop image configuration process for the desktop configuration initiator process described in FIG. 20.

FIG. 21 illustrates an exemplary desktop image configuration process for the desktop configuration initiator process described in FIG. 20. At 22710001, the desktop image configuration process begins. At 22710003, prerequisites for the desktop image configuration process can be installed (e.g., as described in FIG. 22). At 22710006, it can be determined whether variable $SilentMode has a predetermined value (e.g., True). If the determination at 22710006 is negative, at 22710007, dialogue process in post-deployment mode can be deployed (e.g., as described in FIG. 23). If the determination at 22710006 is affirmative or after 22710007, at 22710011, it can be determined whether variable $EnableCitrix has a predetermined value (e.g., True). If the determination at 22710011 is affirmative, at 22710016, CITRIX VDA can be installed and configured (e.g., as described in FIG. 24). If the determination at 22710011 is negative, at 22710020, it can be determined whether the CITRIX virtual agent has been installed. If the determination at 22710020 is affirmative, the CITRIX virtual delivery agent can be uninstalled. If the determination at 22710020 is negative, after 22710021, or after 22710017, at 22710017, local security policy configuration can be applied (e.g., as described in FIG. 24). At 22710012, it can be determined whether variable $EnableCitrix has a predetermined value (e.g., True). If the determination at 22710012 is affirmative, at 22710013, CITRIX protocol options can be applied (e.g., as described in FIG. 25). If the determination at 22710012 is negative or after 22710013, at 22710009, it can be determined whether variable $SilentMode has a predetermined value (e.g., True). If the determination at 22710009 is affirmative, at 22710010, post registration configuration can be applied (e.g., as described in FIG. 29). If the determination at 22710008 is affirmative, it can be determined whether $RDConnectionBrokerFQDN has a predetermined value (e.g., True). If the determination at 22710008 is affirmative, at 22710005, server to tenant-managed RDConnection Broker can be added (e.g., as described in FIG. 28). If the determination at 22710008 is negative, it can be determined at 22710004 whether variable $EnableCitrix has a predetermined value (e.g., True). If the determination at 22710004 is affirmative, at 22710002, server to service provider CITRIX delivery controller can be added (e.g., as described in FIG. 27). If the determination at 22710004 is negative or after 22710002, at 22710010, post registration configuration can be applied (e.g., as described in FIG. 29). At 22710014, it can be determined whether variable $SilentMode has a predetermined value (e.g., True). If the determination at 22710014 is affirmative, at 22710015, logging to script block initiator can be returned. If the determination at 22710014 is negative, at 22710018, completion dialogue to administrator can be displayed. After 22710018 or 22710015, at 22710019, a reboot can take place.

Figure 22:
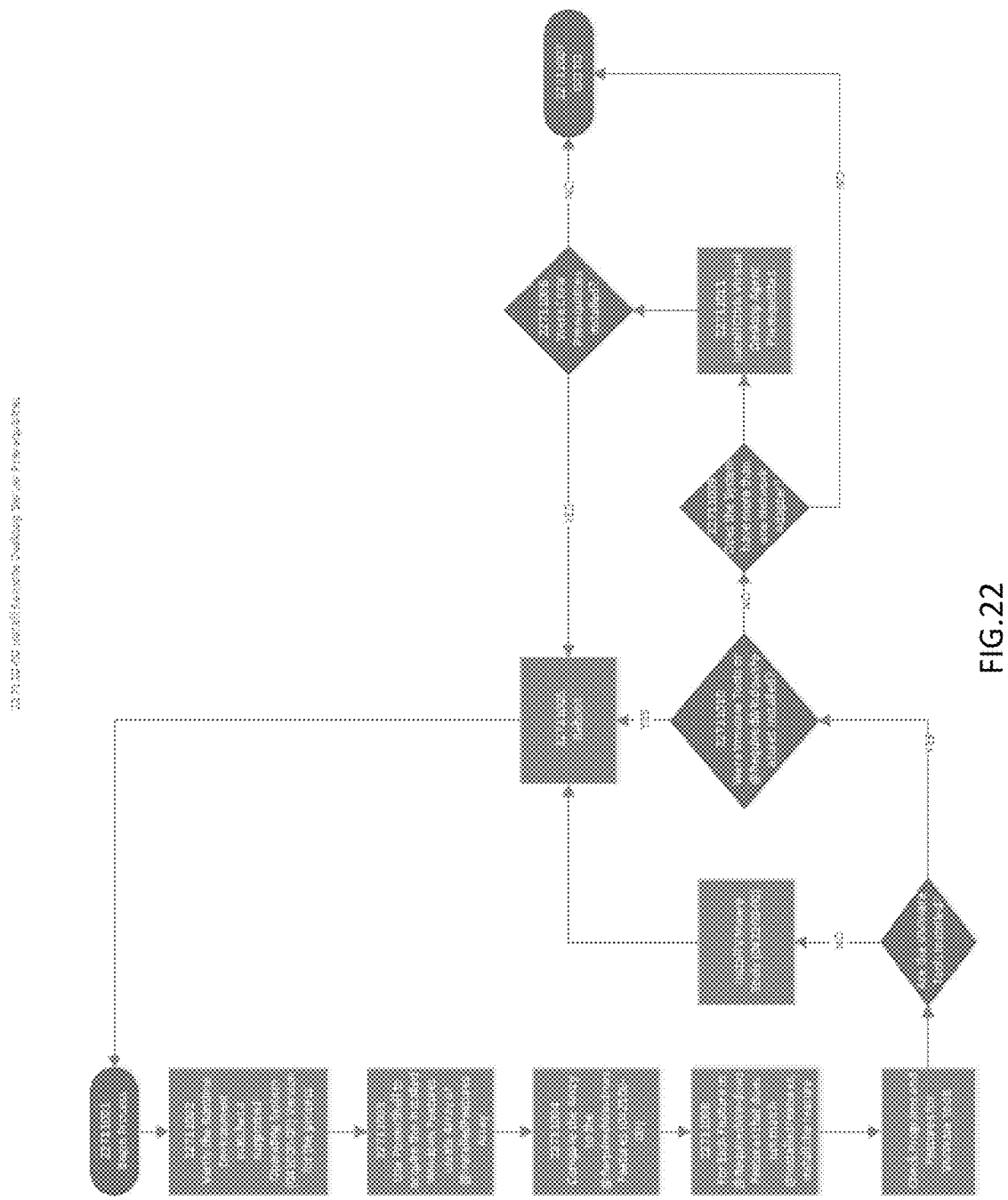
FIG. 22 illustrates an exemplary method for installation of remote desktop server prerequisite for the desktop image configuration process described in FIG. 21.

FIG. 22 illustrates an exemplary method for installation of remote desktop server prerequisite for the desktop image configuration process described in FIG. 21. At 22711001, the installation of remote desktop server prerequisite can begin. At 22711002, the match between the runtime environment and a supported operating system can be verified. At 22711003, PowerShell can be used to acquire the installed windows features and create array of @ InstalledFeatures Array. At 22711004, the array can be compared to the @RequiredWindowsFeatures (e.g., as described in FIG. 47). At 22711008, a feature in @RequiredWindowsFeatures that does not match @InstalledFeatures can be installed. At 22711020, programs and features for VMWare can be checked. At 22711021, it can be determined whether the VMware tools have been installed. If the determination at 22711021 is negative, at 22711022, VMware tools can be installed (e.g., as described in FIG. 48). If the determination at 22711021 is affirmative, at 22711010, it can be determined whether VMware tools or @RequiredWindowsFeatures were installed. If the determination at 22711010 is affirmative or after 22711022, at 22711005, system reboot can take place followed by 22711001. If the determination at 22711010 is negative, at 22711009, it can be determined whether the system can have more than one network adapter. If the determination at 22711009 is affirmative, at 22711011, CITRIX virtual desktop agent prerequisites can be installed. At 22711006, it can be determined whether CITRIX prerequisites have been installed. If the determination at 22711006 is affirmative, 22711005 can be performed. If the determination at 22711006 or 22711009 is negative, at 22711007, the installation of remote desktop server prerequisites can proceed to 22710006 of FIG. 21.

Figure 23:
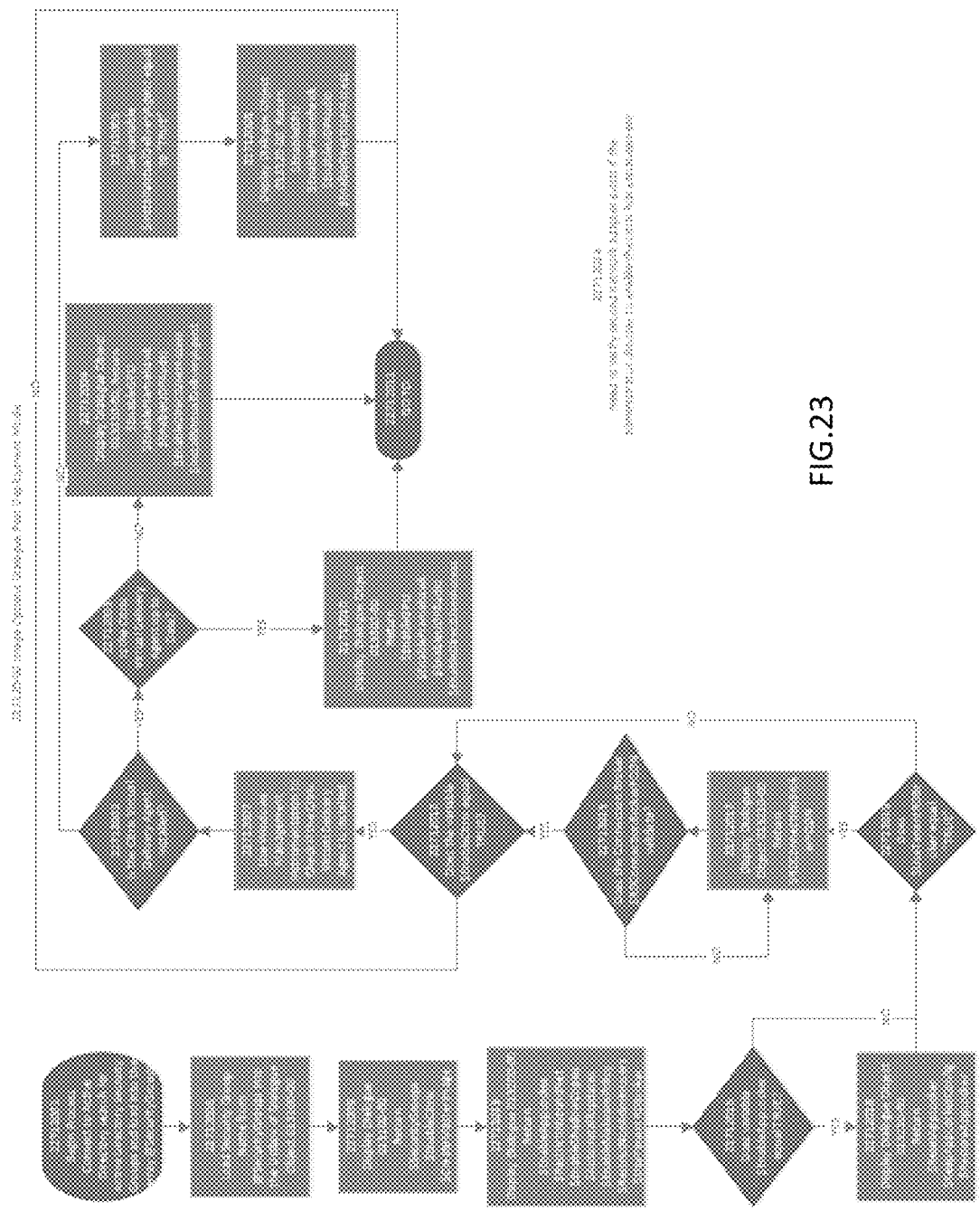
FIG. 23 illustrates an exemplary method of image options dialogue post deployment mode for the desktop image configuration process described in FIG. 21.
Figure 49:
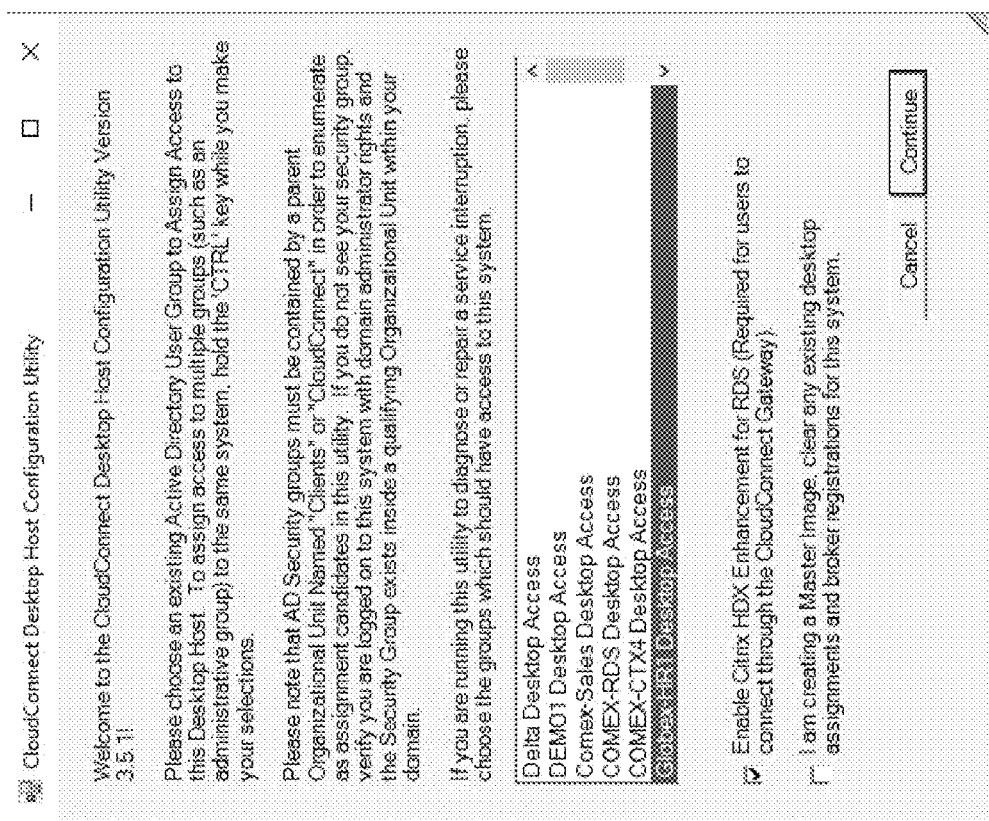
FIG. 49-55 illustrate example dialogue objects according to an example implementation.
Figure 50:
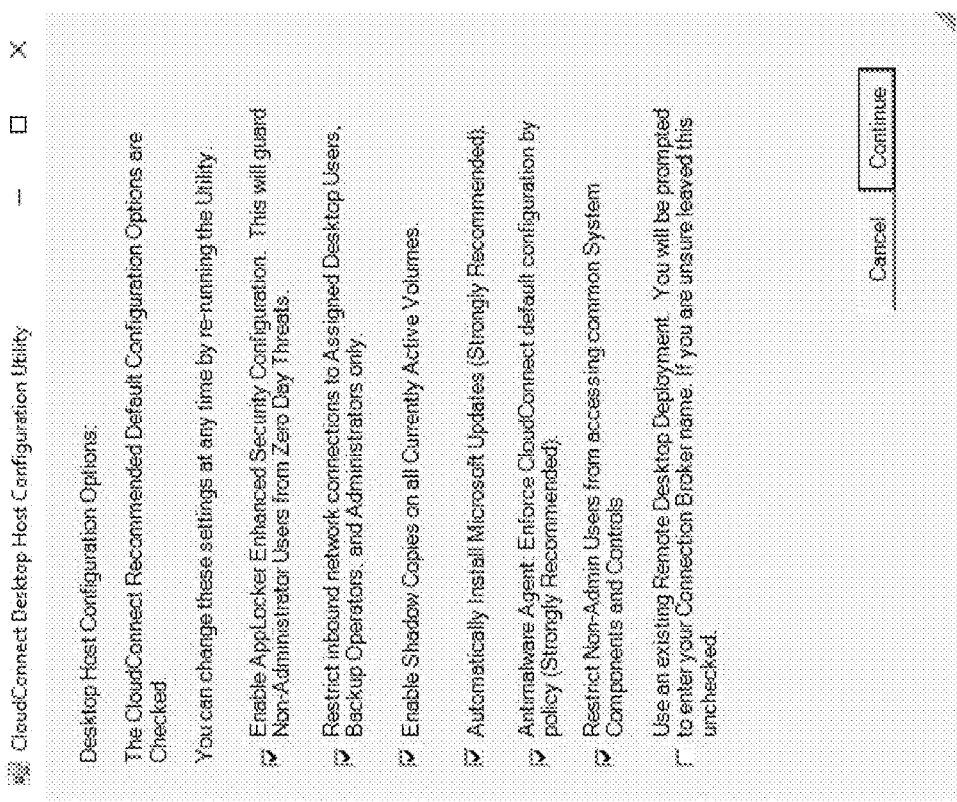
Figure 51:
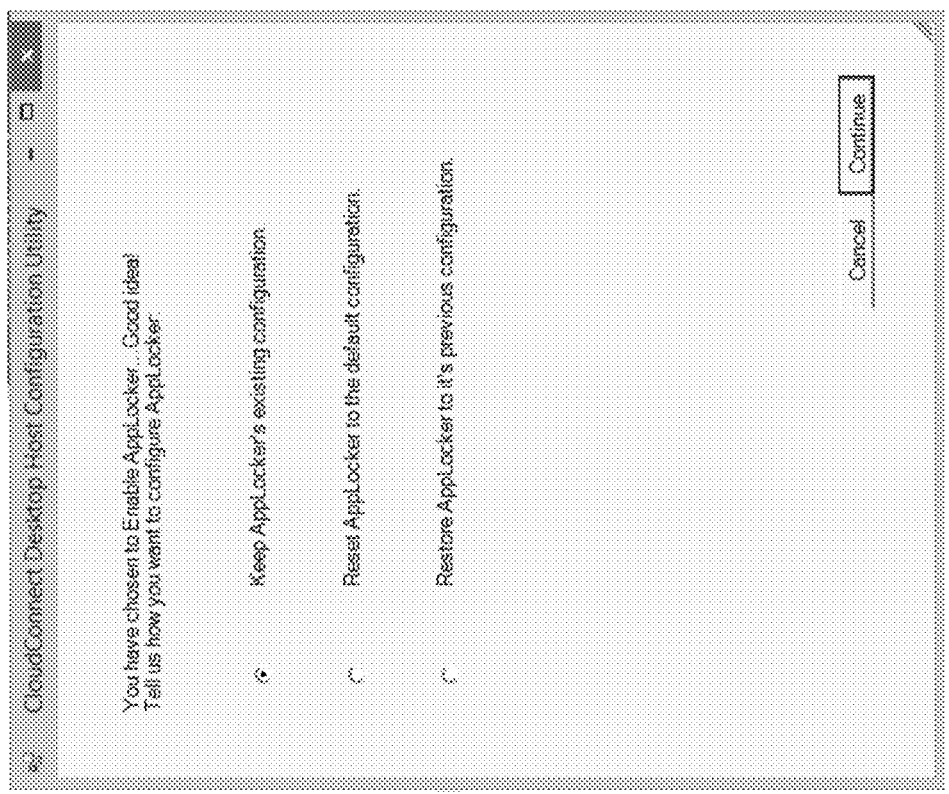
Figure 52:
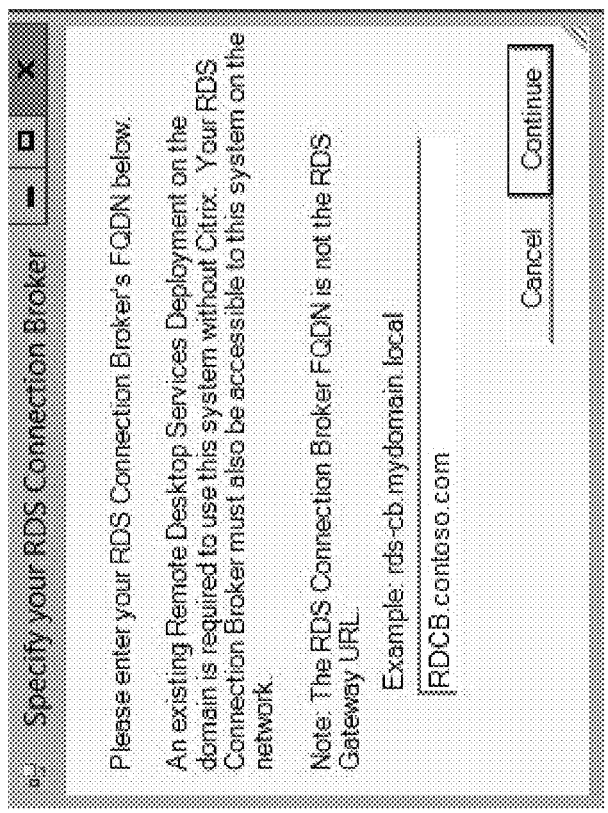
Figure 53:
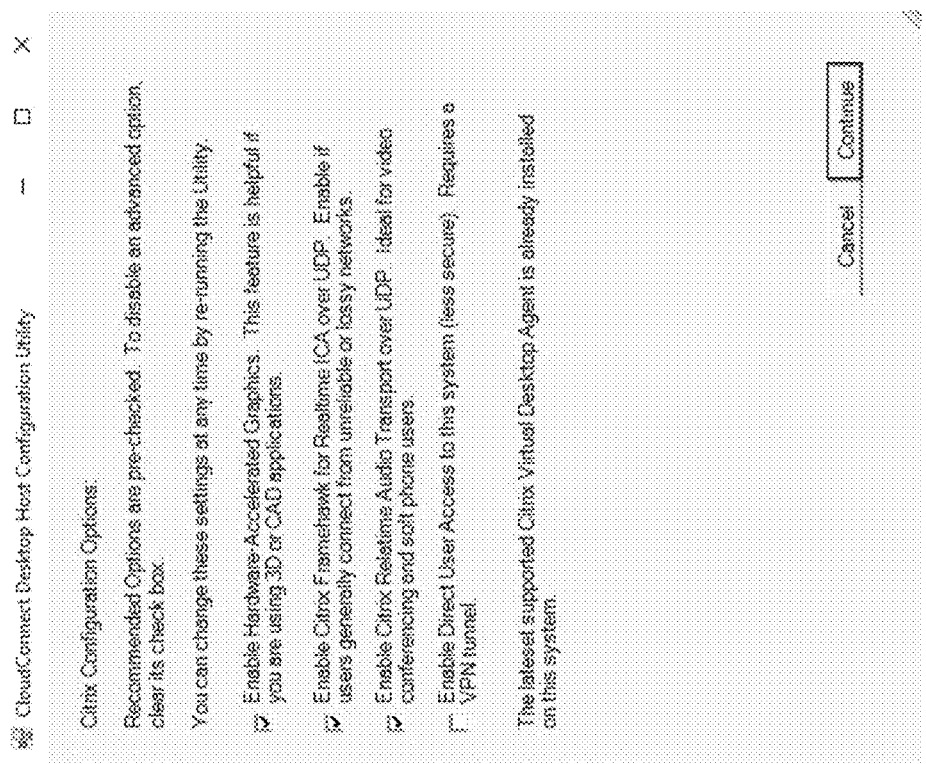
Figure 54:
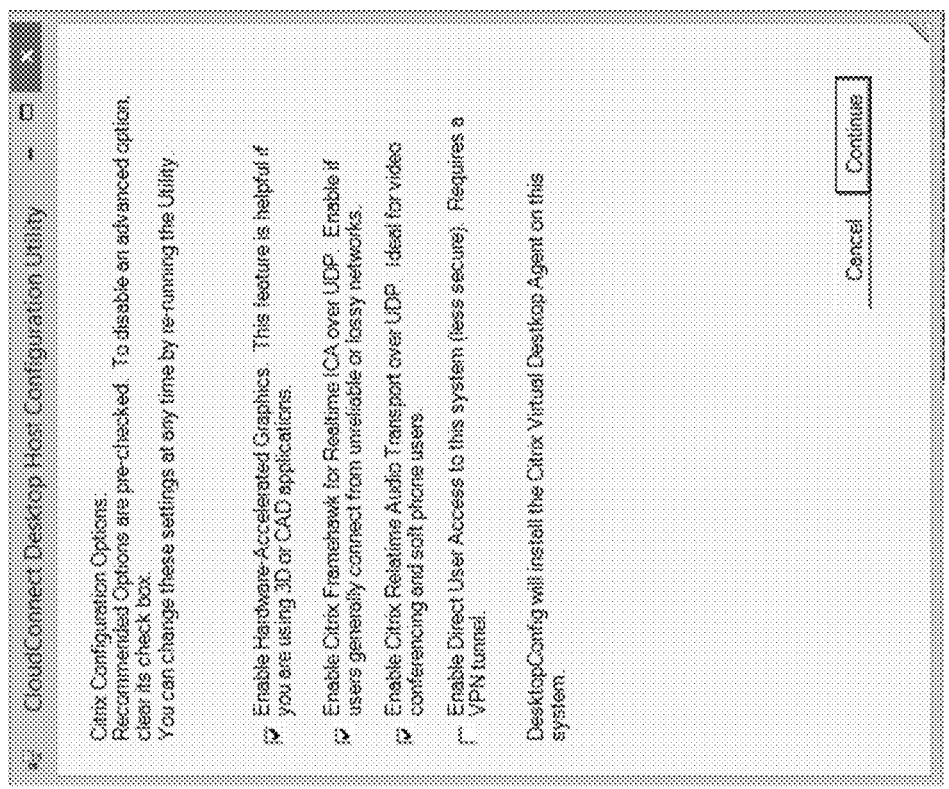
Figure 55:
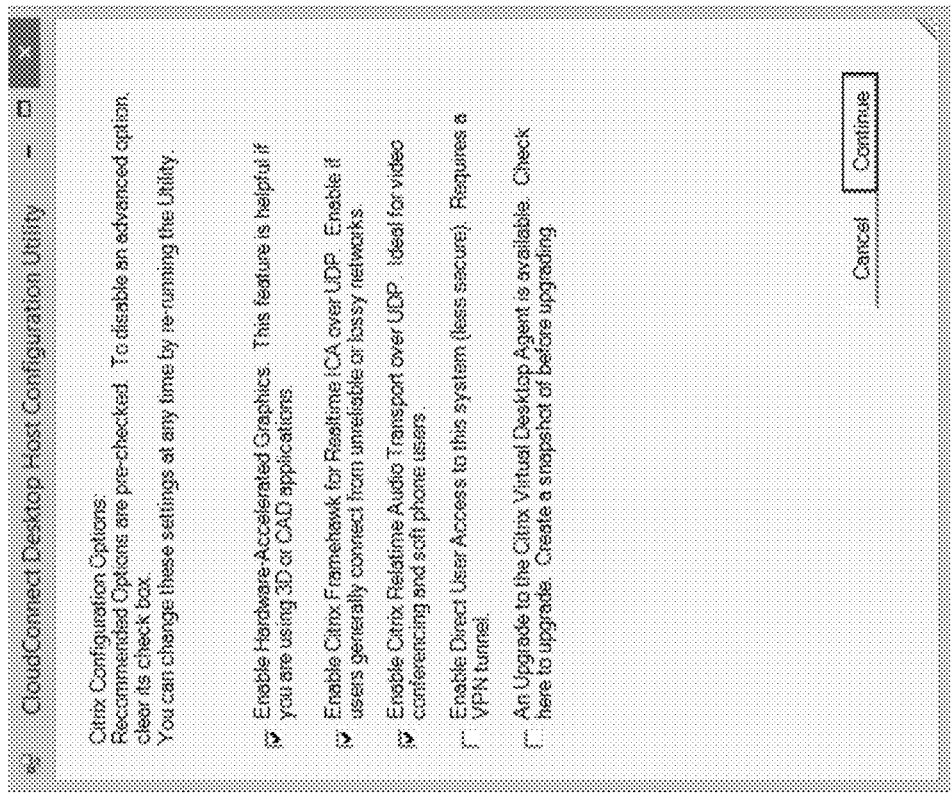

FIG. 23 illustrates an exemplary method of image options dialogue post deployment mode for the desktop image configuration process described in FIG. 21. At 22712001, Process Connect can be started which can activate directory search for active directory security group and load the search into the array @SecurityGroups. At 22712006, security group name can be loaded from @SecurityGroups into a listbox (e.g., as described in dialogue object 013100-00 of FIG. 49). At 22712009, a dialogue box (e.g., dialogue box 013100-00 described in FIG. XXX) can be presented and variables $SecurityGroups, $EnableCitrix and $CreateMasterImage can be returned. At 22712013, a dialogue box (e.g., dialogue box 013200-00 described in FIG. 50) can be presented and variables $EnableAppLocker, $RestrictInboundNet, $EnableShadowCopies, $AutoInstallUpdates, $EnableMalwarePolicy, $RestrictNonAdminUsers, and $UseTenantRDBroker can be returned. At 22712016, it can be determined whether variable $EnableAppLocker has a predetermined value (e.g., True). If the determination at 22712016 is affirmative, at 22712018, a dialogue box (e.g., dialogue box 013220-00 described in FIG. 51) can be presented and variables $ResetAppLocker, $KeepAppLockerConfig and $RestoreAppLocker can be returned. If the determination at 22712016 is negative or after 22712018, at 22712019, it can be determined whether variable $EnableAppLocker has a predetermined value (e.g., True). If the determination at 22712019 is affirmative, at 22712017, a dialogue box (e.g., dialogue box 013210-00 described in FIG. 52) can be presented and variable $RDConnectionBrokerFQDN can be returned. At 22712015, it can be determined whether the connection broker $RDConnectionBrokerFQDN is valid. If the determination at 22712015 is negative, 22712017 can be performed. If the determination at 22712015 is affirmative or if the determination at 22712019 is negative, at 22712012, it can be determined whether the variable $EnableCitrix has a predetermined value (e.g., True). If the determination at 22712012 is negative, the desktop configuration process (e.g., described in FIG. 21) can proceed to the process described in FIG. 24. If the determination at 22712012 is affirmative, at 22712007, windows management instrumentation can be used to check if the CITRIX virtual delivery agent is installed. At 22712002, it can be determined whether CITRIX virtual delivery agent is installed. If the determination at 22712002 is affirmative, at 22712003, it can be determined whether the CITRIX virtual delivery agent is up to date. If the determination at 22712003 is affirmative, at 22712010, a dialogue box (e.g., dialogue box 013300-00 described in FIG. 53) can be displayed and variables $EnableGPU, $EnableFramehawk, $EnableUDPAudio and $EnableDirectUserAccess can be returned. If the determination at 22712003 is negative, at 22712004, a dialogue box (e.g., dialogue box 013310-00 described in FIG. 54) can be displayed and variables $EnableGPU, $EnableFramehawk, $EnableUDPAudio and $EnableDirectUserAccess can be returned. If the determination at 22712002 is negative, at 22712005, variable $InstallVirtualDeliveryAgent can be set equal to a predetermined value (e.g., True). At 22712008, a dialogue box (e.g., dialogue box 013320-00 described in FIG. 55) can be displayed and variables $EnableGPU, $EnableFramehawk, $EnableUDPAudio and $EnableDirectUserAccess can be returned. After 22712008, 22712004 or 22712010, the deployment process can proceed to 22710011 of FIG. 21.

Figure 24:
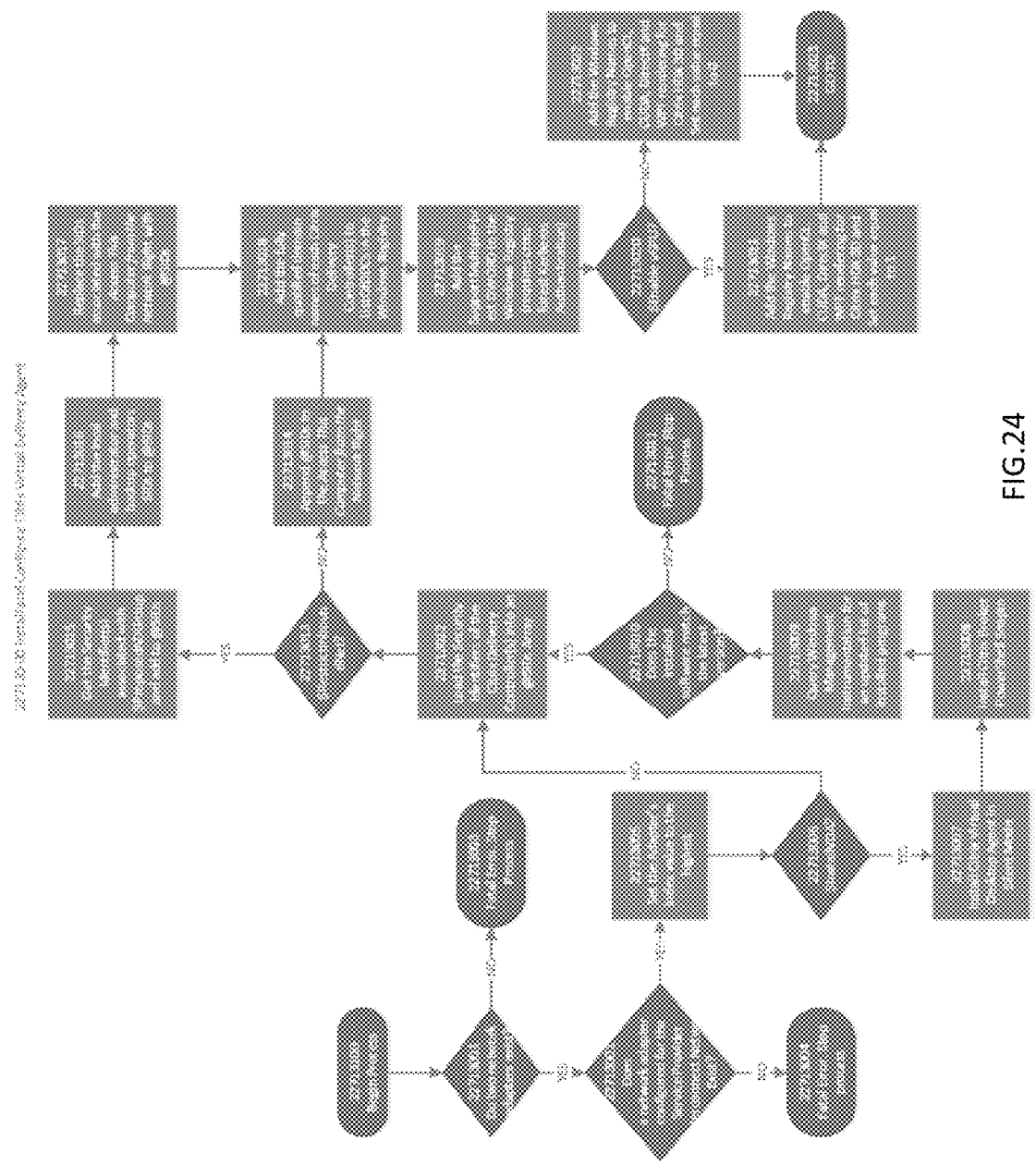
FIG. 24 illustrates an exemplary method for installing and configuring CITRIX virtual delivery agent for the desktop image configuration process described in FIG. 21.

FIG. 24 illustrates an exemplary method for installing and configuring CITRIX virtual delivery agent for the desktop image configuration process described in FIG. 21. Installation and configuring of CITRIX virtual delivery agent can begin at 22713100. At 22713001, it can be determined whether two network adapters exist. If the determination at 22713001 is negative, at 22713003, the installation and configuring process can end. If the determination at 22713001 is negative, at 22713002, it can be determined whether a network adapter configured for the service provider interconnect network exists. If the determination at 22713002 is negative, at 22713004, the installation and configuring process can end. If the determination at 22713002 is affirmative, at 22713005, the adapter's index value can be set to the a value indicating the adapter is not the tenant-controlled network adaptor such as the highest value. A Network Adapter's Index value is a method of prioritizing the adapter when more than one network adapter exists. The lower the value, the higher the priority. In this case, the adapter can be set to the highest possible value, because it is not the tenant-controlled network adapter, therefore it is not the primary network adapter. At 22713006, it can be determined whether variable $InstallVDA exists. At 22713007, CITRIX virtual desktop agent can be installed in silent mode. At 22713008, CITRIX broker powershell sna pin can be installed. At 22713009, windows management instrumentation can be queried for an updated list of installed programs. At 22713010, it can be determined whether the installed software match the latest version. If the determination at 22713010 is negative, at 22713011, the installation and configuring process can end. If the determination at 22713010 is affirmative, at 227130112, the security identifiers of one or more of the CITRIX delivery controllers can be loaded into @SIDs array. At 22713013, it can be determined whether variable $RestrictInboundNet exists. If the determination at 22713013 is negative, at 22713014, @SIDs can be appended to the access this computer from the network right, which is a right in a MICROSOFT WINDOWS Operating System. This right can granted to computers and users and groups, by adding their account or group Security Identifier (SID) to the Local Security Policy Configuration "Access this Computer from the Network." In this configuration, the system is locked down to ensure that only the assigned user security group and the appropriate management components (e.g., CITRIX delivery controller) can logon to the application server from the network (after proving their identity to the Computer, for example, via Kerberos Authentication). At 22713015, one or more of the security identifiers associated with $ProposedADGroup can be obtained and added to @SIDs. At 22713016, SIDs of the local administrator and backup operators can be added to @SIDs. At 22713017, the SIDs associated with the access this computer from the network right can be replaced with @SIDs. At 22713018, the SupportMultipleForest DWORD can be added to the windows registry. This can involve cross-forest Kerberos authentication. At 22713020 it can be determined whether variable $EnablevGPU exists. If the determination at 22713020 is negative, at 22713022, windows registry names can be added to enable OpenCL, CUDA, DirectX and WPF rendering for CITRIX HDX 3D and their values can be set to a first predetermined value (e.g., zero). If the determination at 22713020 is affirmative, at 22713021, windows registry names can be added to enable OpenCL, CUDA, DirectX and WPF rendering for CITRIX HDX 3D and their values can be set to a second predetermined value (e.g., one). After 22713021 or 22713022, the installation of remote desktop server prerequisites can proceed to 22710017 of FIG. 21.

Figure 25:
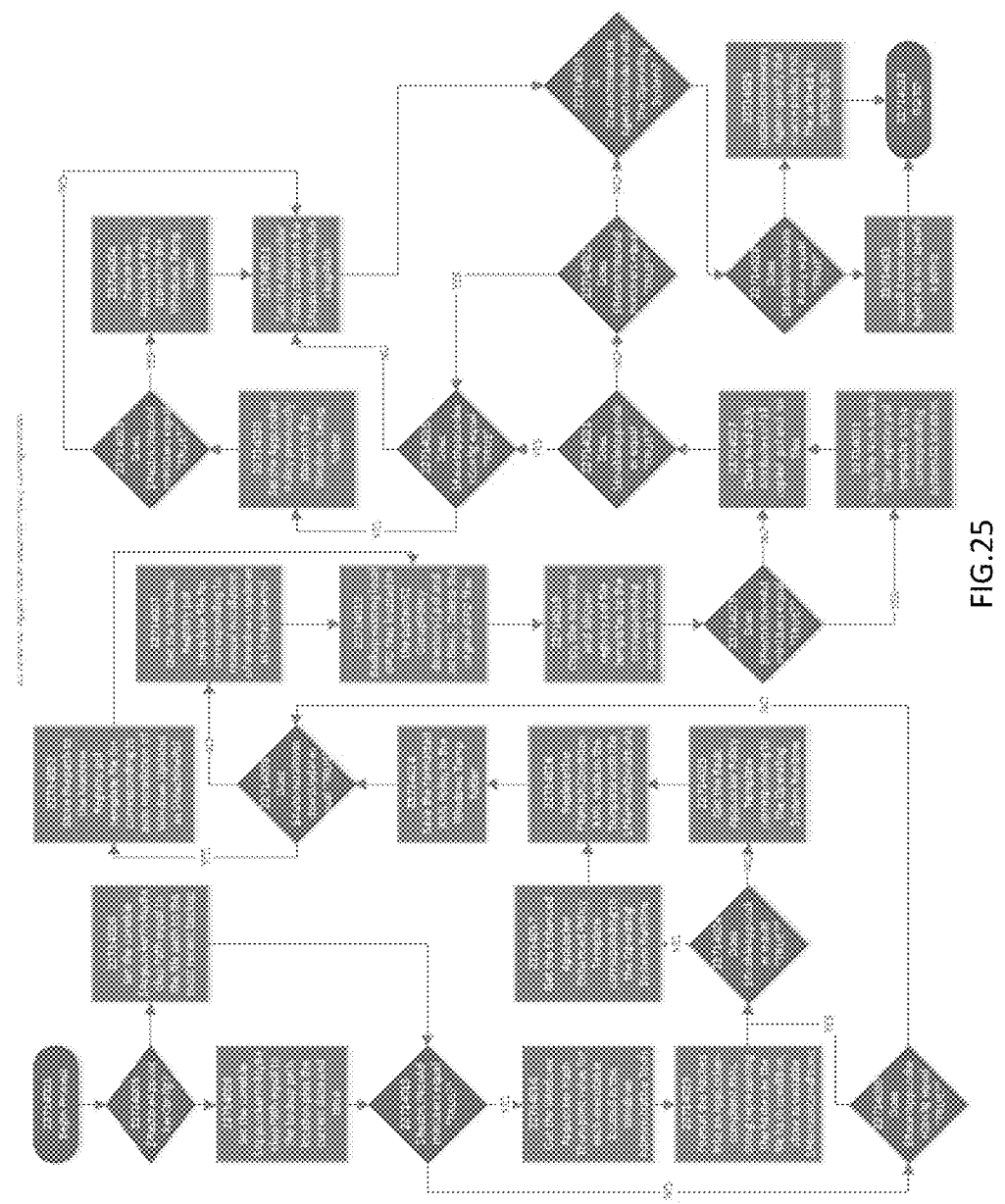
FIG. 25 illustrates an exemplary method for applying local security policy configuration for the desktop image configuration process described in FIG. 21.

FIG. 25 illustrates an exemplary method for applying local security policy configuration for the desktop image configuration process described in FIG. 21. At 22714001, the process beings. At 22714005 the value of $RestoreAppLockerConfig is determined and, if true, at 22714009, the variable $AppLockerPOlicy BavkupPath is set equal to the backup path location plus the current data and time. If the value of $RestoreAppLockerConfig is false, the variable $AppLockerPolicyBackupPath is set equal to the file path to the most recent backup. At 22714013 whether $RestrictNonAdminUsers equals true is determined and, if true, at 22714016 the WINDOS AppLocker Hash Thumbprint value is retrieved for each executable located in the WINDOWS administrative Tools, at 22714023 the hashes are formatted into an AppLocker compliant XML string representing the hashes as the file hash condition and stored as variable $FIleHashCOnditions. The process then proceeds to 22714024. If, at 22714013, $RestrictNonAdminUsers is not equal to true, then at 22714030 whether $Reset AppLockerConfig is true is determined and, if true, the process proceeds to 22714024, otherwise proceeds to 22714008.

At 22714024 whether $EnableAppLocker is true is determined and, if true, at 22714017 the enhanced AppLocker enhanced policy template corresponding to the operating system runtime is retrieved. If false, at 22714025, the Basic AppLocker policy template corresponding to the operating system runtime is retrieved. At 22714018, the FileHashCondition XML Node in the Template is replaced with the $FileHashConditions. At 22714014, the formatted XML Policy is saved in the WINDOWS temp folder. At 22714008, whether $AutoInstallWindowsUpdates is true is determined and, if true, at 22714002, the path to the Machine Registry.pol template file for corresponding to auto installation of WINDOWS updates is stored as $MachinePol and the process proceeds to 22714012. If false, at 22714007, the Machine Registry.pol template file for corresponding to manual installation of Windows Updates is retrieved as $MachinePol. At 22714012, existing local GPO files located in the system32 GroupPolicy directory is backed up and the original GPO files are deleted. At 22714019, the Machine and AllUser registry.pol file templates are copied to the corresponding system32 location. At 22714026, whether $RestrictNonAdminUsers is true is determined and if true, at 22714031 the NonAdminUser registry.pol template is copied to the corresponding system32 location and the process proceeds to 22714027. If false, at 22714027, the read only attributes of all copied .pol and .ini files are cleared.

At 22714021, 22714022, 22714015, 22714020, 22714003 and 22714028 whether a number of conditions are true is determined (including $EnableAppLocker, $ResetAppLockerConfig, $RestrictNonAdminUsers, $EnableMalwarePolicy, and whether the antimalware agent is included with the operating system). Depending on the conditions, at 22714010 the AppLocker Policy previously stored in the Windows Temp folder can be set, at 22714004 the AppLocker Policy stored in the Windows Temp folder can be deleted, and at 22714011 the AppLocker Policy stored in the $AppLockerPolicyBackupPath can be set. If $EnableMalwarePolicy is not true, then at 22714032 the Antimalware Agent can be installed without specifying a policy otherwise at 22714029 the Antimalware Agent can be installed and can specify the source policy XML file. At 22714033, the installation of remote desktop server prerequisites can proceed to 22710012 of FIG. 21.

Figure 26:
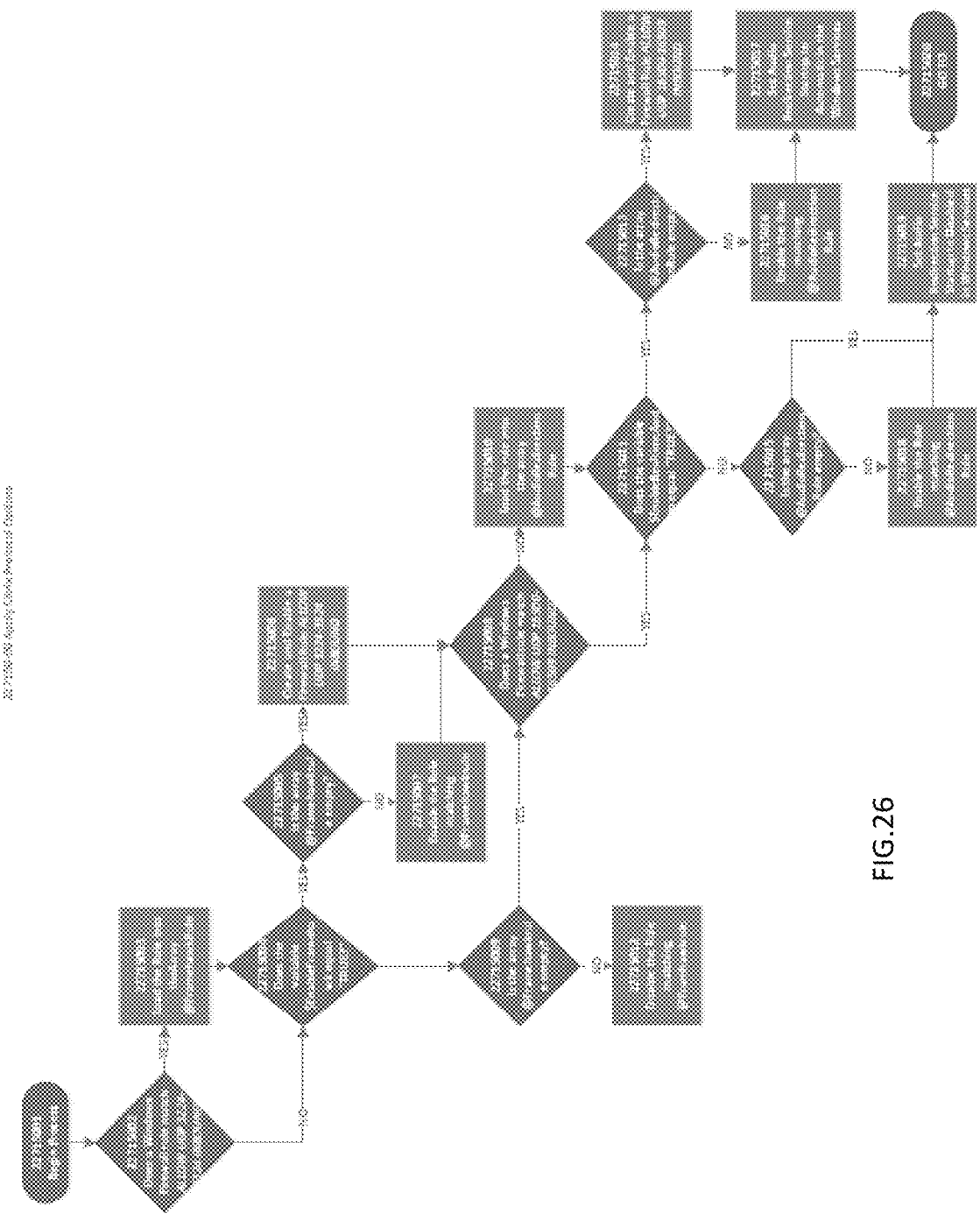
FIG. 26 illustrates an exemplary method for applying CITRIX protocol options for the desktop image configuration process described in FIG. 21.

FIG. 26 illustrates an exemplary method for applying CITRIX protocol options for the desktop image configuration process described in FIG. 21. Application of CITRIX protocol option can begin at 22715001. At 22715002, it can be determined whether a windows firewall rule matches ALLOW UDP 3224-3324 INBOUND. If the determination at 22715002 is affirmative, at 22715003, the rule can be loaded into @FremehawkRule array. If the determination at 22715002 is negative, at 22715004, it can be determined whether the variable $EnableFramehawk has a predetermined value (e.g., True). If the determination at 22715004 is negative, at 22715009, it can be determined whether the array @FremehawkRule is empty. If the determination at 22715009 is negative, at 22715012, the rule matching @FremehawkRule can be disabled.

If the determination at 22715005 is affirmative, at 22715005, it can be determined whether the array @FremehawkRule is empty. If the determination at 22715005 is negative, at 22715007, the rule matching @FremehawkRule can be enabled. If the determination at 22715005 is affirmative, at 22715006, a firewall rule ALLOW UDP 3224-3324 INBOUND can be created and enabled. After 22715006 or 22715007, or if the determination at 22715009 is affirmative, at 22715008, it can be determined whether a windows firewall rule matches ALLOW UDP 16500-16509 INBOUND. If the determination at 22715008 is negative, at 22715010, the firewall rule can be loaded into the array @AudioRedirection rule. If the determination at 22715008 is affirmative, at 22715011, it can be determined whether the variable $EnableRealtime Audio is a predetermined value (e.g., True).

If the determination at 22715011 is affirmative, at 22715013, it can be determined whether the array @ AudioRedirection rule is empty. If the determination at 22715013 is affirmative, at 22715014, Firewall Rule ALLOW UDP 16500-6509 INBOUND can be created and enabled. If the determination at 22715013 is negative, at 22715016, the rule matching @AudioRedirection rule can be enabled. After at 22715014 or at 22715016, at 22715017, audio redirection service startup can be set to automatic in the windows services.

If the determination at 22715015 is negative, at 22715018, the rule matching @AudioRedirection rule can be enabled. If the determination at 22715015 is affirmative or after 22715018, at 22715019, audio redirection service startup can be disabled in windows services. After 22715019 or 22715017, at 22715020, the installation of remote desktop server prerequisites can proceed to 22710009 of FIG. 21.

Figure 27:
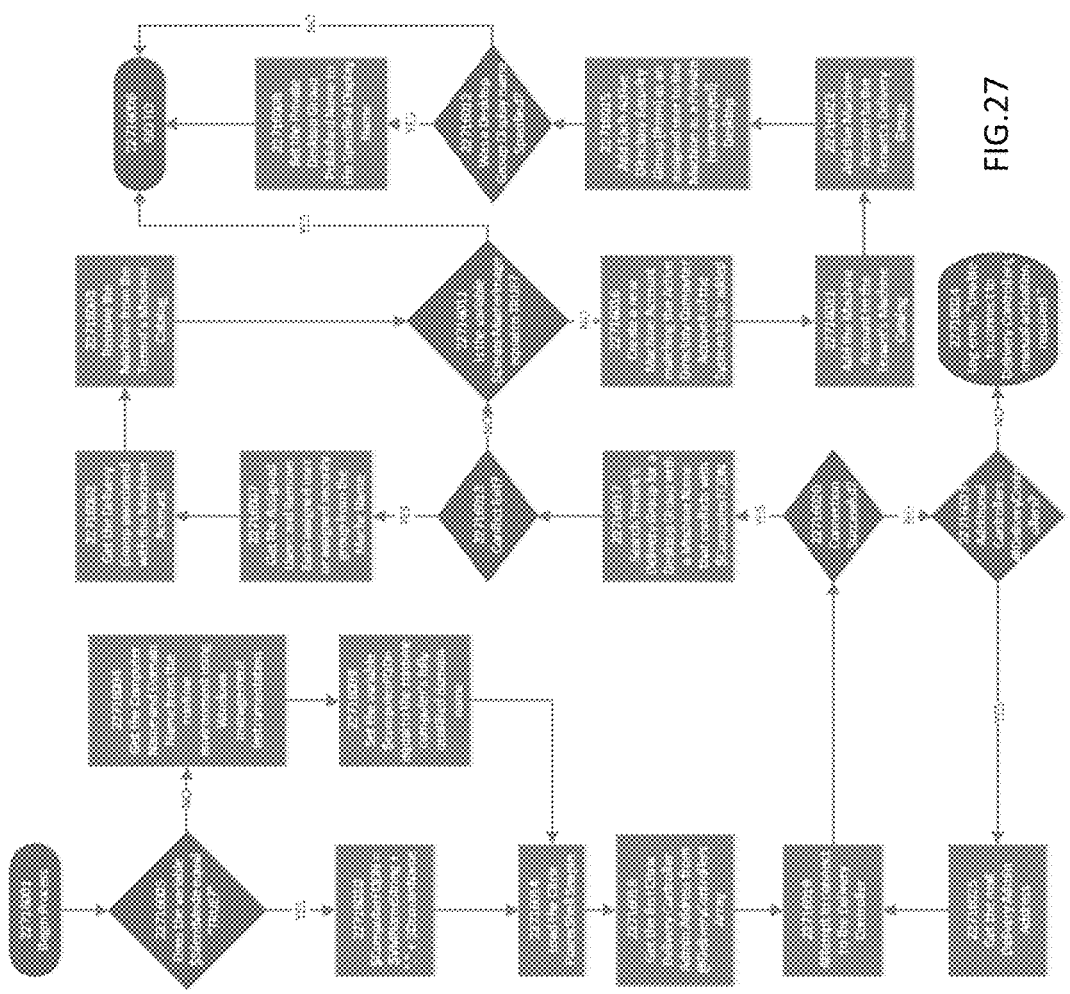
FIG. 27 illustrates an exemplary method for adding server to service provider CITRIX delivery controller for the desktop image configuration process described in FIG. 21.

FIG. 27 illustrates an exemplary method for adding server to service provider CITRIX delivery controller for the desktop image configuration process described in FIG. 21. The adding of server can begin at 22716001. At 22716005, it can be determined whether the variable $SilentMode is equal to a predetermined value (e.g., True). If the determination at 22716005 is negative, at 22716004, the computer name and domain name can be obtained from the runtime environment using windows management instrumentation. At 22716009, the variable $ComputerFQDN can be set equal to the runtime computer's fully qualified domain name. If the determination at 22716005 is affirmative, at 22716010, variable $ComputerFQDN can be set equal to $VMNameString+"."+$DomainName. After 22716010 or 22716009, at 22716018, the first CITRIX delivery controller admin address can be obtained from @DeliveryControllers array. At 22716019, connection to the delivery controller can be attempted. At 22716020 it can be determined whether the connection to the delivery controller has been successfully established. If the determination at 22716020 is negative, it can be determined at 22716023 whether @DeliveryControllers array includes information related to additional controllers. If the determination at 22716023 is affirmative, at 22716025, the next delivery admin address can be obtained followed by the step at 22716019. If the determination at 22716023 is negative, at 22716024, an error message can be displayed (e.g., "Unable to connect to delivery controllers, manual activation required."). If the determination at 22716020 is affirmative, at 22716017, tenant's delivery group can be searched for a desktop group with a machine name that conflicts with $ComputerFQDN. At 22716013 it can be determined whether a conflict exists. If the determination at 22716013 is affirmative, at 22716007, the assigned users can be obtained and each assigned user and/or assigned security group can be removed from the machine name. At 22716002, the delivery group associated with the machine account can be obtained. At 22716003, the machine from the tenant's machine catalog can be removed. After 22716003 or if the determination at 22716013 is negative, it can be determined at 22716011 whether the variable $CreateMasterImage has a predetermined value (e.g., True). If the determination at 22716011 is affirmative, at 22716006, the installation of remote desktop server prerequisites can proceed to the method described in FIG. 28. If the determination at 22716011 is negative, at 22716016, a new machine account matching the active directory computer account of the system to be added can be created. At 22716021, the machine account can be added to the tenant's machine catalog. At 22716022, the machine account can be added to the tenant's delivery group. At 22716015, each active directory security group can be added as an assigned user to the machine as a private (unmanaged) desktop.

At 22716012 it can be determined whether a desktop group display name has been specified. If the determination at 22716012 is affirmative, at 22716008, the private desktop group published name can be set to the specified display name. If the determination at 22716012 is negative or after 22716008, at 22716006, the installation of remote desktop server prerequisites can proceed to 22710010 of FIG. 21.

Figure 28:
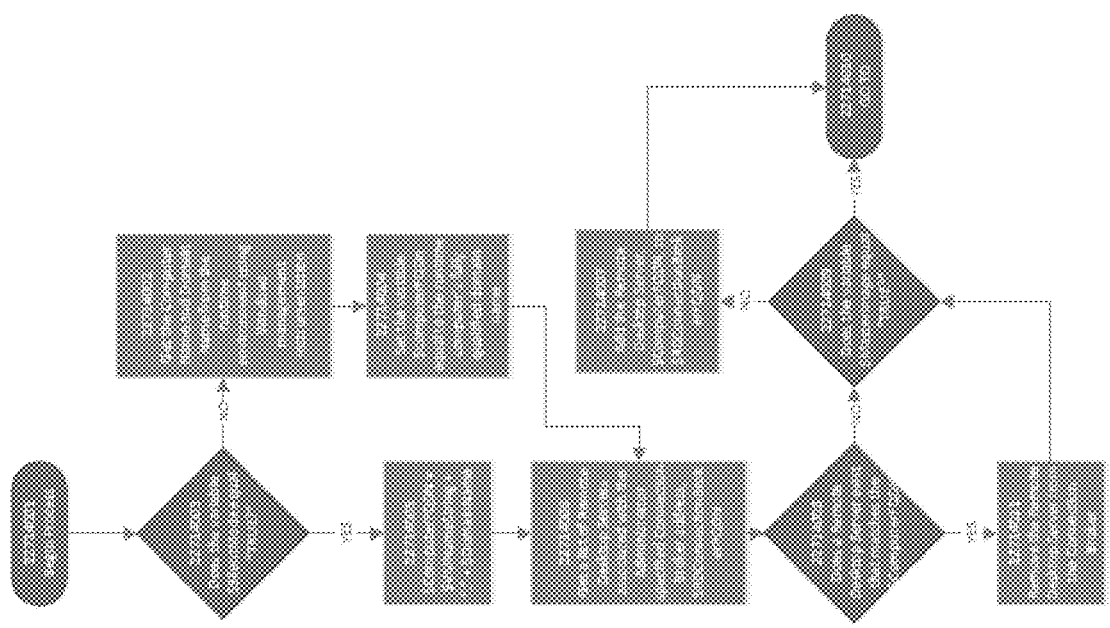
FIG. 28 illustrates an exemplary method for adding server to tenant remote desktop connection broker for the desktop image configuration process described in FIG. 21.

FIG. 28 illustrates an exemplary method for adding server to tenant remote desktop connection broker for the desktop image configuration process described in FIG. 21. The tenant's use of a Remote Desktop Connection Broker is entirely optional and not required when the Application Server being deployed is a CITRIX XenApp Server (i.e. the variable $EnableCitrix=TRUE). However, some tenants may opt to use built in Microsoft Remote Desktop Protocol, in which case the Service Provider does not facilitate remote connectivity to the tenant's application server via the Service Provider managed CITRIX Access Gateway 405.

The process of adding server to tenant remote desktop connection can begin at 22717001. At 22717003, it can be determined whether the variable $SilentModeequal has a predetermined value (e.g., True). If the determination at 22717003 is affirmative, at 22717005, variable $ComputerFQDN can be set to $VMNameString+"."+$DomainName. If the determination at 22717003 is negative, at 22717002, the computer name and domain name can be obtained from the runtime environment using windows management instrumentation. At 22717004, the variable $ComputerFQDN can be set equal to the runtime computer's fully qualified domain name. After 22717005 or 22717006, a list of remote desktop servers associated with the administrator specified connection broker address and $RDConnectionBrokerFQDN can be obtained. At 22717008, it can be determined whether a remote desktop server exists that can match the $ComputerFQDN. If the determination at 22717008 is affirmative, at 22717011, the remote desktop server from the connection broker can be removed. If the determination at 22717008 is negative or after 22717011, at 22717009, it can be determined whether the variable $MasterImage has a predetermined value (e.g., True). If the determination at 22717009 is affirmative, at 22717010, the installation of remote desktop server prerequisites can proceed to 22710004 of FIG. 21. If the determination at 22717009 is negative, at 22717007, the remote desktop server and $ComputerFQDN can be added to $RDConnectionBrokerFQDN followed by 22717010.

Figure 29:
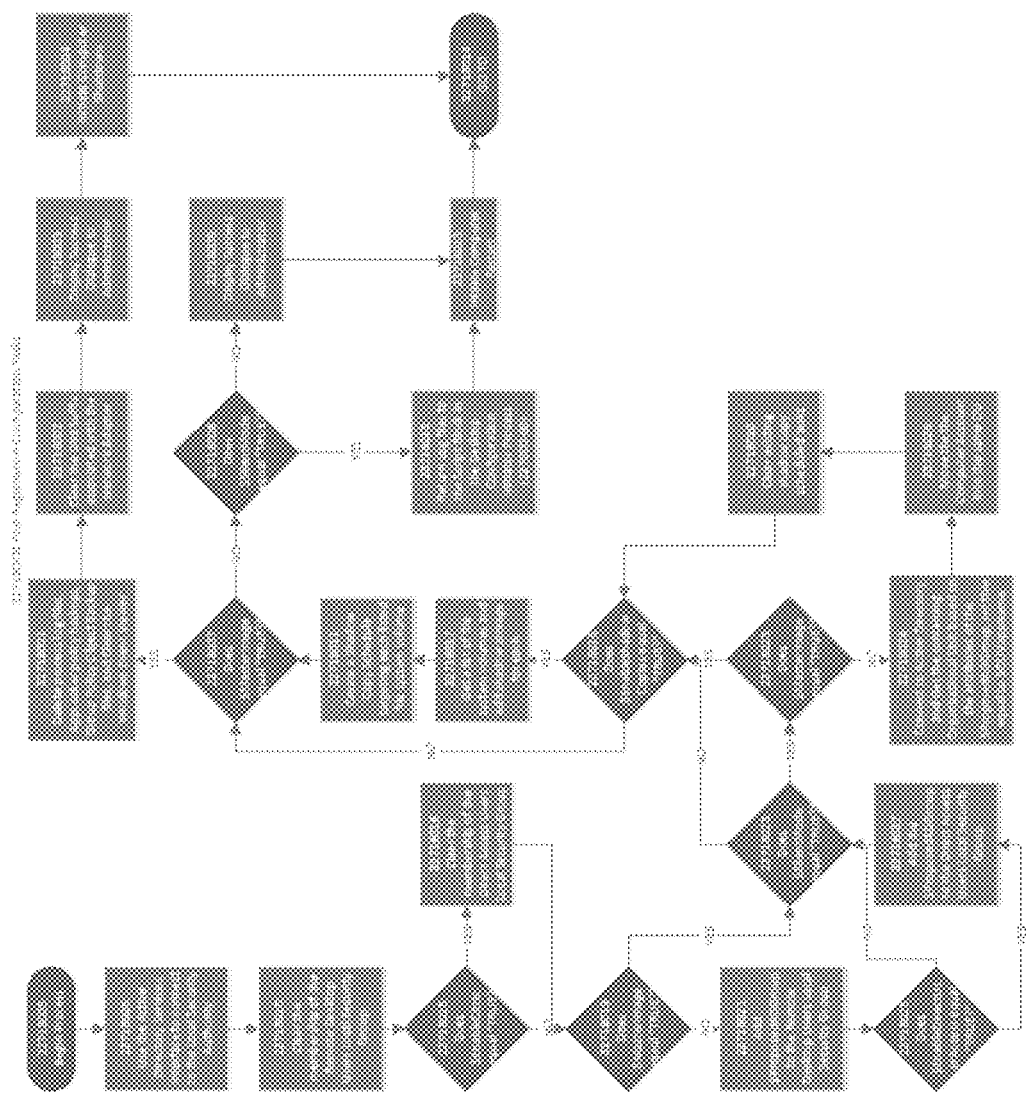
FIG. 29 illustrates an exemplary post registration configuration tasks process for the desktop image configuration process described in FIG. 21.

FIG. 29 illustrates an exemplary post registration configuration tasks process for the desktop image configuration process described in FIG. 21. Post registration configuration tasks process can begin at 22718005. At 22718006, the active directory services interface can be used to connect to the local security authority. At 22718010, the membership of the Remote Desktop Users local security group can be cleared. At 22718015, it is determined whether $EnableCitrix has a predetermined valued (e.g., True). If the determination at 22718015 is affirmative, at 22718016, the membership of the Direct Access Users local security group can be cleared. If the determination at 22718015 is negative, at 22718019, it is determined whether $MasterImage has a predetermined valued (e.g., True). If the determination at 22718019 is negative, at 22718021, $ProposedADGroup can be added to the Remote Desktop Users local security group. After 22718021, it is determined whether $EnableDirectUserAccess has a predetermined valued (e.g., True). If the determination at 22718025 is affirmative, at 22718027, the $ProposedADGroup can be added to the Direct Access Users local security group. If the determination at 22718025 is negative, at 22718022, it can be determined whether $SilentMode has a predetermined valued (e.g., True). If the determination at 22718022 is affirmative, at 22718023, it can be determined whether variable $MasteraImage has a predetermined value (e.g., True). If the determination at 22718023 is negative, at 22718024, connection to Active Directory can be established. Organizational unit based on the attributes of the $ProposedADGroup can be obtained and can be set equal to $OUVappName. At 22718026, the computer account can be moved into the same OU. At 22718020, existing shadow copy scheduled tasks can be cleared. After 22718020, or if the determination at 22718023 is affirmative or if the determination at 22718022 is negative, at 22718018, it can be determined whether $EnableShadowCopies has a predetermined value (e.g., True). If the determination at 22718018 is affirmative, at 22718017, a list of file system volumes can be obtained and shadow storage can be added for each element in the list of file system volumes. At 22718011, a shadow copy schedule that can target each listed file system can be created.

At 22718007, it can be determined whether variable $MasteraImage has a predetermined value (e.g., True). If the determination at 22718007 is affirmative, at 22718001, process log files, AppLocker policy backups, Group Policy Object Backup files can be deleted and the windows event viewers can be cleared. At 22718002, the DNS suffix associated with the network adapter can be cleared. At 22718003, a success dialogue can be displayed to the administrator. At 22718004, computer shutdown can be initiated.

If the determination at 22718007 is negative, at 22718008, it can be determined whether variable $SilentMode has a predetermined value (e.g., True). If the determination at 22718008 is negative, at 22718009, a success dialogue can be displayed to the administrator. If the determination at 22718008 is affirmative, at 22718012, log files can be returned to the script block in the desktop configuration initiator process (e.g., as described in FIG. 20). After 22718012 or 22718009, computer restart can be initiated. After 22718013 or 22718004, at 22718014, the desktop configuration initiator process can proceed to 22710014 of FIG. 21.

Before the Service Provider provides CITRIX services to a given tenant, a script illustrated in FIG. 64 and denoted 111000-00 can be executed on the CITRIX Delivery Controller object (shown in FIG. 4 object 205). The following is an example script:

```
Import-Module ActiveDirectory
$TenantDomainFQDN=Read-Host "Enter the Tenant's
fully qualified Active Directory Domain Name:"
$CatalogAdminGroupName=
"ctxadmins."+$TenantDomainFQDN
$ServiceProviderDomain=(Get-Wmiobject
win32_ComputerSystem).Domain
$ServiceProviderNetBiosDomainName=
$ServiceProviderDomain.split(".") |Select -First 1
$BrokerDNSName=(Get-Wmiobject
win32_ComputerSystem).Name
$BrokerFQDN=
$BrokerDNSName+"."+$ServiceProviderDomain
$AdminAddress=$BrokerFQDN+":80"
New-ADGroup -Server $ServiceProviderDomain -Group
Scope
    DomainLocal -Name $CatalogAdminGroupName
    $Group=Get-ADGroup -Identity $CatalogAdminGroupName
    $Member=Get-ADGroup    -Server    $TenantDomain
FQDN -
    Identity 'Domain Admins'
    Add-ADGroupMember $Group -Member $Member
    $TenantDelegatedAdministrators=
    $ServiceProviderNetBiosDomainName+$CatalogAdminGroupNa
me
    Add-PSSnapin Citrix*
    $TenantNetBiosDomainName=
    (($TenantDomainFQDN).split(".") |Select-Object -First
1).ToUpper( )
    $DisplayName=$TenantNetBiosDomainName+"-Static"
    $TenantDomainUsers=$TenantDomainFQDN+"\Domain
Users"
    New-BrokerCatalog—MachinesArePhysical $true -
    AllocationType Static -Name $DisplayName -
    PersistUserChanges    OnLocal    -ProvisioningType
Manual -
    SessionSupport MultiSession
    New-BrokerDesktopGroup -DesktopKind Private -Name
    $DisplayName -SessionSupport MultiSession
    $DesktopGroupUid=(Get-BrokerDesktopGroup
    $DisplayName).Uid
    New-BrokerAssignmentPolicyRule
    $TenantNetBiosDomainName -DesktopGroupUid
    $DesktopGroupUid -Enabled $true -
    IncludedUserFilterEnabled $true
    New-BrokerAccessPolicyRule $TenantNetBiosDomainName -
    IncludedUserFilterEnabled $true -IncludedUsers
    $TenantDomainUsers    -DesktopGroupUid    $DesktopGroupUid -
    AllowedProtocols "HDX"-AllowRestart $true
    $CatalogUid=(Get-BrokerCatalog $DisplayName).Uid
    New-AdminScope -AdminAddress $AdminAddress -
    Description $TenantNetBiosDomainName -Name
    $TenantNetBiosDomainName
    Add-BrokerScope -AdminAddress $AdminAddress -
    DesktopGroup $DesktopGroupUid -InputObject
    @($TenantNetBiosDomainName)
    Add-BrokerScope -AdminAddress $AdminAddress -Catalog
    $CatalogUid -InputObject @($TenantNetBiosDomainName)
    New-AdminAdministrator -AdminAddress $AdminAddress -
    Enabled $True -Name $TenantDelegatedAdministrators
    Add-AdminRight -AdminAddress $AdminAddress -
    Administrator $TenantDelegatedAdministrators -Role
    "Delivery Group Administrator"-Scope
    $TenantNetBiosDomainName
    Add-AdminRight -AdminAddress $AdminAddress -
    Administrator $TenantDelegatedAdministrators -Role
    "Machine Catalog Administrator"-Scope
    $TenantNetBiosDomainName
```

Although a few variations have been described in detail above, other modifications can be possible. For example, other IaaS and DaaS platform combinations and implementations is possible. For example, the IaaS and DaaS can include not only vCloud Director and CITRIX XENAPP but MICROSOFT System Center Virtual Machine Manager, CITRIX XenServer, Microsoft System Center Virtual Machine Manager, Microsoft Remote Desktop Services, CITRIX XenServer, CITRIX XenApp and XenDesktop, VMware vCloud Director, VMware View, Amazon Web Services, Amazon Workspaces, Microsoft Azure, Azure Remote App, and the like.

Figure 57:
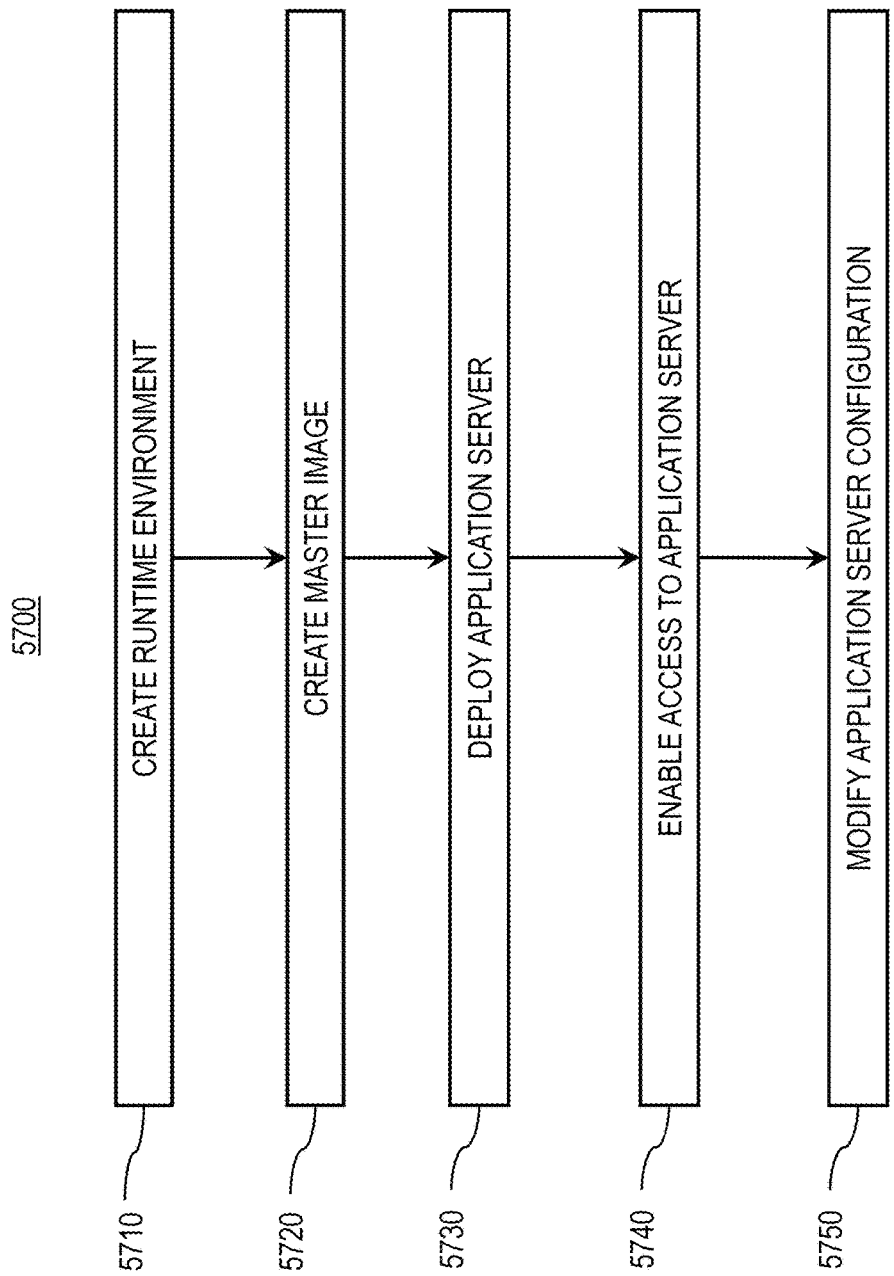
FIG. 57 includes a process flow diagram according to some implementations of the current subject matter.

FIG. 57 includes a process flow diagram according to some implementations of the current subject matter. At 5710, the runtime environment can be created. The runtime environment can be created, for example, as described with reference to FIGS. 30-34. Required service provider customizations can be applied to the tenant's domain. Service provider XenApp deployment can be configured and can include a database, delivery controller, licensing server, and a NetScaler gateway. A Citrix Machine Catalog and Citrix Delivery Group can be created on the service provider's Citrix XenApp Delivery Controller, the administrator of which is delegated to the tenant.

At 5720, a master image can be created. Creating the master image can include creating a first "resource server" virtual machine and operably coupling to the network; installing a WINDOWS Operating System into the virtual machine; mounting a DVD containing a prepackaged desktop configuration process and executing that process on the first server that configures it to function as an application server for hosting applications to be accessed remotely via ICA or RDP; installing applications into the Operating System; and powering off and moving the server to a Catalog to be stored as a Master Image (Template).

At 5730, application server can be deployed. The deployment process can include mounting a DVD containing a prepackaged Deployment Wizard Process on the Domain Controller Virtual Machine representative of the Domain to which the Application Server should become a member; collecting information from the administrator to complete the deployment; collecting the Desktop Configuration Options from the administrator through a dialogue process; acquiring additional information to complete the deployment from the runtime environment; performing a conflict resolution process to ensure uniqueness of the vCloud API and Active Directory objects to be created from within the tenant's environment; creating a security group in Active Directory to represent the deployment; creating a VXLAN-backed distributed port group; cloning the master image created above, and instantiating it, operably coupling to the tenant VXLAN network and second adapter to the service provider network, joining to the domain via sysprep, and the like.

The deployment process can include polling the domain controller to verify it has joined to the domain; polling the network for the presence of the newly created application server; adding the machine account to a service provider created CITRIX XenApp and XenDesktop Machine Catalog, the administration of which is delegated to the tenant; and adding the machine account to a service provider created Citrix XenApp and XenDesktop Delivery Group, the administration of which is delegated to the tenant.

The deployment process can include assigning the machine account to the created active directory security group; retrieving a list of remote application servers associated with an administrator-specified tenant-managed Remote Desktop Services connection broker address; adding a runtime computer name of the first server to the list of remote application servers associated with the administrator specified connection broker address; mounting the Desktop Configuration virtual DVD to the newly created application server using the vCloud Director API; remotely executing the Desktop Configuration process on the newly created application server using WINDOWS PowerShell remote session, and passing an answer file of configuration settings through to the Desktop Configuration process; applying the local security configuration and desktop configuration options as specified by the administrator during the deployment process dialogue enabling members of the security group to access the system over the network. The deployment process can be repeated in series and/or in parallel.

At 5740, access to the application server can be enabled. Enabling access can include installing necessary applications into the deployed application server; creating active directory user accounts if required; adding created or existing active directory user accounts to the security group to authorize the users for application access. End users of tenant can access the remote applications through the Service Providers NetScaler Gateway or a tenant-provided VPN or Remote Desktop proxy. The Service Provider NetScaler gateway can authenticate the users against the tenant's Active Directory Domain and verify their membership in the requisite security group before routing the connection to the associated computer account within the tenant's domain.

At 5750, application server configurations can be modified. These post deployment configuration/assignment changes can include mounting the Desktop Configuration Media to the Application Server and running a process. The process can read active directory for a list of security groups. The security group(s) to which the system should be reassigned can be selected. The administrator can select the security configuration options the administrator would like to change. The administrator can select the CITRIX configuration options the administrator would like to change.

The machine account can be added to a service provider created CITRIX XenApp and XenDesktop Machine Catalog, the administration of which is delegated to the tenant. The machine account can be added to a service provider created CITRIX XenApp and XenDesktop Delivery Group, the administration of which is delegated to the tenant. The machine account can be assigned to the created active directory security group. A list of remote application servers associated with an administrator-specified tenant-managed Remote Desktop Services connection broker address can be retrieved and a runtime computer name can be added of the first server to the list of remote application servers associated with the administrator specified connection broker address. The local security configuration and Desktop configuration options as specified by the administrator during the deployment process dialogue can be applied enabling members of the selected security group to access the system over the network.

FIGS. 58-63 illustrate descriptions of variable names discussed above.

Figure 30:
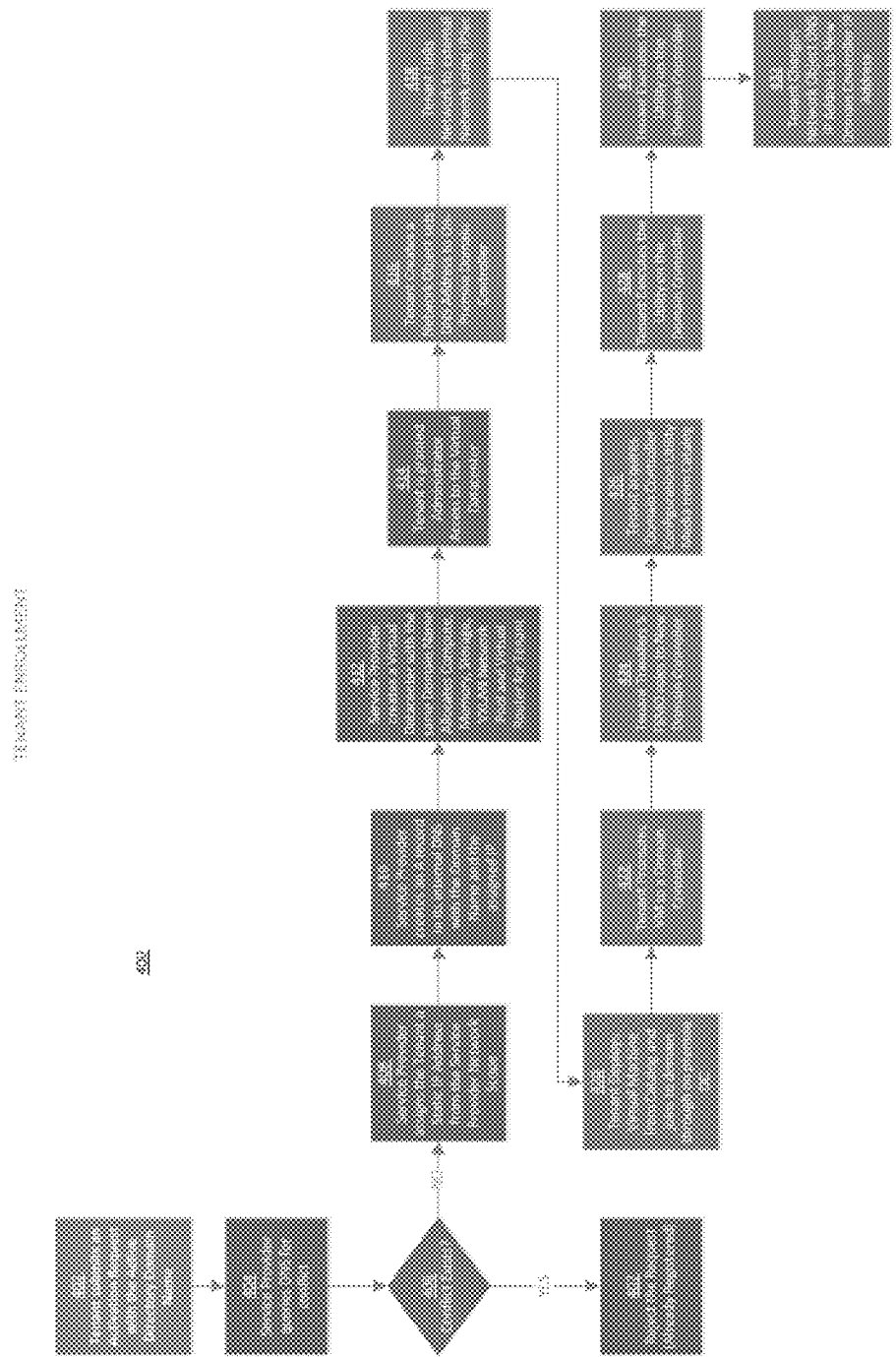
FIG. 30 illustrates a process of enrollment (which can also be referred to as onboarding, registration, or establishment) of a tenant with a cloud service provider.

FIG. 30 illustrates a process 400 of enrollment (which can also be referred to as onboarding, registration, initialization, or establishment) of a tenant relationship with a cloud service provider. Referring again to the runtime environment illustrated in FIG. 3, the process 400 can be performed prior to instantiation of the tenant's first application server. The process 400 can be required to be performed only once when that tenant first enrolls, and can be completed as a prerequisite to establish cross-realm Kerberos authentication ("the trust"). The enrollment of the tenant can be a self-service process—that is, the process 400 can be performed by the tenant without any intervention from the cloud service provider. The objective of the enrollment is to securely create a bidirectional cross-realm Kerberos trust relationship between tenant's existing Kerberos realm (e.g. 106 or 104) and the service provider's Kerberos realm 102, leveraging the networking architecture described above. The networking architecture described above describes the end result or end functionality of the self-service enrollment process (i.e. it presupposes the realm trust relationships already exist, now we address a method for a sample tenant to create such trust relationship using the above-described networking architecture as a context for the Trust creation for such sample tenant). The execution of the process 400 can, in one example, take one to two hours including tenant's manual creation of a directory server ("domain controller") in a virtual machine running on the cloud service provider's IaaS. The process 400 can be performed manually or in an automated manner. The process 400 can be performed to ensure that there are no IP address conflicts and no collisions of internal domain names ("realm names"). While avoiding of conflicts in internal network domain names can be described, in an alternate networking architecture conflicts in public internet facing domain names can also be avoided.

Prior to the enrollment, the tenant's realm 104 may or may not exist. If it exists, it may exist externally (for example at the tenant's place of business, datacenter, with another service provider, on a campus network, or any combination thereof). In this scenario, tenant seeks to extend their existing realm 104 to the service provider platform such that virtual machines created by tenant on service provider IaaS can be joined to the same tenant-controlled realm 104. This has obvious advantages for management, security, migration, and systems coexistence. Once the realm 104 is extended, tenant further seeks to create the bidirectional trust with the service provider's realm such that the tenant's virtual machines running on service provider's IaaS can begin to receive the network services (i.e. REMOTE DESKTOP SERVICES, CITRIX XENAPP, license activation, etc.) from those servers located in the service provider's realm 102. Alternatively, tenant can choose to create a new tenant realm from scratch (this is less advantageous for existing IT environments but more advantageous for new IT environments).

A tenant (e.g., tenant 1 or tenant 2) can submit, at 402, an activation request with an active directory domain name for the forest root domain or Kerberos realm name. An Active Directory Forest Root Domain Name is the MICROSOFT WINDOWS implementation of a Kerberos realm name. It should be noted that this process also works for MICROSOFT NTLM TRUSTS ("EXTERNAL TRUSTS"). In this case, cross realm authentication of resources and users is achieved using NTLM Authentication instead of the more secure Kerberos protocol. This NTLM implementation would require the service provider and tenant to both use MICROSOFT WINDOWS for their respective directory servers ("domain controllers") as NTLM is a proprietary network authentication protocol in WINDOWS.

The cloud service provider can query, at 404, the directory server 204 for domain name conflicts with other tenants. The cloud service provider can determine, at 406, whether a realm ("domain") name conflict exists. The likelihood for collision on a domain name for an internal network can often be low particularly if such realm name is a subdomain of an ARIN reserved top-level domain name. However, the checking for a domain name (realm name) conflict can provide a safety check. If there is a domain name conflict, the cloud service provider can reject, at 407, the enrollment and inform the tenant that the cloud service provider is not able to provision the tenant under that realm ("domain") name. If the cloud service provider does not detect any conflict at 406 with any other tenants, the cloud service provider can assign, at 408, to the side of the virtual router 216/226 that connects to the isolated port group 302 a static IP address from the cloud service provider network scope. The cloud service provider can control that side of the virtual router, and prevent the tenant from changing the assigned static IP address.

The cloud service provider can then create, at 410, a DNS zone in its internal directory server's 204 DNS service with the realm name as the zone name and the @ record as the tenant router's external interface IP address. The cloud service provider's directory server's DNS service is authoritative for this zone. The cloud service provider can create, at 412, a virtual datacenter with the same domain name, and can allocate to that virtual datacenter shared infrastructure resources, such as memory, VXLAN network pool, a virtual router for the tenant, and other IaaS resources. The cloud service provider can grant, at 414, administrator authentication information (e.g., login credentials) to administer the software-defined datacenter.

The tenant can create, at 416, a network object (e.g., the VXLAN-backed distributed virtual port group 214/224) and sets the directory server address to the what will become the directory server 212/222. If seeking to create a new ream, the tenant can deploy, at 420, a virtual machine from the IaaS catalog and create a Kerberos realm or promote that virtual machine to a directory server ("domain controller") on the spot in which case the virtual machine becomes the directory server 212/222. If seeking to extend tenant's existing Kerberos realm from an existing environment (office, datacenter, campus network, or any combination thereof), the tenant links or connects, at 418, the realm 104/106 of the tenant to the realm 102 using internet protocol security (IPSec), which is a protocol suite for secure IP communications. Tenant joins the virtual machine to the domain. The catalog referred here is a data storage device on the cloud service provider's IaaS, which stores images or templates of virtual machines, as well as ISO Images of software applications. These catalogs are accessible to the tenant, and the tenant can load these catalog stored virtual machine images directly into or connect tenant's pools. Tenant can similarly connect catalog stored ISO images of software applications to tenant's virtual machines through a virtual DVD method (such method is common to all hypervisors). The tenant can promote, at 422, the virtual machine to a directory server ("domain controller") of tenant's existing realm. This virtual machine becomes the directory server 212/222. If using WINDOWS, the tenant can then transfer, at 424, five flexible single master operation (FSMO) roles to the new directory server 212/222. The tenant can acquire, at 426, domain controller configuration utility ISO Image from the catalog.

Once the tenant has established a directory server such as 212 or 222 on the service provider IaaS, the tenant can execute, at 428, the realm configuration utility on the directory server (e.g., 212 or 222). This utility is the process defined in FIG. 31 scripted and packaged as an executable that is provided by the cloud service provider. This utility is generic and is neither customized nor specially packaged for any single tenant. The tenant can execute, at 430, the utility on the directory server 212/222. The tenant can change, at 432, the DNS IP address used by the virtual machine provisioning process to provision virtual machines, so that those virtual machines now use the newly created directory server ("domain controller") as their primary DNS server. This setting is configured by the tenant on the tenant's VXLAN-backed distributed virtual port group, such as those 214 and 224.

Figure 31:
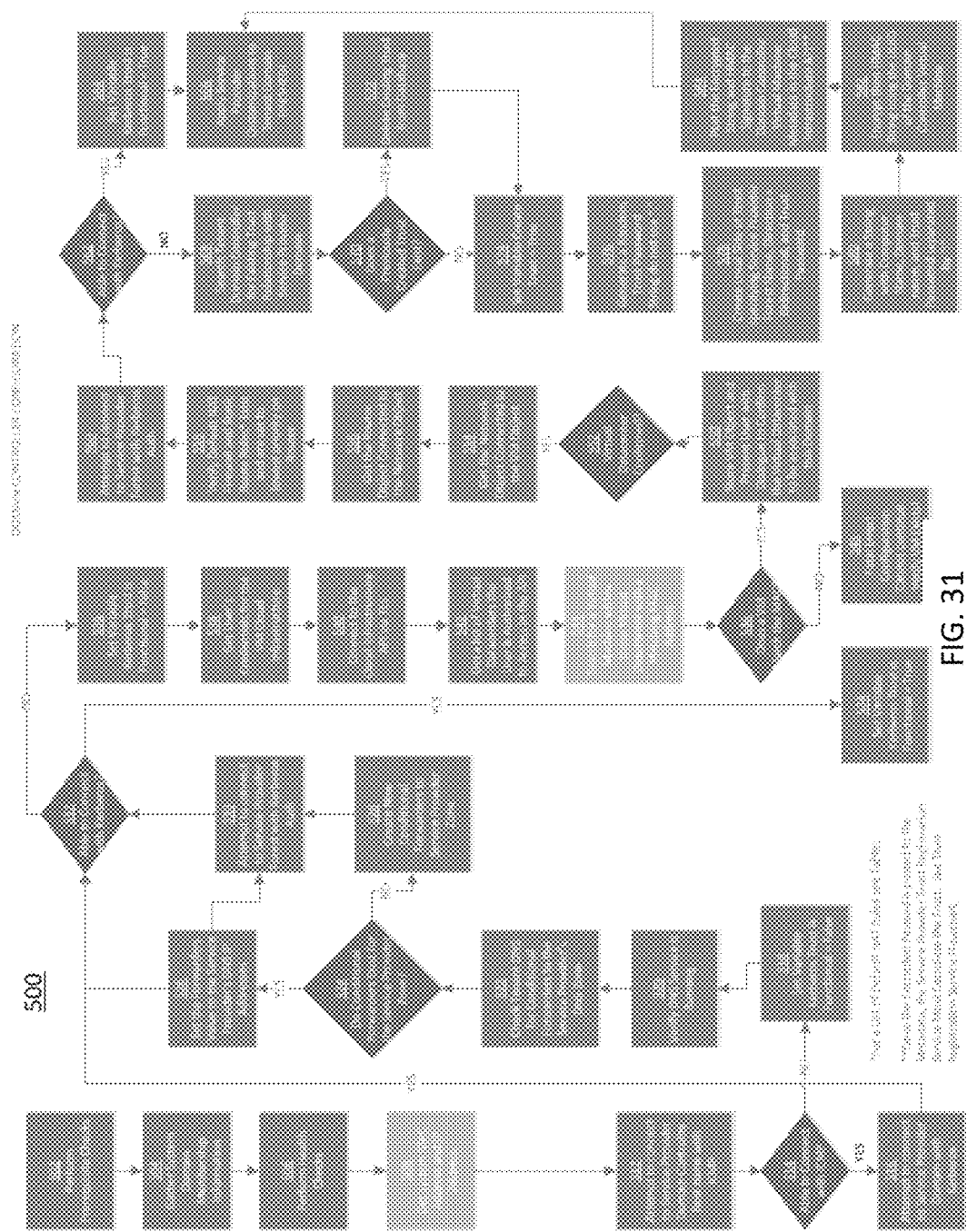
FIG. 31 illustrates a process of configuring the directory server by a tenant using a scripted process to create the tenant side of the Kerberos trust.

FIG. 31 illustrates a scripted process 500 of configuring the directory server 212/222 by a tenant. This process is tenant agnostic and requires little interaction or decision making by tenant. The process described in FIG. 5 is also presented in diagnostic form, meaning the process presupposes the existence of a fully functional cross-realm trust and invokes certain logic to repair or recreate this trust in the event it is not functional. It is therefore assumed that the absence of a trust is a broken trust, which the utility will create for the first time de facto through its diagnostic approach. Accordingly, the initial steps in the process 500 can seem redundant or unnecessary if proceeding under the assumption that the utility is creating the trust for the first time, however the utility uses a diagnostic approach to "learn" that it is actually creating the trust for the first time. Also encompassed here is the approach for creating the trust relationship for the first time through a non-diagnostic context as the diagnostic approach includes those steps for such non-diagnostic approach.

The realm configuration process 500 can be operated from the tenant's security context can perform, at 502, prerequisite checks to ensure that the operating system for the tenant is supported/authorized for configuring the directory server 212/222. The process, executed by the tenant and running under the tenant's security context and running on the tenant's directory server can gather, at 504, system domain membership information i.e. the name of the directory server, the name of the tenant's Kerberos realm ("domain name"). The process, can perform, at 506, health checks, such as common issues that can cause the creation of a trust relationship to fail. These health checks are not specific to the invention at issue here, however providing for a place to complete those health checks within the process improves the probability of success of the overall process, and provides useful diagnostic information should the process fail. The process can retrieve, at 508, media access control (MAC) address and IP address of the directory server 212/222.

The process can attempt, at 512, to connect to the cloud service provider's directory server 204 using internet control message protocol (ICMP). This connection can be a means for the tenant to test network connectivity to ensure that the configuration of the directory server is proceeding properly. The process can check, at 514, whether the tenant is able to connect using ICMP. If the process detects at 514 that it is able to connect, the process can attempt, at 516, to connect to the cloud service provider domain with Kerberos.

If the process detects at 514 that it is not able to connect, the cloud service provider can ensure that the directory server 204 is running and that the NAT tables 218/227 include a conditional forwarder that points/directs to the domain of the cloud service provider, as described in the following. The process can thus determine, at 518, whether Kerberos trust is functional. The process can verify, at 520, that the service by directory server 204 is running. The process can check, at 522, the tenant directory server 212/222 for a conditional forwarder that points/directs to the domain of the cloud service provider. The process can check, at 524, whether conditional forwarders exist for the cloud service provider DNS zone. If the process determines at 524 that the conditional forwarders exist, the process can set, at 526, values of the conditional forwarders to the IP address of the directory server 204. If the process determines at 524 that the conditional forwarders do not exist, the process can create, at 528, new conditional forwarders to the cloud service provider DNS zone. The process can attempt, at 530, to connect to the cloud service provider realm 102 with Kerberos authentication.

The process can determine, at 532, whether it is able to connect to the service provider directory server with Kerberos. If the process can determine at 532 that it is able to connect with Kerberos, the process can set, at 534, value of the variable whether Kerberos trust is functional as true. If the process determines at 532 that it is not able to connect with Kerberos, the process can set, at 536, value of the variable whether Kerberos trust is functional as false. The process can prompt for and receive, at 538, authentication credentials of a cloud infrastructure manager server ("fabric controller") API administrator user of the tenant. The authentication credentials are used to connect to the service provider's cloud infrastructure manager server API and can be used to locate the virtual machine object that is running the directory server 212/222. The process can connect, at 540, to an application programming interface (API) for the realm 102. The process can get, at 542, a list of virtual ("software-defined") datacenters that the tenant administrator is authorized to access in the API. The process can search, at 544, within those virtual datacenters for a virtual machine with a matching MAC address of the directory server 212/222.

The process can determine, at 546, whether a virtual machine matches the MAC address of the directory server 212/222. If the process determines at 546 that no virtual machine network interface connections match the MAC address, the process can indicate, at 548, that: an error has occurred, configuration of the directory server 212/222 cannot continue, and the user should verify/check the existence of the virtual machine. If the process determines at 546 that a virtual machine's network interface connection matches the MAC address, the process can store, at 550, the virtual machine API object data (e.g., directory server 212/222), determined the virtual machine's containing virtual data center, and present the tenant administrator user with a dialogue to confirm that the virtual datacenter is the virtual datacenter to be associated with this realm ("domain"). The process can determine, at 552, whether the tenant-assigned virtual datacenter exists. If the process confirms the existence of the tenant-assigned virtual datacenter at 552, the process can get, at 554, the network object (e.g., VXLAN-backed distributed virtual port group 214/224) connected to the virtual machine object (e.g., directory server 212/222). If the process is unable to locate the tenant-assigned virtual datacenter, the process stops, logs an error, and notifies the user to verify the credentials and provided to the process (those credentials being the tenant administrator credentials to connect to the cloud infrastructure API). The process can get, at 556, the router object (e.g., virtual router 216/226) connected to the network object (e.g., VXLAN-backed distributed virtual port group 214/224). The process can verify, at 558, existence of default NAT firewall rules and static route rules in the NAT tables 218/227. If these rules do not exist, the process can dynamically create these rules and set them to the lowest priority on the router. Lowest priority means that these rules will not preempt any other rules the tenant has programmed into their router for unrelated purposes. Therefore, the likelihood of this utility "breaking" an existing NAT configuration of the tenant is low.

The process can attempt, at 560, to connect to the realm 102 using Kerberos authentication. The process can determine, at 562, whether the tenant is able to connect to the realm 102. If the process determines at 562 that it has been able to connect to the realm 102, the process can set, at 564, value of the variable whether Kerberos trust is functional as true. The process can apply, at 566, customizations if required by the cloud service provider to the domain of the tenant, (e.g., customizations described in FIG. 56) and the configuration process ends. If however the process determines at 562 that it has not been able to connect to the realm 102, the process can search, the directory server 212/222 for existing trust relationship with the directory server 204.

The process can determine, at 570, whether a previously created trust relationship between the directory server 212/222 and the directory server 204 exists. If the process determines at 570 that a previously created trust relationship between the directory server 212/222 and the directory server 204 exists, the process can delete the existing trust relationship from the database. This is a database that exists on the Directory Server and is generally also used by the Kerberos service running on the Directory Server. If the process determines at 570 that there is no previously created trust relationship between the directory server 212/222 and the directory server 204, or after 572, the process can set the variable create trust as true.

The process can generate, at 576, a random trust password string where ":" is reserved as a delimiter character. The process can create, at 578, a local side of the trust by specifying: the cloud service provider, the name of the realm 102, direction as being bidirectional, and a password for the trust. The process can generate, at 580, a string ("the string") with the directory server computer name, realm name, and the randomly generated trust password. Each item, being delimited by a semicolon ":". The semicolon being used as it is an illegal character for the trust password, computer name, and real name. The process can encrypt, at 582, the string using a universally unique identifier (UUID) of the virtual machine characterizing the directory server 212/222.

The process can compute the hash message authentication code (HMAC) of this encrypted sting. The process can POST, at 584, the encrypted string and HMAC signature to the metadata of the virtual machine characterizing the directory server 212/222 in the cloud infrastructure API. Once the encrypted string and HMAC signature is posted to the virtual machine's metadata, the cloud service provider trust registration must complete the trust. The process of cloud service provider trust registration is described by FIG. 32. The process can apply, at 566, any other customizations by the cloud service provider to the realm of the tenant, and the configuration process ends.

Figure 32:
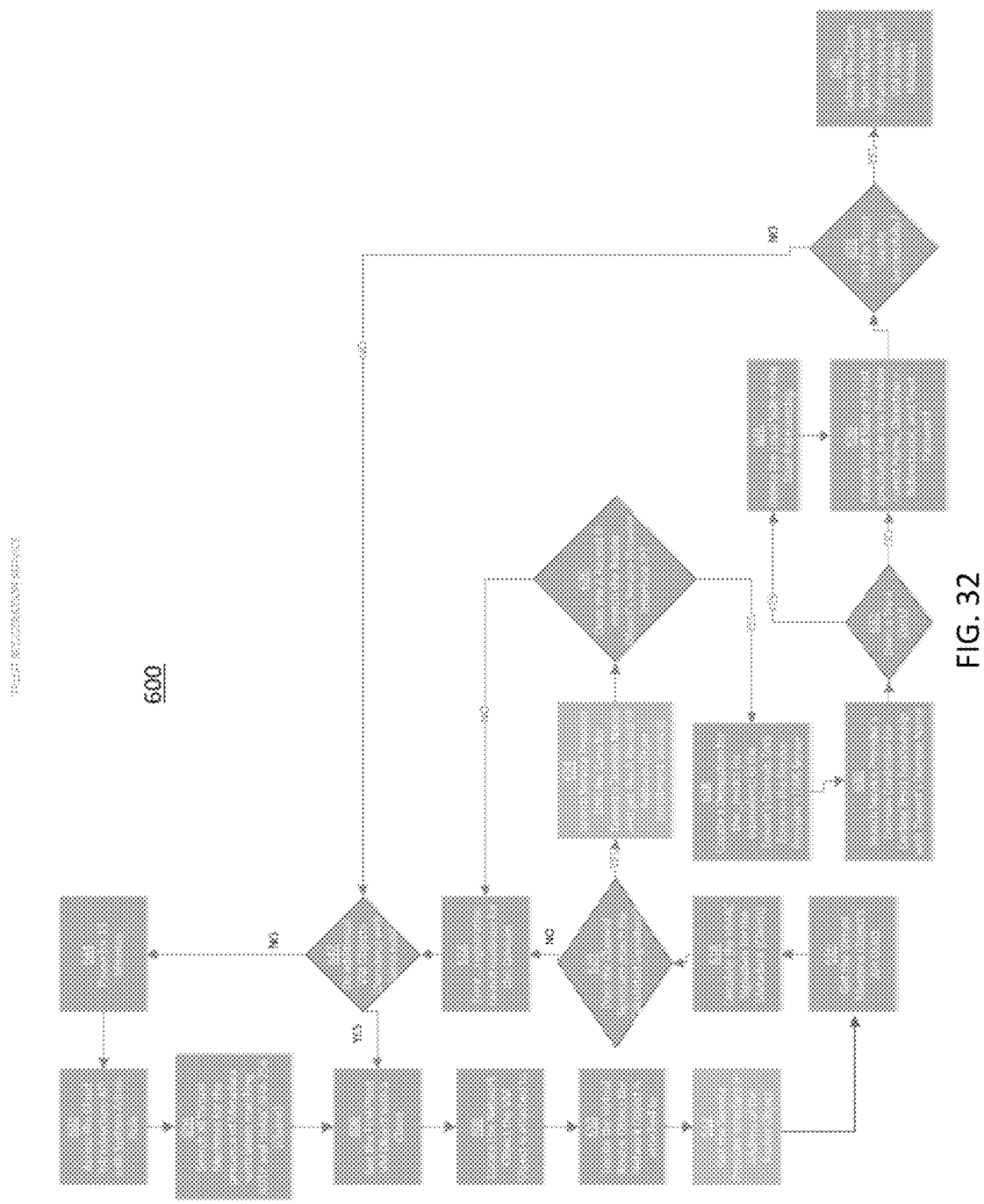
FIG. 32 illustrates a process performed by the cloud service provider for registering a trust relationship between a directory server of the tenant and a directory server of the cloud service provider.

FIG. 32 illustrates a scripted process 600 performed by the cloud service provider for completing a trust relationship between a directory server such as 212 or 222 of a tenant and the directory server 204 of the cloud service provider once the scripted process 500 has been successfully executed by a tenant. The trust registration service process 600 can run periodically (e.g., at intervals of a preset period, such as 15 minute). This process can run on the cloud service provider's directory server 204, or on a dedicated server within realm 102 with network access to the directory server 204 and the Cloud Infrastructure Manager ("fabric controller") API. This process must run from within a security context that allows administrator access to the cloud Infrastructure API and the ability to create and delete trust relationships between realm 102 and other realms.

The process, running under the cloud service provider's security context and on a server in realm 102 can access (e.g., by logging in), at 602, the cloud infrastructure server API using a system administrator role. The cloud infrastructure API is the server running a service that enables tenants to interact with and/or control the provisioning of their compute, storage, and network pools, as well as provision their virtual machines and VXLAN-backed virtual distributed port groups on the cloud service provider-managed datacenter or IaaS. When the cloud service provider logs in to the Cloud Infrastructure Manager API, it can see the tenant-virtual machine hierarchy. The service provider can search, at 604, all virtual machines for the presence of metadata in the form of name-value pairs. The encrypted payload value is the encrypted string and the HMAC-SHA-256 value is the hash message authentication code signature value for the original string.

The process can get, at 606, a first/next virtual machine object (e.g., directory server 212/222) with a claim. The claim is a posting of such encrypted string and HMAC signature to the Cloud Infrastructure Server API, thus notifying the cloud service provider of a tenant's creation of its side the realm trust and corresponding submission of the password required for the cloud service provider to complete the trust relationship using the same password on the cloud service provider's realm. The process, by accessing the Cloud Infrastructure Server Manager API, can locate, at 608, the network object (e.g., VXLAN-backed distributed virtual port group 214/224) with which the virtual machine object is attached. The process can locate, at 610, the virtual router object (e.g., virtual router 216/226) to which the network object is attached. The process can get, at 612, the tenant's router's second external interface IP address of the router object. This IP address can be the one that the cloud service provider has assigned as a part of the tenant enrollment process 400 described in FIG. 4. The process can get, at 616, the cloud infrastructure API-assigned UUID of the virtual machine object. The process can compute, at 618, the HMAC signature for the metadata/claim for the trust password.

The process can determine, at 620, whether the claimed signature matches the computed signature. If the process determines at 620 that there is no match, the process can indicate, at 622, that an error (e.g., error that the trust password has been tampered with) has occurred and the trust registration is not able to continue for this domain. If the process determines at 620 that there is a match, the process can successfully decrypt the string containing the tenant's directory server name, realm name, and the trust password used by the process 500 to create the tenant's side of the realm trust. The process can search, at 624, the directory server 204 DNS records (229) for the DNS zone for the realm name ("domain name") of the tenant and get the IP address of the A record (as discussed with respect to the tenant enrollment process 400). The process can determine, at 626, whether the IP address of the A record matches the IP address of the router 216/226's interface with the cloud service provider. If the process determines a match at 626, the cloud service provider can create, at 628, a DNS delegation on the cloud service provider DNS server for the_msdcs (e.g., pointing to tenant's Directory Server DNS Name) in the tenant's DNS zone in 229 on the directory server 204.

The process can search, at 630, the directory server 204, for existing trust relationship with tenant's domain name. The process can determine, at 632, whether a trust relationship exists. If the process determines at 632 that a trust relationship exists, the process can delete, at 634, the local side (e.g., side of the realm 102) of the trust relationship. If the process determines at 632 that a trust relationship does not exist, or after 634, the process can create, at 636, the local side of the trust by specifying: the cloud service provider realm 102, the direction as being bidirectional, and the trust password. The process thus ensures that the same trust password programmed into the directory servers of 102 and 104.

The process can determine, at 638, whether the trust was created successfully. If the process determines at 638 that the trust was created successfully, the process can delete, at 640, the claim from the metadata of the virtual machine object (e.g., the directory server 204) within the cloud infrastructure API. If the process determines at 638 that the trust was not created successfully, the process can determine, at 642, whether additional virtual machine objects (e.g., directory server 212/222) with claims exist. If the process determines at 642 that additional virtual machine objects with claims exist (such as for realm 106), the process flow can go to 606. If the process determines at 642 that additional virtual machine objects with claims exist, the process flow can go to 606. If the process determines at 642 that additional virtual machine objects with claims do not exist, the process can pause (e.g., 15 minutes) and then the process flow can go to 602.

Figure 33:
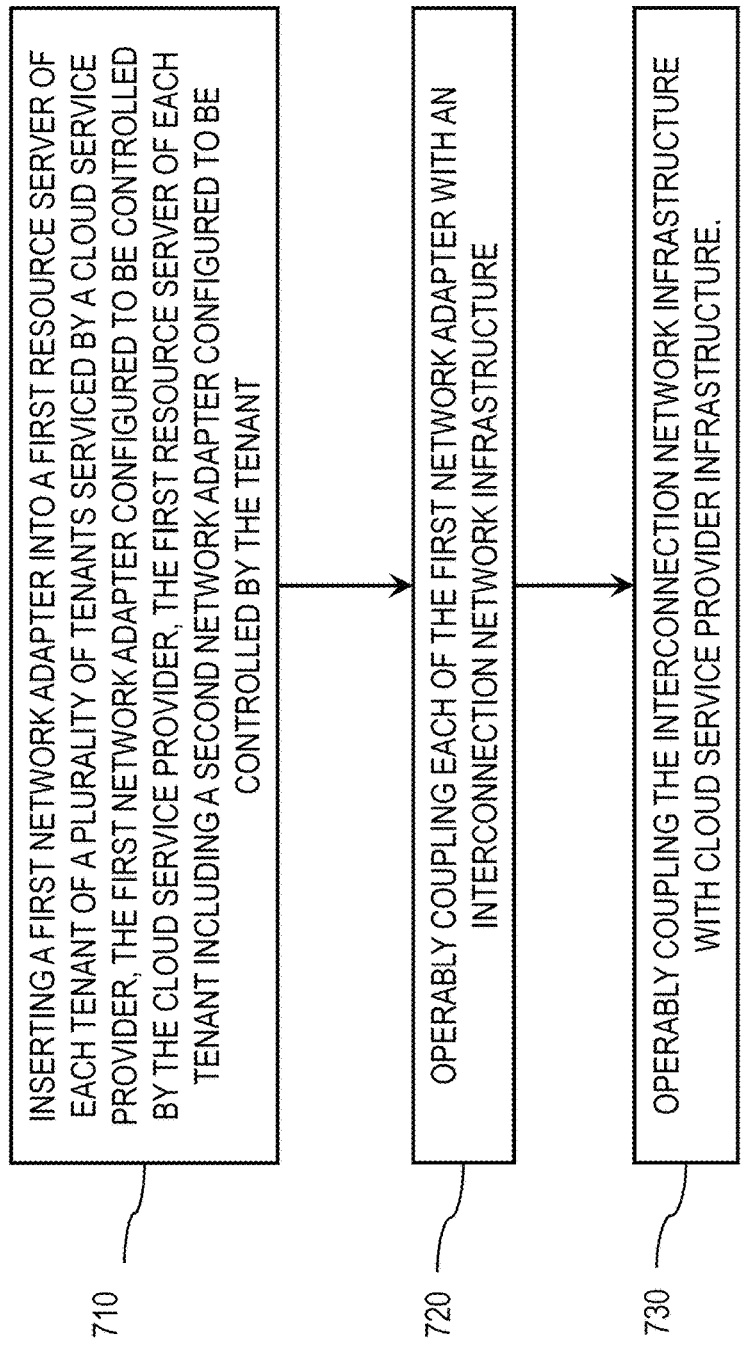
FIG. 33 is a process flow diagram illustrating an example process for configuration a virtual network topology for working around these IP address between tenants on tenants' primary network adapter in a cloud service provider and tenants model without requiring a tenant to reconfigure their topology or adhere to cloud service provider address requirements.

FIG. 33 is a process flow diagram 700 illustrating an example process for configuration a virtual network topology for working with tenant internal network IP address conflicts in an IaaS model without requiring a tenant to reconfigure their topology or adhere to cloud service provider address requirements.

At 710, a first network adapter can be inserted into a first resource server of each tenant of a plurality of tenants serviced by a cloud service provider. The first network adapter's IP Address can be configured by the cloud service provider's DHCP server.

The tenants and cloud service provider can be arranged, for example, as illustrated in FIG. 3. The first resource server of each tenant can include a second network adapter configured to be controlled by the tenant. The tenant includes a first directory server that includes a network adapter configured to be controlled by the tenant. Each of the second network adapter and the third network adapter can be operably coupled to a first VXLAN-backed distributed virtual port group controlled and/or created by the tenant. The first port group can be operably coupled with a router.

At 720, each of the first network adapter can be operably connected with an interconnection network infrastructure. In some implementations, the interconnection network infrastructure can be implemented as illustrated in FIG. 3. Each of the first network adapter and the router can be operably connected or coupled with a second port group, such as a private-vlan backed distributed virtual port group of type isolated and operably coupling the second port group with a third port group, such as a private-vlan backed distributed virtual port group of type promiscuous. The router can be operably connected or coupled with the second port group via a secondary external interface connection. The third port group can be controlled by the cloud service provider. The second port group (of the type isolated) can be controlled by the cloud service provider.

At 730, the interconnection network infrastructure can be operably connected with a cloud service provider infrastructure. With reference to the example described with respect to FIG. 3, this can include operably coupling the third port group with a fourth port group, such as a VLAN-backed distributed virtual port group, via a firewall. The fourth port group (VLAN-backed port group) is controlled by the cloud service provider and the fourth port group is coupled to a second resource server, a second directory server and a dynamic host configuration protocol server of the cloud service provider realm.

The coupling of each of the first network adapter and the router (e.g., the router's second external interface connection) with the second port group of the type isolated that is controlled by the cloud service provider can work around conflicting internet protocol addresses of the primary network adapters of any tenant resource server relative to two or more tenants of the plurality of tenants.

The interconnection network infrastructure can enable communication over the interconnection network infrastructure between the cloud service provider infrastructure and each tenant. The interconnection network infrastructure likewise can disallow, prevent, and/or disable communication over the interconnection network infrastructure between the plurality of tenants.

In some implementations, the second network adapter is largely invisible to applications running on such computers in the tenant network.

In some implementations, the first port group can include a virtual extensible local area network backed distributed port group. The second port group can include a private virtual local area network backed distributed virtual port group of type isolated that is configured to access the third port group such that each tenant is prevented from accessing any other tenant via OSI layers 2-7 over the network.

In some implementations, the third port group can include a promiscuous private virtual local area network-backed distributed virtual port group that is configured to pass network traffic (OSI layers 2-7) originating from any tenant of the plurality of tenants to the service-provider realm, and to provide the requested services to the tenant provided the tenant is authorized for the service/session.

Figure 34:
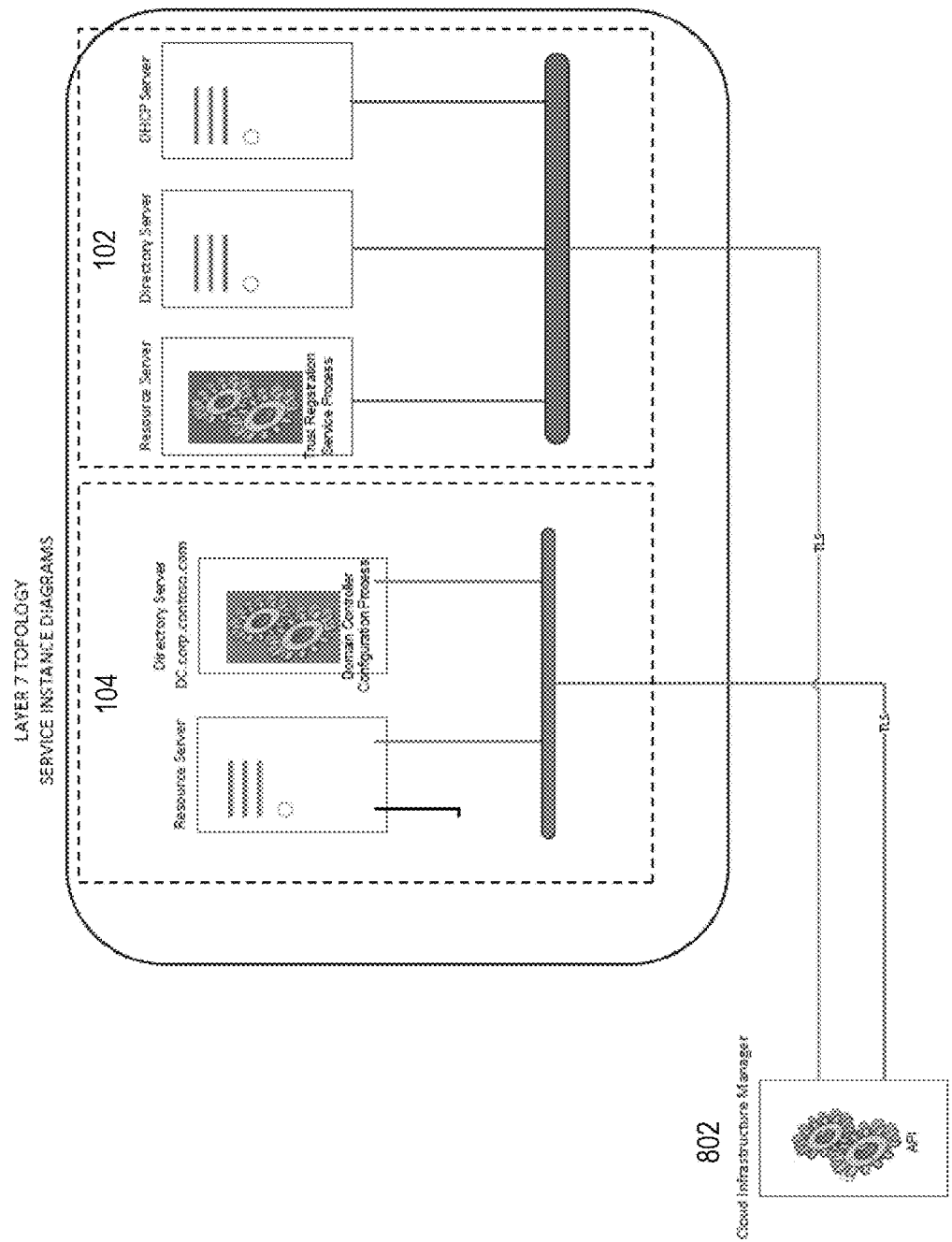
FIG. 34 is a service and process instance diagram illustrating the runtime environments for the processes defined in FIGS. 31 and 32.

FIG. 34 is a service and process instance diagram illustrating the runtime environments for the enrollment processes defined in FIGS. 31 and 31. The process of configuring the directory server by a tenant is executed by the tenant (e.g., on the tenant directory server), in the example of FIG. 34, by tenant Contoso, unless otherwise specified. The scripted process completing the trust relationship between a tenant realm (e.g., 104/106) and the cloud provider realm (e.g., 102) of the cloud service provider can be executed by the service provider (e.g., on the service provider directory server), typically as a scheduled, recurring task, or as a service, unless otherwise specified. Both processes can communicate with the cloud infrastructure manager 802.

Although a few variations have been described in detail above, other modifications can be possible. For example, VLAN port groups can be used in place of VXLAN port groups and vice versa. Virtualization software and/or hypervisor technologies can be used. Other implementations are possible.

As used herein, a domain can be referred to as a realm and/or a forest. Directory server can be referred to as an authentication server and/or a domain controller. For tenant routers, a router external interface may also be referred to as a service-provider assigned interface. Network interface connection can be referred to as a network adapter, NIC, and/or network connection.

In some implementations, it is presumed that the Directory Server is the authentication server, running a Kerberos key distribution center, ticket granting service, and domain name service. In some implementations, when using NTLM in place of kerberos, the directory server need not require a kerberos key distribution center or ticket granting service. In some implementations, when using NTLM, the operating system must be WINDOWS, and the Trust type is an EXTERNAL TRUST, rather than a FOREST TRUST.

Port groups (e.g., network switch segments) may be virtualized by running as a software switch on a hypervisor operating system. Port groups may be distributed, across multiple such hypervisors and physical switches. Distributed virtual port groups may exist on distributed virtual switches for optimal efficiency, examples of such distributed virtual switch software include the VMware vSphere Distributed Switch and/or the Cisco Nexus 1000v distributed virtual switch, for example.

Although the figures and examples only show tenants with a first resource server, tenants can have multiple resource servers. The current subject matter scales for multiple such resource servers.

The currently described subject matter can have many advantages. For example, the networking architecture described herein can allow IP address conflicts with respect to each tenant's internal network. Working around this constraint can be advantageous because it allows the cloud service provider to securely distribute value-added network services to each tenant. Examples of such services can include:

(1) Managed secure remote access (e.g., remote application delivery) services over the network through a cloud service provider-managed connection broker and internet-facing access gateway over the cloud service provider network. Specific examples of these services include CITRIX XENAPP, or MICROSOFT REMOTE DESKTOP SERVICES. Reliable remote access is critical when virtual machines are running in a location outside of the tenant's campus such as the cloud service provider's infrastructure (the "cloud").

(2) Security or monitoring services of tenant's virtual machines over the cloud service provider network.

(3) Software as a service (SaaS) for third party software applications and operating systems. This enables tenants to pay for third party software products based on use each billing period. This requires a cloud service provider software inventory services delivered over the cloud service provider network.

(4) Cloud service provider managed key management service (KMS) activation of such third party software (licensed via the cloud service provider) over the cloud service provider network.

(5) Distribution of third party software client access licenses (CALs) over the cloud service provider network.

(6) Secure data exchange over the cloud service provider network between cloud service provider and tenant virtual machines for miscellaneous purposes, including file restore services from managed or self-service virtual machine backup solutions.

(7) Software update services over the network for specific applications running on tenant resource servers.

(8) Tenant's self-service provisioning of virtual machines and the aforementioned services.

(9) Depending on the operating system platform, the creation of Kerberos realm trusts, forest trusts, or external trusts between cloud service provider's realm ("domain") and tenant's realm enabling mutual authentication and secure communication for each of the above services.

(10) Continuity of service provider network services sessions with tenant servers, even when tenant's virtual router or internal network is undergoing changes (i.e. no session disconnects of service provider delivered services due to tenant router configuration changes). This improves end user reliability of the service provider services being used, and provides for easier troubleshooting.

(11) Prevention of Denial of Service due to IP Address conflicts at layer 3 of the OSI model on the cloud service provider network.

(12) Maintains strict layer 2 (of the OSI model) isolation between each tenant to protect tenants from a malicious tenant.

(13) For scalability, tenant's self-service enrollment and scripted setup of tenant's initial engagement with the cloud service provider.

(14) Secure distribution of a baseline of security policies over the network.

(15) Avoids having a tenant reconfigure its internal topology can advantageously maximize convenience for a tenant seeking cloud provider services delivered from the network, which can directly translate to increased revenue for the cloud service provider. The ability of the cloud service provider to offer these network services differentiates the cloud service provider's offerings from other IaaS solutions. This differentiation stems from the ability to offer a set of cloud service provider-managed network services without interfering with tenant's control over the provisioning of the virtual machines network settings and those machines' self-service enrolment in the consumption of these services. This directly translates into better scalability, marketplace exclusivity, and thus increased revenue and lower costs of such revenues for the cloud service provider.

Various implementations of the subject matter described herein can be realized/implemented in digital electronic circuitry, integrated circuitry, specially designed application specific integrated circuits (ASICs), computer hardware, firmware, software, and/or combinations thereof. These various implementations can be implemented in one or more computer programs. These computer programs can be executable and/or interpreted on a programmable system. The programmable system can include at least one programmable processor, which can have a special purpose or a general purpose. The at least one programmable processor can be coupled to a storage system, at least one input device, and at least one output device. The at least one programmable processor can receive data and instructions from, and can transmit data and instructions to, the storage system, the at least one input device, and the at least one output device.

These computer programs (also known as programs, software, software applications or code) can include machine instructions for a programmable processor, and can be implemented in a high-level procedural and/or object-oriented programming language, and/or in assembly/machine language. As can be used herein, the term "machine-readable medium" can refer to any computer program product, apparatus and/or device (e.g., magnetic discs, optical disks, memory, programmable logic devices (PLDs)) used to provide machine instructions and/or data to a programmable processor, including a machine-readable medium that can receive machine instructions as a machine-readable signal. The term "machine-readable signal" can refer to any signal used to provide machine instructions and/or data to a programmable processor.

To provide for interaction with a user, the subject matter described herein can be implemented on a computer that can receive data from the one or more users via a keyboard, a mouse, a trackball, a joystick, or any other input device. To provide for interaction with the user, other devices can also be provided, such as devices operating based on user feedback, which can include sensory feedback, such as visual feedback, auditory feedback, tactile feedback, and any other feedback. The input from the user can be received in any form, such as acoustic input, speech input, tactile input, or any other input.

The subject matter described herein can be implemented in a computing system that can include at least one of a back-end component, a middleware component, a front-end component, and one or more combinations thereof. The back-end component can be a data server. The middleware component can be an application server. The front-end component can be a client computer having a graphical user interface or a web browser, through which a user can interact with an implementation of the subject matter described herein. The components of the system can be interconnected by any form or medium of digital data communication, such as a communication network. Examples of communication networks can include a local area network, a wide area network, a metropolitan area network, internet, intranet, Bluetooth network, infrared network, or any other network.

The computing system can include clients and servers. A client and server can be generally remote from each other and can interact through a communication network. The relationship of client and server can arise by virtue of computer programs running on the respective computers and having a client-server relationship with each other.

The processes described herein can be implemented by one or more data processors either within a single computing system or distributed among two or more computing systems. Related computer program products and computer systems are also described. The computer program products can comprise non-transitory computer readable media storing instructions, which when executed by at least one data processor of one or more computing systems, can cause the at least one data processor to perform operations herein. The computer systems can include one or more data processors and a memory coupled to the one or more data processors. The memory can temporarily or permanently store instructions that cause at least one processor to perform one or more of the operations described herein.

Although a few variations have been described in detail above, other modifications can be possible. For example, the logic flows or sequences described herein do not require the particular order shown, or sequential order, to achieve desirable results. Further, the features described in different implementations are interchangeable and/or additive to create further implementations, which are also within the scope of this patent application. Other implementations may be within the scope of the following claims.

What is claimed is:

1. A method comprising:
   instantiating a first server within a tenant domain serviced by a cloud service provider, the first server including a first network adapter and a second network adapter, the first network adapter configured to be controlled by the cloud service provider, the second network adapter configured to be controlled by the tenant;
   operably coupling the first network adapter with an interconnection network infrastructure operably coupled with a cloud service provider infrastructure;
   operably coupling the second network adapter to a first port group controlled by the tenant;
   configuring the first server to host and execute an application accessible through a remote display protocol via the first network adapter;
   applying local security and group policy configurations to the first server;
   enabling access by an end user to the first server using a gateway of the cloud service provider and the first network adapter, or using a tenant-deployed virtual private network, the second network adapter, and a tenant-deployed remote desktop gateway;
   authenticating, by the gateway of the cloud service provider, the end user against a tenant's active directory domain, the authentication including verifying a membership of the end user in an active directory security group; and
   routing a connection of the end user to the first server within the tenant domain via the first network adapter associated with the active directory security group.

2. The method of claim 1, the tenant further including a first directory server including a third network adapter configured to be controlled by the tenant, the third network adapter operably coupled to the first port group controlled by the tenant, the first port group being operably coupled with a router.

3. The method of claim 2, wherein the operably coupling the first network adapter with the interconnection network infrastructure includes:
   operably coupling each of the first network adapter and a second external interface of the router with a second port group of type private virtual local area network isolated, the second port group of the type isolated being controlled by the cloud service provider; and
   operably coupling the second port group with a third port group of a type private virtual local area network promiscuous, wherein each of the second port group and the third port group is controlled by the cloud service provider.

4. The method of claim 3, wherein the operably coupling the interconnection network infrastructure with the cloud service provider infrastructure includes operably coupling the third port group promiscuous with a fourth port group via a firewall, the fourth port group being controlled by the cloud service provider, the fourth port group operably coupled to a second resource server, a second directory server and a dynamic host configuration protocol server of the cloud service provider.

5. The method of claim 4, wherein the first port group is a virtual extensible local area network backed distributed port group or a virtual local area network-backed distributed virtual port group.

6. The method of claim 4, wherein the second port group is operably coupled to the third port group via a private virtual local area network mapping trunk.

7. The method of claim 4, wherein the fourth port group is a virtual local area network-backed distributed port group, wherein the virtual local area network identity is exclusive of any private-virtual local area network identity.

8. The method of claim 4, wherein the fourth port group is operably coupled to the third port group via a firewall.

9. The method of claim 1, wherein configuring the first server to execute the application accessible through a remote display protocol further comprises:
   creating a machine account matching an active directory computer account of the first server;
   adding the machine account to a service provider created machine catalog administered by the tenant; and
   adding the machine account to a service provider created delivery group administered by the tenant.

10. The method of claim 1, further comprising:
    retrieving a list of remote application servers associated with an administrator-specified tenant-managed remote desktop services connection broker address; and
    adding a runtime computer name of the first server to the list of remote application servers associated with the administrator specified connection broker address.

11. The method of claim 1, wherein the remote display protocol includes MICROSOFT remote desktop or CITRIX independent computing architecture.

12. The method of claim 1, further comprising:
    configuring the cloud service provider infrastructure, the cloud service provider infrastructure including a database, a delivery controller, a licensing server, and an access gateway; and
    creating, on the delivery controller, a machine catalog and a delivery group, wherein the administration of the delivery controller is delegated to the tenant.

13. The method of claim 1, further comprising:
    authenticating, using a Kerberos protocol, a network protocol session between a first computer of a first domain and a second computer of a second domain.

14. A system comprising:
    at least one data processor;
    memory storing instructions which, when executed by the at least one data processor, causes the at least one data processor to perform operations comprising:
    instantiating a first server within a tenant domain serviced by a cloud service provider, the first server including a first network adapter and a second network adapter, the first network adapter configured to be controlled by the cloud service provider, the second network adapter configured to be controlled by the tenant;
    operably coupling the first network adapter with an interconnection network infrastructure operably coupled with a cloud service provider infrastructure;
    operably coupling the second network adapter to a first port group controlled by the tenant;
    configuring the first server to host and execute an application accessible through a remote display protocol via the first network adapter;

applying local security and group policy configurations to the first server;

enabling access by an end user to the first server using a gateway of the cloud service provider and the first network adapter, or using a tenant-deployed virtual private network, the second network adapter, and a tenant-deployed remote desktop gateway;

authenticating, by the gateway of the cloud service provider, the end user against a tenant's active directory domain, the authentication including verifying a membership of the end user in an active directory security group; and routing a connection of the end user to the first server within the tenant domain via the first network adapter associated with the active directory security group.

15. The system of claim 14, wherein configuring the first server to execute the application accessible through a remote display protocol further comprises:

creating a machine account matching an active directory computer account of the first server;

adding the machine account to a service provider created machine catalog administered by the tenant; and adding the machine account to a service provider created delivery group administered by the tenant.

16. The system of claim 14, the operations further comprising:

retrieving a list of remote application servers associated with an administrator-specified tenant-managed remote desktop services connection broker address; and adding a runtime computer name of the first server to the list of remote application servers associated with the administrator specified connection broker address.

17. The system of claim 14, the tenant further including a first directory server including a third network adapter configured to be controlled by the tenant, the third network adapter operably coupled to the first port group controlled by the tenant, the first port group being operably coupled with a router.

18. A non-transitory computer readable storage medium storing instructions, which when executed by at least one data processor of at least one computing system, implement operations comprising:

instantiating a first server within a tenant domain serviced by a cloud service provider, the first server including a first network adapter and a second network adapter, the first network adapter configured to be controlled by the cloud service provider, the second network adapter configured to be controlled by the tenant;

operably coupling the first network adapter with an interconnection network infrastructure operably coupled with a cloud service provider infrastructure;

operably coupling the second network adapter to a first port group controlled by the tenant;

configuring the first server to host and execute an application accessible through a remote display protocol via the first network adapter;

applying local security and group policy configurations to the first server;

enabling access by an end user to the first server using a gateway of the cloud service provider and the first network adapter, or using a tenant-deployed virtual private network, the second network adapter, and a tenant-deployed remote desktop gateway;

authenticating, by the gateway of the cloud service provider, the end user against a tenant's active directory domain, the authentication including verifying a membership of the end user in an active directory security group; and routing a connection of the end user to the first server within the tenant domain via the first network adapter associated with the active directory security group.

* * * * *